United States Patent
Niu et al.

(10) Patent No.: US 11,186,678 B2
(45) Date of Patent: Nov. 30, 2021

(54) RADICAL CASCADE-ENABLED SYNTHESIS OF PRECISION POLYMERS WITH COMPLEX MAIN-CHAIN STRUCTURES

(71) Applicant: Trustees of Boston College, Chestnut Hill, MA (US)

(72) Inventors: Jia Niu, Lexington, MA (US); Hanchu Huang, Newton, MA (US); Wenqi Wang, Brighton, MA (US)

(73) Assignee: Trustees of Boston College, Chesnut Hill, MA (US)

( * ) Notice: Subject to any disclaimer, the term of this patent is extended or adjusted under 35 U.S.C. 154(b) by 112 days.

(21) Appl. No.: 16/701,031

(22) Filed: Dec. 2, 2019

(65) Prior Publication Data

US 2020/0216610 A1 Jul. 9, 2020

Related U.S. Application Data

(60) Provisional application No. 62/773,265, filed on Nov. 30, 2018.

(51) Int. Cl.
| | | |
|---|---|---|
| *C08G 63/688* | (2006.01) | |
| *C08G 63/78* | (2006.01) | |
| *C08K 5/38* | (2006.01) | |
| *C08G 61/12* | (2006.01) | |

(52) U.S. Cl.
CPC ......... *C08G 63/688* (2013.01); *C08G 61/124* (2013.01); *C08G 63/78* (2013.01); *C08K 5/38* (2013.01); *C08G 2261/145* (2013.01)

(58) Field of Classification Search
CPC .. C08G 63/688; C08G 63/78; C08G 63/6886; C08G 63/6888; C08G 61/12; C08G 61/124; C08G 2261/145; C08G 2261/334; C08G 2261/344; C08K 5/38
See application file for complete search history.

(56) References Cited

PUBLICATIONS

Huang et al.; Journal of the American Chemical Society, vol. 140, p. 10402-10406, Jun. 19, 2018.*

Gutekunst, W.R.; et al (2015) "A General Approach to Sequence-Controlled Polymers Using Macrocyclic Ring Opening Metathesis Polymerization." Journal of the American Chemical Society, 137(25), pp. 8038-8041.

Cho, I., (2000) "New Ring-Opening Polymerizations for Copolymers Having Controlled Microstructures." Progress in polymer science, 25(8), pp. 1043-1087.

Paulusse, J.M.; et al (2009) "Free Radical Polymers with Tunable and Selective Bio-and Chemical Degradability." Journal of the American Chemical Society, 131(28), pp. 9805-9812.

Evans, R.A.; et al (1994) "New Free-Radical Ring-Opening Acrylate Monomers." Macromolecules, 27(26), pp. 7935-7937.

Evans, R.A; et al (1996) "Free-Radical Ring-Opening Polymerization of Cyclic Allylic Sulfides." Macromolecules, 29(22), pp. 6983-6989.

Stork, G.; et al (1955) "The Stereochemistry of Polyene Cyclization." Journal of the American Chemical Society, 77(19), pp. 5068-5077.

Quiclet-Sire; et al (1996) "New Radical Allylation Reaction." Journal of the American Chemical Society, 118(5), pp. 1209-1210.

Eschenmoser, A.; et al (1955) "To the Knowledge of the Triterpene. 190th Communication. A Stereochemical Interpretation of the Biogenetic Isoprene Rule in the Triterpenes." Helvetica Chimica Acta, 38 (7), pp. 1890-1904.

* cited by examiner

*Primary Examiner* — Robert S Jones, Jr.
(74) *Attorney, Agent, or Firm* — Lei Fang; Smith Tempel Blaha LLC

(57) ABSTRACT

Radical cascade reactions enabling sequence-controlled ring-closing polymerization and ring-opening polymerization for the controlled synthesis of polymers with complex main-chain structures are provided. Facile syntheses leading to low-strain macrocyclic monomers consisting of the ring-opening triggers and extended main-chain structures are also provided. The present disclosure further provides methods for excellent control over polymer molecular weights and molecular weight distributions and high chain-end fidelity allows for the preparation of polymeric systems with well-defined architectures. Further provided are the general nature of the radical cascade-triggered transformations in polymer chemistry, and its application to the synthesis of polymers with diverse main-chain structural motifs with tailored functions. This abstract is intended as a scanning tool for purposes of searching in the particular art and is not intended to be limiting of the present disclosure.

17 Claims, 29 Drawing Sheets
(6 of 29 Drawing Sheet(s) Filed in Color)

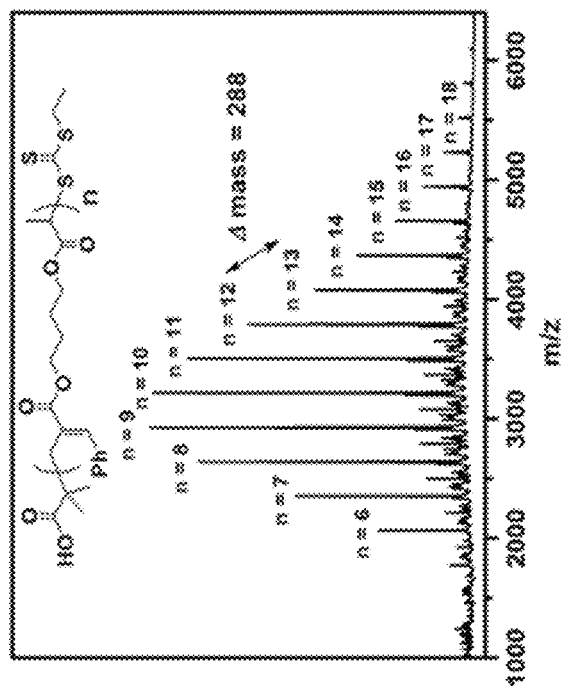
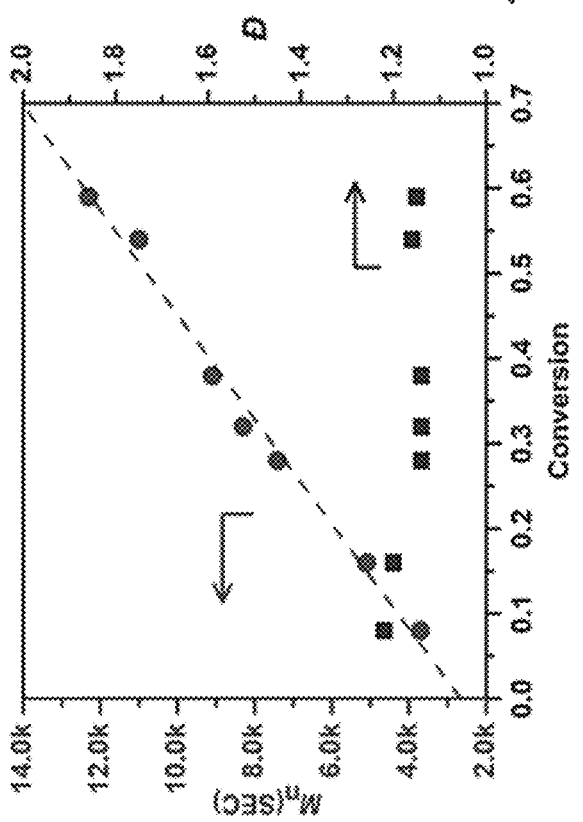
FIG. 1A
FIG. 1B

Prior Art: Radical polymerization of acyclic acrylic monomers

Prior Art: Radical polymerization of *strained* cyclic monomers

Present Disclosure: RCT-ROP of macrocyclic monomers with low ring strain

Model reaction of the trigger-testing compound

Synthesis of macrocyclic monomers

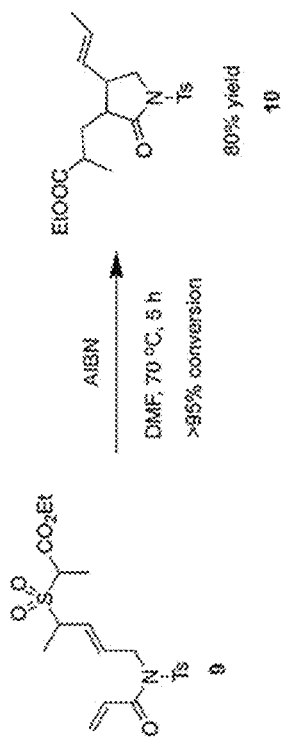
FIG. 18A
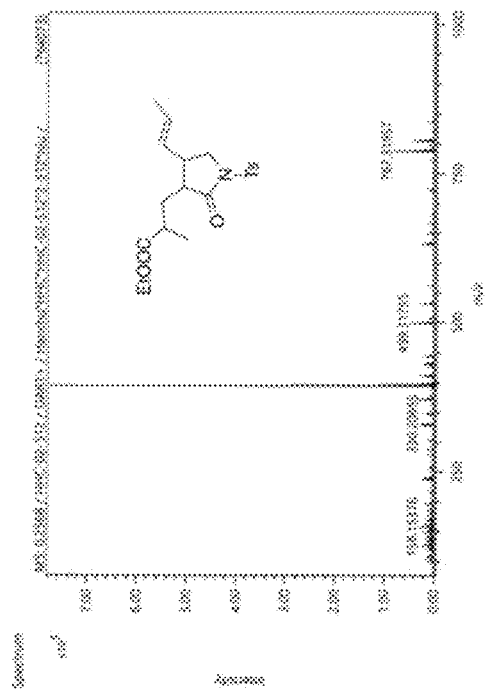
FIG. 18B
FIG. 18C

RADICAL CASCADE-ENABLED SYNTHESIS OF PRECISION POLYMERS WITH COMPLEX MAIN-CHAIN STRUCTURES

CROSS-REFERENCE TO RELATED APPLICATIONS

This Application claims the benefit of U.S. Provisional Application No. 62/773,265, filed on Nov. 30, 2018, which is incorporated herein by reference in its entirety.

FIELD OF THE INVENTION

The present invention is directed to the synthesis of precision polymers with complex main-chain structures.

BACKGROUND

Radical cascade reactions have been widely applied in the synthesis of small molecules, in particular polycyclic structures. Eschenmoser, et al. and Stork and Burgstahler hypothesized that the biosynthesis of steroids occurred through a cascade of cyclization reactions from an acyclic squalene precursor (see Helv. Chim. Acta. (1955) 38:1890 and J. Am. Chem. Soc. (1955) 77:5068, respectively). Julia et al. reported the first radical dicyclization that involved a two-step radical cascade reaction to yield a bicyclic product from an acyclic α-cyano dienyl ester (see Bull. Soc. Chim. Fr. 1964, 1122; and Bull. Soc. Chim. Fr. 1964, 1129). To date a diverse array of examples of radical cascade reactions in organic chemistry have been reported, many of which feature kinetically-driven mechanisms that lead to products consisting of five- or six-membered rings.

Due to the synthetic accessibility and the propensity for the homolytic cleavage of the C—S bond under mild conditions, allyl sulfones were chosen as the core structure of the ring-opening trigger. Cho et al. (see Prog. Polym. Sci. (2000) 25:1043-1087) first reported the ring-opening polymerization of α-vinyl cyclic sulfones, but this early example relies on the relief of the ring strain as the driving force of the reaction, leading to in a limited scope of strained cyclic monomers. In addition, the sulfonyl radical resulted from ring opening cannot be deactivated/controlled in this system. Quiclet-Sire and Zard suggested that while in general the equilibrium favors the formation of the alkylsulfonyl radical, a reverse reaction to extrude $SO_2$ can readily occur if the resulting alkyl radical is stabilized (see J. Am. Chem. Soc. (1996) 118:1209).

It should be noted that the cyclic allylic sulfide monomers developed are the only existing example to date of radical ROP of macrocyclic monomers (see Macromolecules (1994) 27:7935; Macromolecules (1996) 29:6983; and J. Am. Chem. Soc. (2009) 131:9805). However, the cyclic allylic sulfide monomers suffer from incomplete ring opening due to lack of driving force and the inability to deactivate the thiyl radical during chain propagation, resulting in low reactivity and difficulties in polymerization control. Gutekunst and Hawker have shown that a triggered ring-opening metathesis polymerization (ROMP) system based on olefin metathesis could allow ROMP of macrocyclic monomers by providing the thermodynamic driving force (see J. Am. Chem. Soc. 2015, 137:8038-8041).

Despite advances in polymerization research, particularly as it relates to ring-opening metathesis polymerization, there remains a need for synthesis methods directed to the preparation of precision polymers with complex main-chain structures that comprise broad functional group compatibility; amenable to preparation of a wide variety of well-defined copolymers, including block polymers, random copolymers, and the like; and having fast reaction kinetics and excellent chain end fidelity. These needs and other needs are satisfied by the present disclosure.

SUMMARY

In accordance with the purpose(s) of the disclosure, as embodied and broadly described herein, the disclosure, in one aspect, relates to methods and compositions for radical cascade-enabled synthesis of precision polymers with complex main-chain structures.

Disclosed are compounds having a structure represented by a formula:

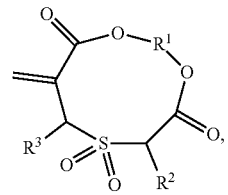

wherein $R^1$ is diyl group selected from —(C1-C16 alkanediyl)-O—(C═O)—$R^{20}$—(C═O)—O—(C1-C6 alkanediyl), —O—(C1-C16 alkanediyl)-O—, —O—(C1-C16 alkanediyl)-(C3-C12 cyclic alkanediyl)-(C1-C16 alkanediyl)-O—, —O—(C1-C16 alkanediyl)-(C3-C12 heterocyclic alkanediyl)-(C1-C16 alkanediyl)-O—, —O—(C1-C16 alkanediyl)-(arylene)-(C1-C16 alkanediyl)-O—, —NH—(C1-C16 alkanediyl)-NH—, —NH—(C1-C16 alkanediyl)-(C3-C12 cyclic alkanediyl)-(C1-C16 alkanediyl)-NH—, —NH—(C1-C16 alkanediyl)-(C3-C12 heterocyclic alkanediyl)-(C1-C16 alkanediyl)-NH—, and —NH—(C1-C16 alkanediyl)-(arylene)-(C1-C16 alkanediyl)-NH—; wherein $R^2$ is an aryl group substituted with 1, 2, or 3 electron-withdrawing groups; wherein $R^3$ is selected from hydrogen, (C1-C16) alkyl, aryl, and heteroaryl; wherein $R^{20}$ is selected from arylene, a (C1-C12) alkanediyl, and —$R^{21}$—(C1-C16 alkanediyl)-$R^{22}$—; and wherein each occurrence of $R^{21}$ and $R^{22}$ are independently an arylene.

Also disclosed are compounds having a structure represented by a formula:

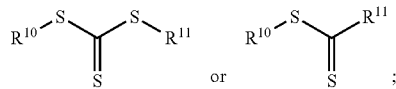

wherein $R^{10}$ is a group having a structure represented by a formula:

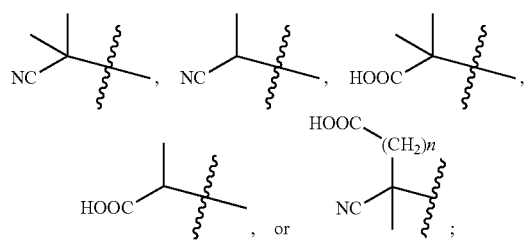

wherein n is integer having a value of 1, 2, 3, 4, 5, or 6; and, wherein $R^{11}$ is a group such as phenyl or a C2-C12 alkyl group. In some aspects, $R^{11}$ is phenyl, ethyl, or —$C_{12}H_{25}$.

Also disclosed are methods for preparing a polymer, the method comprising: reacting a compound having a structure represented by a formula:

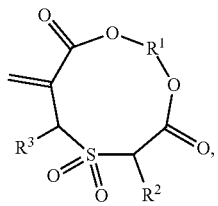

wherein $R^1$ is diyl group selected from —(C1-C16 alkanediyl)-O—(C=O)—$R^{20}$—(C=O)—O—(C1-C6 alkanediyl), —O—(C1-C16 alkanediyl)-O—, —O—(C1-C16 alkanediyl)-(C3-C12 cyclic alkanediyl)-(C1-C16 alkanediyl)-O—, —O—(C1-C16 alkanediyl)-(C3-C12 heterocyclic alkanediyl)-(C1-C16 alkanediyl)-O—, —O—(C1-C16 alkanediyl)-(arylene)-(C1-C16 alkanediyl)-O—, —NH—(C1-C16 alkanediyl)-NH—, —NH—(C1-C16 alkanediyl)-(C3-C12 cyclic alkanediyl)-(C1-C16 alkanediyl)-NH—, —NH—(C1-C16 alkanediyl)-(C3-C12 heterocyclic alkanediyl)-(C1-C16 alkanediyl)-NH—, and —NH—(C1-C16 alkanediyl)-(arylene)-(C1-C16 alkanediyl)-NH—; wherein $R^2$ is an aryl group substituted with 1, 2, or 3 electron-withdrawing groups; wherein $R^3$ is selected from hydrogen, (C1-C16) alkyl, aryl, and heteroaryl; wherein $R^{20}$ is selected from arylene, a (C1-C12) alkanediyl, and —$R^{21}$—(C1-C16 alkanediyl)-$R^{22}$—; and wherein each occurrence of $R^{21}$ and $R^{22}$ are independently an arylene; with a chain transfer agent in the presence of a compound having a structure represented by the formula:

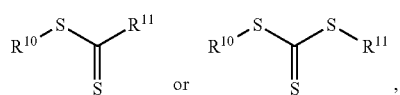

wherein $R^{10}$ is selected from a group having a structure represented by a formula:

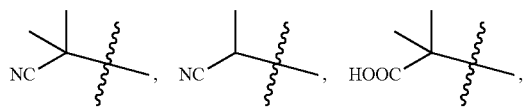

-continued

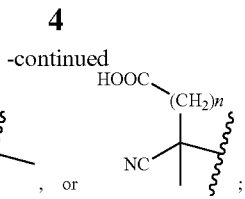

wherein n is integer having a value of 1, 2, 3, 4, 5, or 6; and, wherein $R^{11}$ is a group selected from phenyl and a C2-C12 alkyl group.

Also disclosed are polymers prepared using the disclosed methods, the polymer having a structure given by the formula:

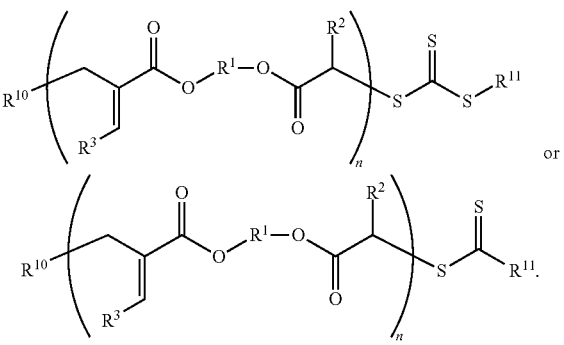

Also disclosed are block copolymers prepared by the disclosed methods, the block copolymer having a structure given by a formula:

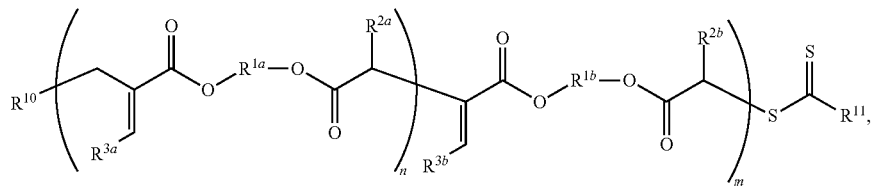

wherein each of $R^{1a}$ and $R^{1b}$ is diyl group independently selected from —(C1-C16 alkanediyl)-O—(C=O)—$R^{20}$—(C=O)—O—(C1-C6 alkanediyl), —O—(C1-C16 alkanediyl)-O—, —O—(C1-C16 alkanediyl)-(C3-C12 cyclic alkanediyl)-(C1-C16 alkanediyl)-O—, —O—(C1-C16 alkanediyl)-(C3-C12 heterocyclic alkanediyl)-(C1-C16 alkanediyl)-O—, —O—(C1-C16 alkanediyl)-(arylene)-(C1-C16 alkanediyl)-O—, —NH—(C1-C16 alkanediyl)-NH—, —NH—(C1-C16 alkanediyl)-(C3-C12 cyclic alkanediyl)-(C1-C16 alkanediyl)-NH—, —NH—(C1-C16 alkanediyl)-(C3-C12 heterocyclic alkanediyl)-(C1-C16 alkanediyl)-NH—, and —NH—(C1-C16 alkanediyl)-(arylene)-(C1-C16 alkanediyl)-NH—; wherein each of $R^{2a}$ and $R^{2b}$ is independently an aryl group substituted with 1, 2, or 3 electron-withdrawing groups; wherein Ria is selected from hydrogen, (C1-C16) alkyl, aryl, and heteroaryl; wherein each of $R^{3a}$ and $R^{3b}$ is independently selected from arylene, a (C1-C12)alkanediyl, and —$R^{21}$—(C1-C16 alkanediyl)-$R^{22}$—; wherein each occurrence of $R^{21}$ and $R^{22}$ is independently an arylene; wherein $R^{10}$ is selected from a group having a structure represented by a formula:

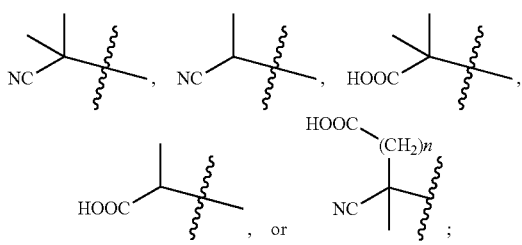

wherein n is integer having a value of 1, 2, 3, 4, 5, or 6; and, wherein $R^{11}$ is a group selected from phenyl and a C2-C12 alkyl group.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE FIGURES

The patent or application file contains at least one drawing executed in color. Copies of this patent or patent application publication with color drawing(s) will be provided by the Office upon request and payment of the necessary fee.

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A-1D show representative data for the controlled synthesis of homopolymers and block copolymers by radical cascade-triggered ROP. FIG. 1A. Plot of molecular weights and dispersity versus monomer conversion. FIG. 1B. MALDI analysis of P-4-3k. SEC analysis of block copolymers: P-5-b-P-4 (FIG. 1C) and P-6-b-P-4 (FIG. 1D).

FIG. 9A. A linear relationship between $\ln([M]_0/[M]_t)$ and reaction time was observed. FIG. 9B. SEC traces of different times.

FIG. 14A shows a prior art radical polymerization reaction mechanism for polymerization of acyclic acrylic monomers. FIG. 14B shows a prior art radical polymerization reaction mechanism for polymerization of strained cyclic monomers. FIG. 14C shows a representative reaction mechanism of a disclosed RCT-ROP of macrocyclic monomers with low ring strain.

FIG. 15A shows a first reaction mechanism as shown. FIG. 15B shows a second reaction mechanism as shown. FIG. 15C shows a third reaction mechanism as shown. FIG. 15D shows a fourth reaction mechanism as shown.

FIG. 18A shows the radical cascade reaction of the trigger-testing compound 9 to provide compound 10; FIG. 18B shows representative data obtained for compound 10; and FIG. 18C shows summary data for the reaction.

FIG. 20A shows the reaction for a radical cascade ring-closing polymerization reaction for monomer 12. FIG. 20B shows representative NMR data collected for the reaction.

Figure 1D:
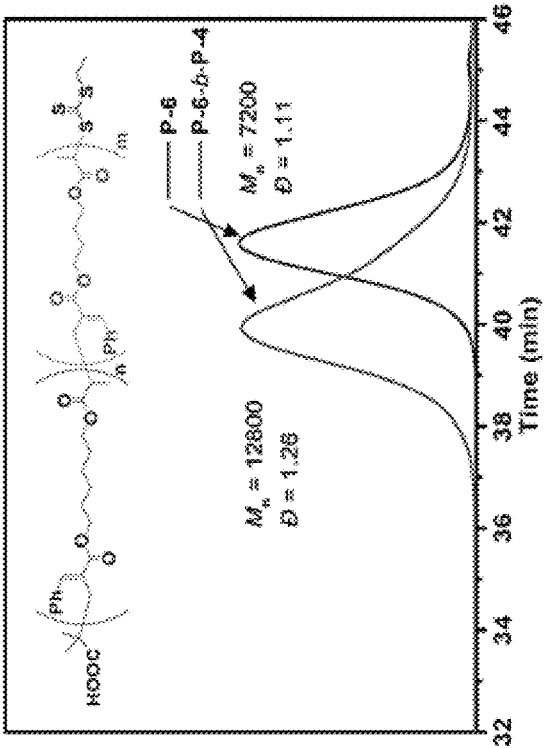

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

A. Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

As used in the specification and the appended claims, the singular forms "a," "an" and "the" include plural referents unless the context clearly dictates otherwise. Thus, for example, reference to "a monomer," "a polymer," or "a chain transfer agent," includes, but is not limited to, two or more such monomers, polymers, chain transfer agents, and the like, including a plurality of such monomers, polymers, chain transfer agents, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of an monomer refers to an amount that is sufficient to achieve the desired improvement or effect modulated by indicated component, material, compound or polymer, e.g. achieving the desired molecular weight and/or percent yield in a synthesis reaction. The specific level in terms of concentration or amount as an effective amount will depend upon a variety of factors such as other compounds in the chemical reaction, temperature, concentration, and the like.

Reference to "a/an" chemical compound, monomer, and polymer each refers to one or more molecules of the chemical compound, monomer, and polymer rather than being limited to a single molecule of the chemical compound, monomer, and polymer. Furthermore, the one or more molecules may or may not be identical, so long as they fall under the category of the chemical compound, monomer, and polymer. Thus, for example, "a" polymer is interpreted to include one or more polymer molecules of the polymer, where the polymer molecules may or may not be identical, e.g., each having a characteristic molecular weight associated with an individual polymer molecule, such the entirety of polymer molecules has a molecular weight, such as a number average molecular weight representative of the population.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as those referred to herein below.

As used herein, the term "electron withdrawing group" means a chemical substituent that draws electrons to it. That is, a specific group that makes the electron density of the parent molecule unevenly distributed when it is attached to the parent molecule. An electron-withdrawing group pulls the electron from the parent molecule toward this group. Specifically, the term electron withdrawing group as used herein includes halides, nitro, trifluoromethyl, CN (nitriles), and carbonyl and derivatives such as COOH (carboxylic acids) and $CONH_2$ (amides). More examples of electron-withdrawing groups can be found in March, Advanced Organic Chemistry, 4th, Wiley Interscience, 1992.

As used herein, the terms "optional" or "optionally" means that the subsequently described event or circumstance can or cannot occur, and that the description includes instances where said event or circumstance occurs and instances where it does not.

The term "alkyl" as used herein is a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including, but not limited to, alkyl, cycloalkyl, alkoxy, amino, nitrile, ether, halide, hydroxy, nitro, silyl, sulfo-oxo, or thiol, as described herein. A "lower alkyl" group is an alkyl group containing from one to six (e.g., from one to four) carbon atoms. The term alkyl group can also be a C1 alkyl, C1-C2 alkyl, C1-C3 alkyl, C1-C4 alkyl, C1-C5 alkyl, C1-C6 alkyl, C1-C7 alkyl, C1-C8 alkyl, C1-C9 alkyl, C1-C10 alkyl, and the like up to and including a C1-C24 alkyl.

The term alkanediyl refers to branched or unbranched saturated hydrocarbon group of 1 to 24 carbon atoms bound by two different carbon atoms to the respective substituents. That is, unless particularly stated otherwise, the term alkanediyl as used herein means a divalent atomic group obtained by extracting two hydrogen atoms from a branched or unbranched saturated hydrocarbon group of 1 to 24 carbon atoms. The alkanediyl group can be cyclic or acyclic. The alkanediyl group can be branched or unbranched. The alkyl group can also be substituted or unsubstituted. For example, the alkanediyl group can be substituted with one or more groups including, but not limited to, alkyl, cycloalkyl, alkoxy, amino, nitrile, ether, halide, hydroxy, nitro, silyl, sulfo-oxo, or thiol, as described herein. A "lower alkanediyl" group is an alkanediyl group containing from one to six (e.g., from one to four) carbon atoms. The term alkanediyl group can also be a C1 alkanediyl, C1-C2 alkanediyl, C1-C3 alkanediyl, C1-C4 alkanediyl, C1-C5 alkanediyl, C1-C6 alkanediyl, C1-C7 alkanediyl, C1-C8 alkanediyl, C1-C9 alkanediyl, C1-C10 alkanediyl, and the like up to and including a C1-C24 alkanediyl.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, norbornyl, and the like. The term "heterocycloalkyl" is a type of cycloalkyl group as defined above, and is included within the meaning of the term "cycloalkyl," where at least one of the carbon atoms of the ring is replaced with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, cycloalkyl, alkoxy, amino, ether, halide, hydroxy, nitro, silyl, sulfo-oxo, or thiol as described herein. In one aspect, the heterocycloalkyl group can be a lactam, including but not limited to an N-substituted lactam.

As used herein, the term, "cycloalkanediyl" refers to a divalent atomic group obtained by extracting two hydrogen atoms from a cycloalkane, i.e., a non-aromatic carbon-based ring composed of at least three carbon atoms. The cycloalkanediyl group can be substituted or unsubstituted. The cycloalkanediyl group can be substituted with one or more groups including, but not limited to, alkyl, cycloalkyl, alkoxy, amino, ether, halide, hydroxy, nitro, silyl, sulfo-oxo, or thiol as known to the skilled artisan.

As used herein, the term, "arylene" refers to divalent aromatic groups having in the range of 3 up to 14 carbon atoms (and optionally one or more heteroatoms such as N, S or O), and "substituted arylene" refers to arylene groups further bearing one or more substituents as set forth above.

The term "carboxylic acid" as used herein is represented by the formula —C(O)OH.

The term "ester" as used herein is represented by the formula —OC(O)$A^1$ or —C(O)O$A^1$, where $A^1$ can be alkyl, cycloalkyl, alkenyl, cycloalkenyl, alkynyl, cycloalkynyl, aryl, or heteroaryl group as described herein. The term "polyester" as used herein is represented by the formula -($A^1$O(O)C-$A^2$-C(O)O)$_a$— or -($A^1$O(O)C-$A^2$-OC(O))$_a$—, where $A^1$ and $A^2$ can be, independently, an alkyl, cycloalkyl, alkenyl, cycloalkenyl, alkynyl, cycloalkynyl, aryl, or heteroaryl group described herein and "a" is an integer from 1 to 500. "Polyester" is as the term used to describe a group that is produced by the reaction between a compound having at least two carboxylic acid groups with a compound having at least two hydroxyl groups.

The terms "halo," "halogen" or "halide," as used herein can be used interchangeably and refer to F, Cl, Br, or I.

The term "heteroaryl" as used herein refers to an aromatic group that has at least one heteroatom incorporated within the ring of the aromatic group. Examples of heteroatoms include, but are not limited to, nitrogen, oxygen, sulfur, and phosphorus, where N-oxides, sulfur oxides, and dioxides are permissible heteroatom substitutions. The heteroaryl group can be substituted or unsubstituted. The heteroaryl group can be substituted with one or more groups including, but not limited to, alkyl, cycloalkyl, alkoxy, amino, ether, halide, hydroxy, nitro, silyl, sulfo-oxo, or thiol as described herein. Heteroaryl groups can be monocyclic, or alternatively fused ring systems. Heteroaryl groups include, but are not limited to, furyl, imidazolyl, pyrimidinyl, tetrazolyl, thienyl, pyridinyl, pyrrolyl, N-methylpyrrolyl, quinolinyl, isoquinolinyl, pyrazolyl, triazolyl, thiazolyl, oxazolyl, isoxazolyl, oxadiazolyl, thiadiazolyl, isothiazolyl, pyridazinyl, pyrazinyl, benzofuranyl, benzodioxolyl, benzothiophenyl, indolyl, indazolyl, benzimidazolyl, imidazopyridinyl, pyrazolopyridinyl, and pyrazolopyrimidinyl. Further not limiting examples of heteroaryl groups include, but are not limited to, pyridinyl, pyridazinyl, pyrimidinyl, pyrazinyl, thiophenyl, pyrazolyl, imidazolyl, benzo[d]oxazolyl, benzo[d]thiazolyl, quinolinyl, quinazolinyl, indazolyl, imidazo[1,2-b]pyridazinyl, imidazo[1,2-a]pyrazinyl, benzo[c][1,2,5]thiadiazolyl, benzo[c][1,2,5]oxadiazolyl, and pyrido[2,3-b]pyrazinyl.

The term "heterocycle" as used herein can be used interchangeably and refer to single and multi-cyclic aromatic or non-aromatic ring systems in which at least one of the ring members is other than carbon. Thus, the term is inclusive of, but not limited to, "heterocycloalkyl," "heteroaryl," "bicyclic heterocycle," and "polycyclic heterocycle." Heterocycle includes pyridine, pyrimidine, furan, thiophene, pyrrole, isoxazole, isothiazole, pyrazole, oxazole, thiazole, imidazole, oxazole, including, 1,2,3-oxadiazole, 1,2,5-oxadiazole and 1,3,4-oxadiazole, thiadiazole, including, 1,2,3-thiadiazole, 1,2,5-thiadiazole, and 1,3,4-thiadiazole, triazole, including, 1,2,3-triazole, 1,3,4-triazole, tetrazole, including 1,2,3,4-tetrazole and 1,2,4,5-tetrazole, pyridazine, pyrazine, triazine, including 1,2,4-triazine and 1,3,5-triazine, tetrazine, including 1,2,4,5-tetrazine, pyrrolidine, piperidine, piperazine, morpholine, azetidine, tetrahydropyran, tetrahydrofuran, dioxane, and the like. The term heterocyclyl group can also be a C2 heterocyclyl, C2-C3 heterocyclyl, C2-C4 heterocyclyl, C2-C5 heterocyclyl, C2-C6 heterocyclyl, C2-C7 heterocyclyl, C2-C8 heterocyclyl, C2-C9 heterocyclyl, C2-C10 heterocyclyl, C2-C11 heterocyclyl, and the like up to and including a C2-C18 heterocyclyl. For example, a C2 heterocyclyl comprises a group which has two carbon atoms and at least one heteroatom, including, but not limited to, aziridinyl, diazetidinyl, dihydrodiazetyl, oxiranyl, thiiranyl, and the like. Alternatively, for example, a C5 heterocyclyl comprises a group which has five carbon atoms and at least one heteroatom, including, but not limited to, piperidinyl, tetrahydropyranyl, tetrahydrothiopyranyl, diazepanyl, pyridinyl, and the like. It is understood that a heterocyclyl group may be bound either through a heteroatom in the ring, where chemically possible, or one of carbons comprising the heterocyclyl ring.

The term "bicyclic heterocycle" as used herein refers to a ring system in which at least one of the ring members is other than carbon. Bicyclic heterocyclyl encompasses ring systems wherein an aromatic ring is fused with another aromatic ring, or wherein an aromatic ring is fused with a non-aromatic ring. Bicyclic heterocyclyl encompasses ring systems wherein a benzene ring is fused to a 5- or a 6-membered ring containing 1, 2 or 3 ring heteroatoms or wherein a pyridine ring is fused to a 5- or a 6-membered ring containing 1, 2 or 3 ring heteroatoms. Bicyclic heterocyclic groups include, but are not limited to, indolyl, indazolyl, pyrazolo[1,5-a]pyridinyl, benzofuranyl, quinolinyl, quinoxalinyl, 1,3-benzodioxolyl, 2,3-dihydro-1,4-benzodioxinyl, 3,4-dihydro-2H-chromenyl, 1H-pyrazolo[4,3-c]pyridin-3-yl; 1H-pyrrolo[3,2-b]pyridin-3-yl; and 1H-pyrazolo[3,2-b]pyridin-3-yl.

The term "heterocycloalkyl" as used herein refers to an aliphatic, partially unsaturated or fully saturated, 3- to 14-membered ring system, including single rings of 3 to 8 atoms and bi- and tricyclic ring systems. The heterocycloalkyl ring-systems include one to four heteroatoms independently selected from oxygen, nitrogen, and sulfur, wherein a nitrogen and sulfur heteroatom optionally can be oxidized and a nitrogen heteroatom optionally can be substituted. Representative heterocycloalkyl groups include, but are not limited to, pyrrolidinyl, pyrazolinyl, pyrazolidinyl, imidazolinyl, imidazolidinyl, piperidinyl, piperazinyl, oxazolidinyl, isoxazolidinyl, morpholinyl, thiazolidinyl, isothiazolidinyl, and tetrahydrofuryl.

The term "nitro" as used herein is represented by the formula —$NO_2$.

The term "nitrile" or "cyano" as used herein is represented by the formula —CN.

The term "thiol" as used herein is represented by the formula —SH.

As described herein, compounds of the invention may contain "optionally substituted" moieties. In general, the term "substituted," whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. In is also contemplated that, in certain aspects, unless expressly indicated to the contrary, individual substituents can be further optionally substituted (i.e., further substituted or unsubstituted).

Compounds described herein comprise atoms in both their natural isotopic abundance and in non-natural abundance. The disclosed compounds can be isotopically-labeled or isotopically-substituted compounds identical to those described, but for the fact that one or more atoms are replaced by an atom having an atomic mass or mass number different from the atomic mass or mass number typically found in nature. Examples of isotopes that can be incorporated into compounds of the invention include isotopes of hydrogen, carbon, nitrogen, oxygen, sulfur, fluorine and chlorine, such as $^2H$, $^3H$, $^{13}C$, $^{14}C$, $^{15}N$, $^{15}O$, $^{17}O$, $^{35}S$, $^{15}F$, and $^{36}Cl$, respectively. Compounds further comprise prodrugs thereof and pharmaceutically acceptable salts of said compounds or of said prodrugs which contain the aforementioned isotopes and/or other isotopes of other atoms are within the scope of this invention. Certain isotopically-labeled compounds of the present invention, for example those into which radioactive isotopes such as $^3H$ and $^{14}C$ are incorporated, are useful in drug and/or substrate tissue distribution assays. Tritiated, i.e., $^3H$, and carbon-14, i.e., $^{14}C$, isotopes are particularly preferred for their ease of preparation and detectability. Further, substitution with heavier isotopes such as deuterium, i.e., $^2H$, can afford certain therapeutic advantages resulting from greater metabolic stability, for example increased in vivo half-life or reduced dosage requirements and, hence, may be preferred in some circumstances. Isotopically labeled compounds of the present invention and prodrugs thereof can generally be prepared by carrying out the procedures below, by substituting a readily available isotopically labeled reagent for a non- isotopically labeled reagent.

In some aspects, a structure of a compound can be represented by a formula:

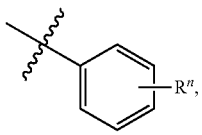

which is understood to be equivalent to a formula:

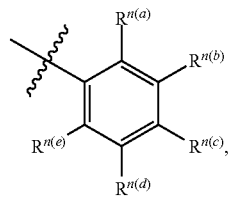

wherein n is typically an integer. That is, $R^n$ is understood to represent five independent substituents, $R^{n(a)}$, $R^{n(b)}$, $R^{n(c)}$, $R^{n(d)}$, and $R^{n(e)}$. By "independent substituents," it is meant that each R substituent can be independently defined. For example, if in one instance $R^{n(a)}$ is halogen, then $R^{n(b)}$ is not necessarily halogen in that instance.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

As used herein, "weight average molecular weight" or Mw is an average molecular weight that takes the molecular weight of a chain into account when determining contribution to the molecular weight average. Thus, a longer polymer chain will contribute more to Mw than will a shorter polymer chain.

As used herein, "number average molecular weight" or Mn refers to the statistical average molecular weight of all polymer chains in a sample. In one aspect, Mn can be predicted by polymerization mechanism. In another aspect, for a given Mn, equal numbers of molecules exist on either side of Mn in the molecular weight distribution.

As used herein, "dispersity" or "polydispersity index" is a measure of the heterogeneity of sizes of polymers in a composition. Dispersity is represented by the symbol Đ, where Đ=Mw/Mn. Đ will always be greater than or equal to 1, but will be larger for polymer chains with widely varying chain lengths and will be closer to 1 for polymer chains with uniform chain length.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

As used herein, the terms "optional" or "optionally" means that the subsequently described event or circumstance can or cannot occur, and that the description includes instances where said event or circumstance occurs and instances where it does not.

The following abbreviations and acronyms are used herein throughout: "CTA" refers to "chain transfer agents"; "HPLC" refers to "high pressure liquid chromatographsy"; "LC" refers to "liquid chromatography" "MALDI" refers to "matrix-assisted laser desorption/ionization"; "MS" refers to mass spectrometry; "NMR" refers to "nuclear magnetic resonance", such as nuclear magnetic resonance spectroscopy; "RCT" refers to "radical cascade-triggered"; "ROMP" refers to "ring-opening metathesis polymerization"; "ROP" refers to "ring opening polymerization"; "SEC" refers to "size exclusion chromatography"; and "TOF" refers to "time-of-flight".

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Unless otherwise specified, temperatures referred to herein are based on atmospheric pressure (i.e. one atmosphere).

B. Disclosed Monomers and Monomer Precursors

In various aspects, the present disclosure pertains to monomer compounds that can be used in the disclosed synthetic methods, e.g., preparation of the disclosed polymers. In a further aspect, the present disclosure pertains to compounds that can be used in the preparation of the disclosed monomers.

In a further aspect, a disclosed monomer prescursor has a structure represented by a formula:

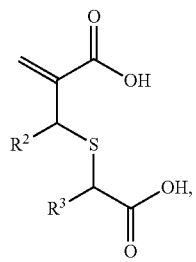

wherein $R^2$ is an aryl group substituted with 1, 2, or 3 electron-withdrawing groups; and wherein $R^3$ is selected from hydrogen, (C1-C16) alkyl, aryl, and heteroaryl. It is understood that the foregoing groups, i.e., alkyl, alkanediyl, aryl, and arylene can be substituted as described herein above.

In a further aspect, a disclosed monomer prescursor has a structure represented by a formula:

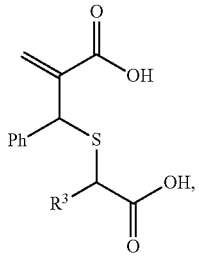

wherein $R^3$ is as defined herein throughout.

In a further aspect, a disclosed monomer prescursor has a structure represented by a formula:

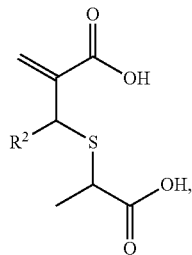

wherein $R^2$ is as defined herein throughout.

In a further aspect, a disclosed monomer prescursor has a structure represented by a formula:

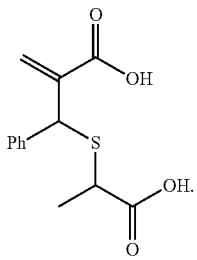 [SMILES: C=C(C(=O)O)C(SC(C)C(=O)O)c1ccccc1]

In a further aspect, a disclosed monomer prescursor has a structure represented by a formula:

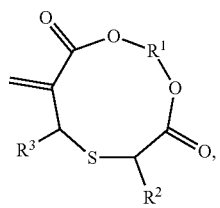

wherein $R^1$ is diyl group selected from —(C1-C16 alkanediyl)-O—(C=O)—$R^{20}$—(C=O)—O—(C1-C6 alkanediyl), —O—(C1-C16 alkanediyl)-O—, —O—(C1-C16 alkanediyl)-(C3-C12 cyclic alkanediyl)-(C1-C16 alkanediyl)-O—, —O—(C1-C16 alkanediyl)-(C3-C12 heterocyclic alkanediyl)-(C1-C16 alkanediyl)-O—, —O—(C1-C16 alkanediyl)-(arylene)-(C1-C16 alkanediyl)-O—, —NH—(C1-C16 alkanediyl)-NH—, —NH—(C1-C16 alkanediyl)-(C3-C12 cyclic alkanediyl)-(C1-C16 alkanediyl)-NH—, —NH—(C1-C16 alkanediyl)-(C3-C12 heterocyclic alkanediyl)-(C1-C16 alkanediyl)-NH—, and —NH—(C1-C16 alkanediyl)-(arylene)-(C1-C16 alkanediyl)-NH—; wherein $R^{20}$ is selected from arylene, a (C1-C12)alkanediyl, and —$R^{21}$—(C1-C16 alkanediyl)-$R^{22}$—; wherein each of $R^{21}$ and $R^{22}$ are independently an arylene; wherein $R^2$ is an aryl group substituted with 1, 2, or 3 electron-withdrawing groups; and wherein $R^3$ is selected from hydrogen, (C1-C16) alkyl, aryl, and heteroaryl. It is understood that the foregoing groups, i.e., alkyl, alkanediyl, aryl, and arylene can be substituted as described herein above.

In a further aspect, a disclosed monomer prescursor has a structure represented by a formula:

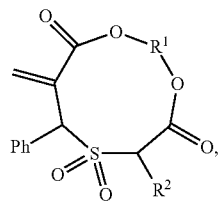

wherein each of $R^1$ and $R^2$ is as defined herein throughout.

In a further aspect, a disclosed monomer prescursor has a structure represented by a formula:

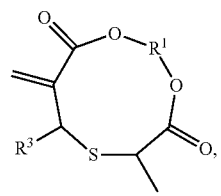

wherein each of $R^1$ and $R^3$ is as defined herein throughout.

In a further aspect, a disclosed monomer prescursor has a structure represented by a formula:

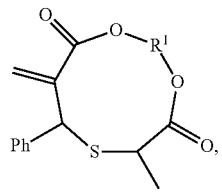

wherein $R^1$ is as defined herein throughout.

In a further aspect, a disclosed monomer prescursor has a structure represented by a formula:

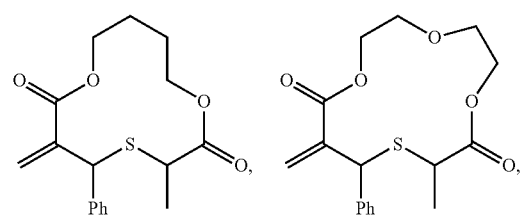

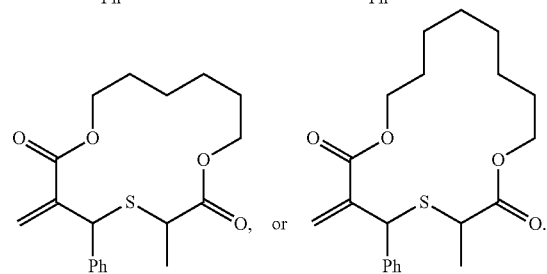

In a further aspect, a disclosed monomer has a structure represented by a formula:

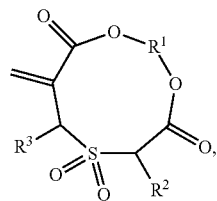

wherein $R^1$ is diyl group selected from —(C1-C16 alkanediyl)-O—(C=O)—$R^{20}$—(C=O)—O—(C1-C6 alkanediyl), —O—(C1-C16 alkanediyl)-O—, —O—(C1-C16 alkanediyl)-(C3-C12 cyclic alkanediyl)-(C1-C16 alkanediyl)-O—, —O—(C1-C16 alkanediyl)-(C3-C12 heterocyclic alkanediyl)-(C1-C16 alkanediyl)-O—, —O—(C1-C16 alkanediyl)-(arylene)-(C1-C16 alkanediyl)-O—, —NH—(C1-C16 alkanediyl)-NH—, —NH—(C1-C16 alkanediyl)-(C3-C12 cyclic alkanediyl)-(C1-C16 alkanediyl)-NH—, —NH—(C1-C16 alkanediyl)-(C3-C12 heterocyclic alkanediyl)-(C1-C16 alkanediyl)-NH—, and —NH—(C1-C16 alkanediyl)-(arylene)-(C1-C16 alkanediyl)-NH—; wherein $R^{20}$ is selected from arylene, a (C1-C12)alkanediyl, and —$R^{21}$—(C1-C16 alkanediyl)-$R^{22}$—; wherein each of $R^{21}$ and $R^{22}$ are independently an arylene; wherein $R^2$ is an aryl group substituted with 1, 2, or 3 electron-withdrawing groups; and wherein $R^3$ is selected from hydrogen, (C1-C16) alkyl, aryl, and heteroaryl. It is understood that the foregoing groups, i.e., alkyl, alkanediyl, aryl, and arylene can be substituted as described herein above.

In a further aspect, a disclosed monomer prescursor has a structure represented by a formula:

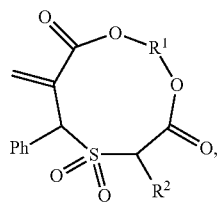

wherein each of $R^1$ and $R^2$ is as defined herein throughout.

In a further aspect, a disclosed monomer prescursor has a structure represented by a formula:

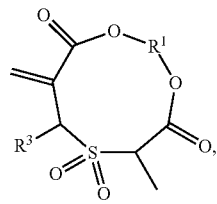

wherein each of $R^1$ and $R^3$ is as defined herein throughout.

In a further aspect, a disclosed monomer prescursor has a structure represented by a formula:

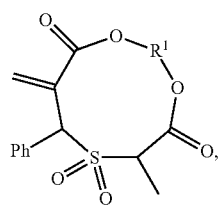

wherein R¹ is as defined herein throughout.

In a further aspect, a disclosed monomer prescursor has a structure represented by a formula:

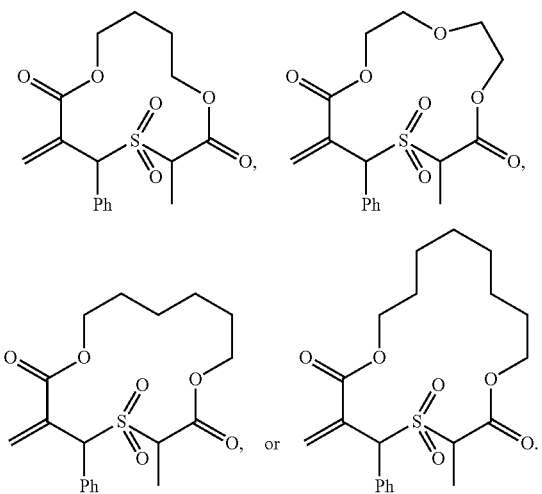

In a further aspect, R¹ is diyl group selected from an aromatic functionality, a fluorinated functionality, or a bio-based functionality; wherein an aromatic functionality is a group having structure represented by a formula:

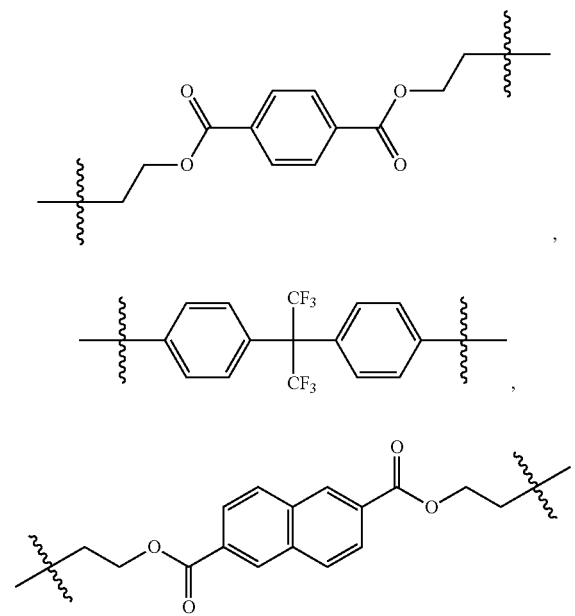

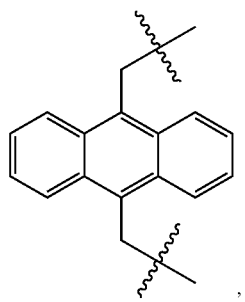

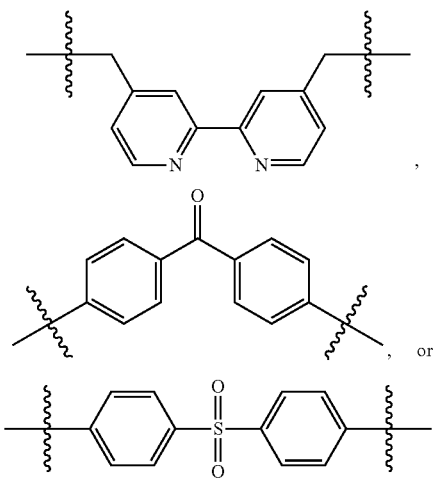

wherein a fluorinated functionality is a group having structure represented by a formula:

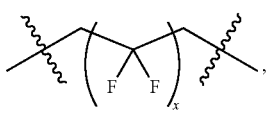

wherein x is an integer having a value of 2-100; wherein a bio-based functionality is a group having structure represented by a formula:

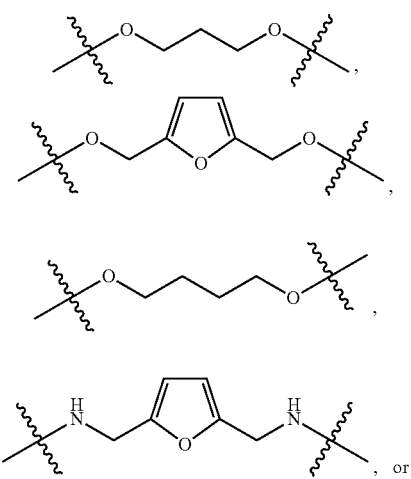

-continued

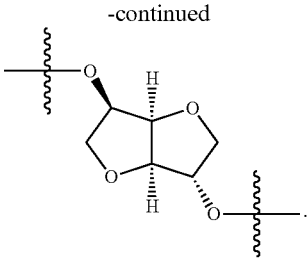

In a further aspect, $R^2$ is a group having structure represented by a formula:

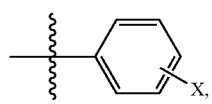

wherein X is an electron withdrawing group or not present. In a further aspect, X is nitro, halo, trifluoromethyl, or cyano. In a still further aspect, $R^2$ is unsubstituted phenyl.

In a further aspect, $R^3$ is methyl, ethyl, propyl, isopropyl, butyl, sec-butyl, iso-butyl, phenyl, benzyl, naphthyl, pyridinyl, pyrimidinyl, or triazinyl. In a still further aspect, $R^3$ is methyl, ethyl, propyl, isopropyl, butyl, sec-butyl, iso-butyl, phenyl, or pyridinyl. In a yet further aspect, $R^3$ is methyl, ethyl, propyl, isopropyl, butyl, sec-butyl, iso-butyl, or phenyl. In an even further aspect, $R^3$ is methyl, ethyl, propyl, isopropyl, butyl, sec-butyl, or iso-butyl. In a still further aspect, $R^3$ is methyl, ethyl, propyl, or isopropyl. In a yet further aspect, $R^3$ is methyl or ethyl. In an even further aspect, $R^3$ is methyl.

C. Disclosed Chain Transfer Agents

In various aspects, the present disclosure pertains to chain transfer agents that can be used in the disclosed synthetic methods, e.g., preparation of the disclosed polymers. In a further aspect.

In a further aspect, a disclosed chain transfer agent has a structure represented by a formula:

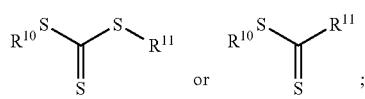

wherein $R^{10}$ is a group having a structure represented by a formula:

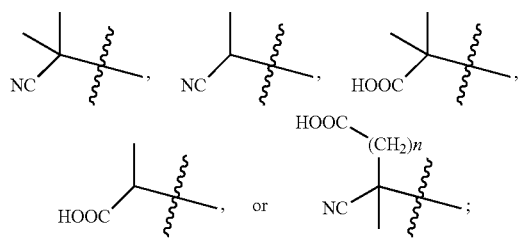

wherein n is integer having a value of 1, 2, 3, 4, 5, or 6; and, wherein $R^{11}$ is a group such as phenyl or a C2-C12 alkyl group. In some aspects, $R^{11}$ is phenyl, ethyl, or —$C_{12}H_{25}$.

In a further aspect, a disclosed chain transfer agent has a structure represented by a formula:

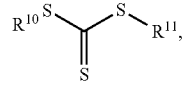

wherein each of $R^{10}$ and $R^{11}$ are defined as described herein above.

In a further aspect, a disclosed chain transfer agent has a structure represented by a formula:

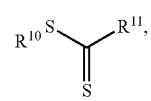

wherein each of $R^{10}$ and $R^{11}$ are defined as described herein above.

In a further aspect, a disclosed chain transfer agent has a structure represented by a formula:

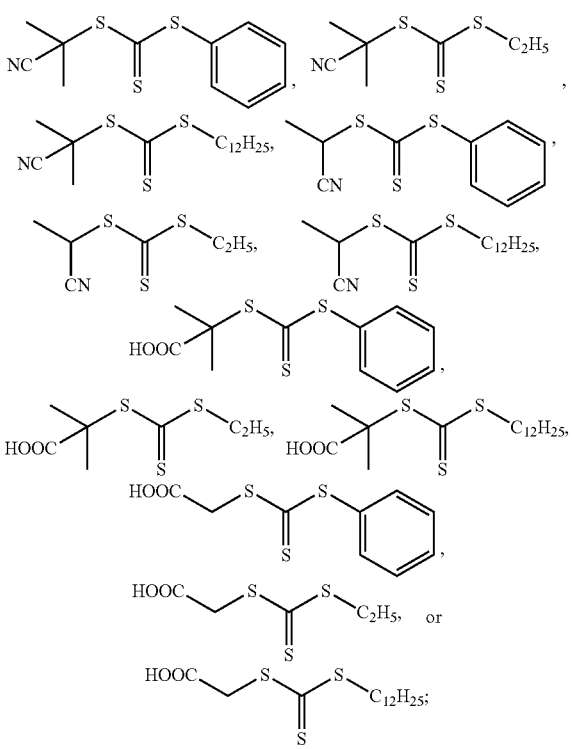

or any combination thereof; or a subset thereof.

In a further aspect, a disclosed chain transfer agent has a structure represented by a formula:

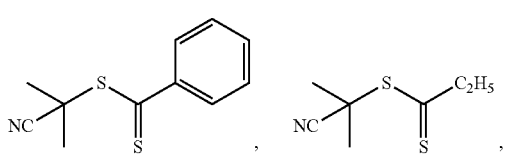

-continued

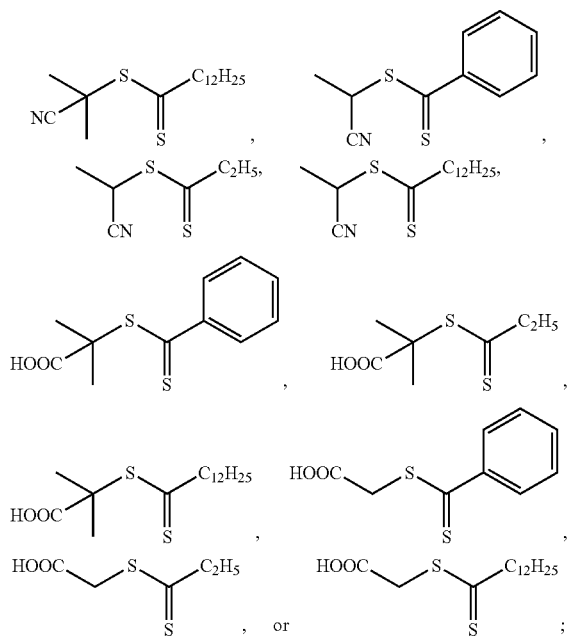

or any combination thereof; or a subset thereof.

In a further aspect, a disclosed chain transfer agent has a structure represented by a formula:

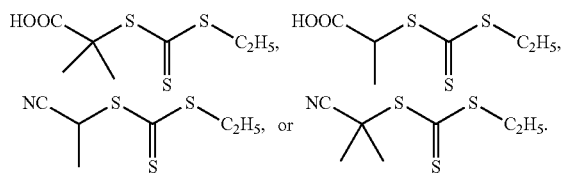

In a further aspect, a disclosed chain transfer agent has a structure represented by a formula:

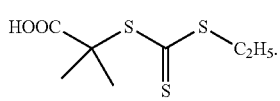

D. Disclosed Polymers

The present disclosure provides new polymer materials that have not existed before, including: 1) a new class of extended fluorinated structural motifs to allow assembly into defined nanometer-scale patterns, 2) mechanochromic polymers incorporating large mechanophores in the polymer backbone, 3) glycomimetic polymers incorporating large glycan in the polymer backbone to mimic the structures of natural glycans, and 4) antibiotic polymers incorporating extended antibiotic peptide structures in the polymer backbone.

In various aspects, a disclosed polymer, prepared using the disclosed methods, has a structure represented by formula:

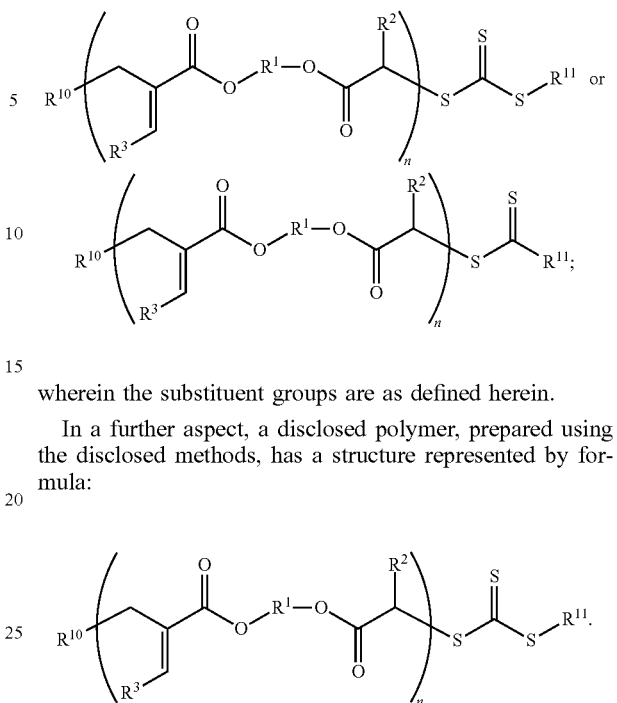

wherein the substituent groups are as defined herein.

In a further aspect, a disclosed polymer, prepared using the disclosed methods, has a structure represented by formula:

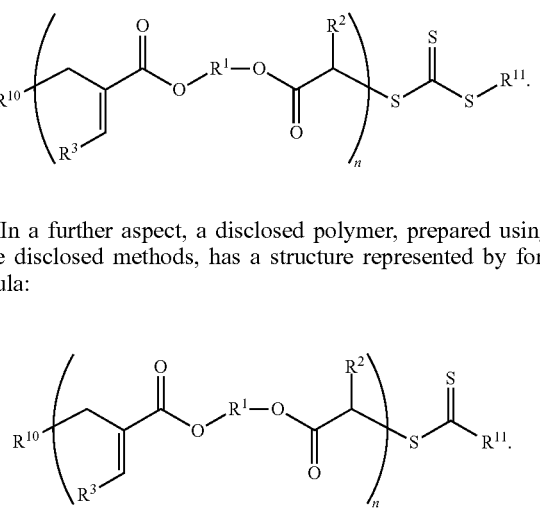

In a further aspect, a disclosed polymer, prepared using the disclosed methods, has a structure represented by formula:

In a further aspect, a disclosed polymer, prepared using the disclosed methods, has a structure represented by formula:

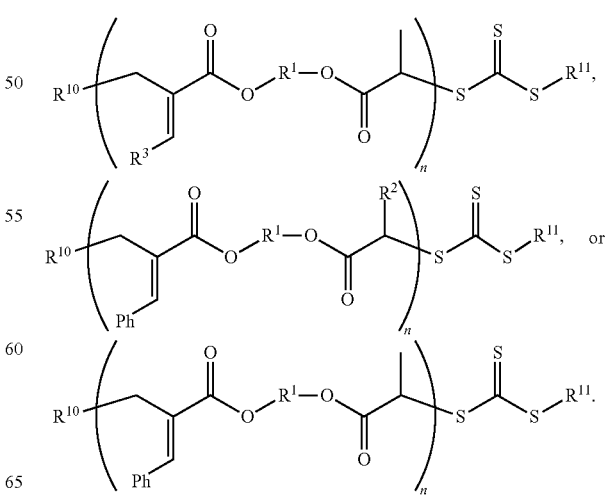

In a further aspect, a disclosed polymer, prepared using the disclosed methods, has a structure represented by formula:

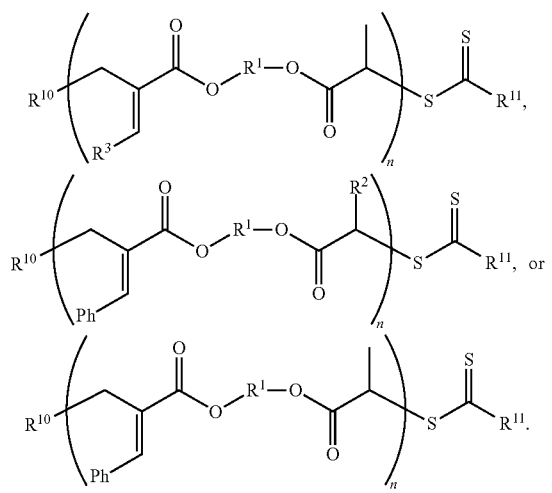

In a further aspect, specific examples of disclosed polymers prepared using the disclosed methods are polymers having a structure represented by formula:

E. Synthetic Methods

The polymerization described in the present disclosure can be used to form a wide variety of well-defined copolymers (block copolymers, random copolymers, etc.) with other acrylic monomers significantly broadening the scope of polymer structures that can be made. In addition, the polymerization described in the present disclosure can be used to prepare block copolymers of multiple different macrocyclic monomers. No such capabilities were demonstrated previously.

The present disclosure provides a new approach that is advantageous in that it allows an unprecedented capability of controlled ring-opening polymerization of macrocyclic monomers with low ring strain. Previous techniques for controlled radical polymerization can only use small acyclic and strained cyclic monomers. The present disclosure provides a new concept of using radical cascade reaction to enable ring-closing and ring-opening polymerization, making it a novel irreversible process to enable excellent control and fast reaction kinetics. This concept is fundamentally different from the existing paradigm of radical polymerization reactions.

This present disclosure provides the following three distinct advantages compared to the triggered ROMP system: (1) the present disclosure describes a radical polymerization approach that has been shown to have a broad functional

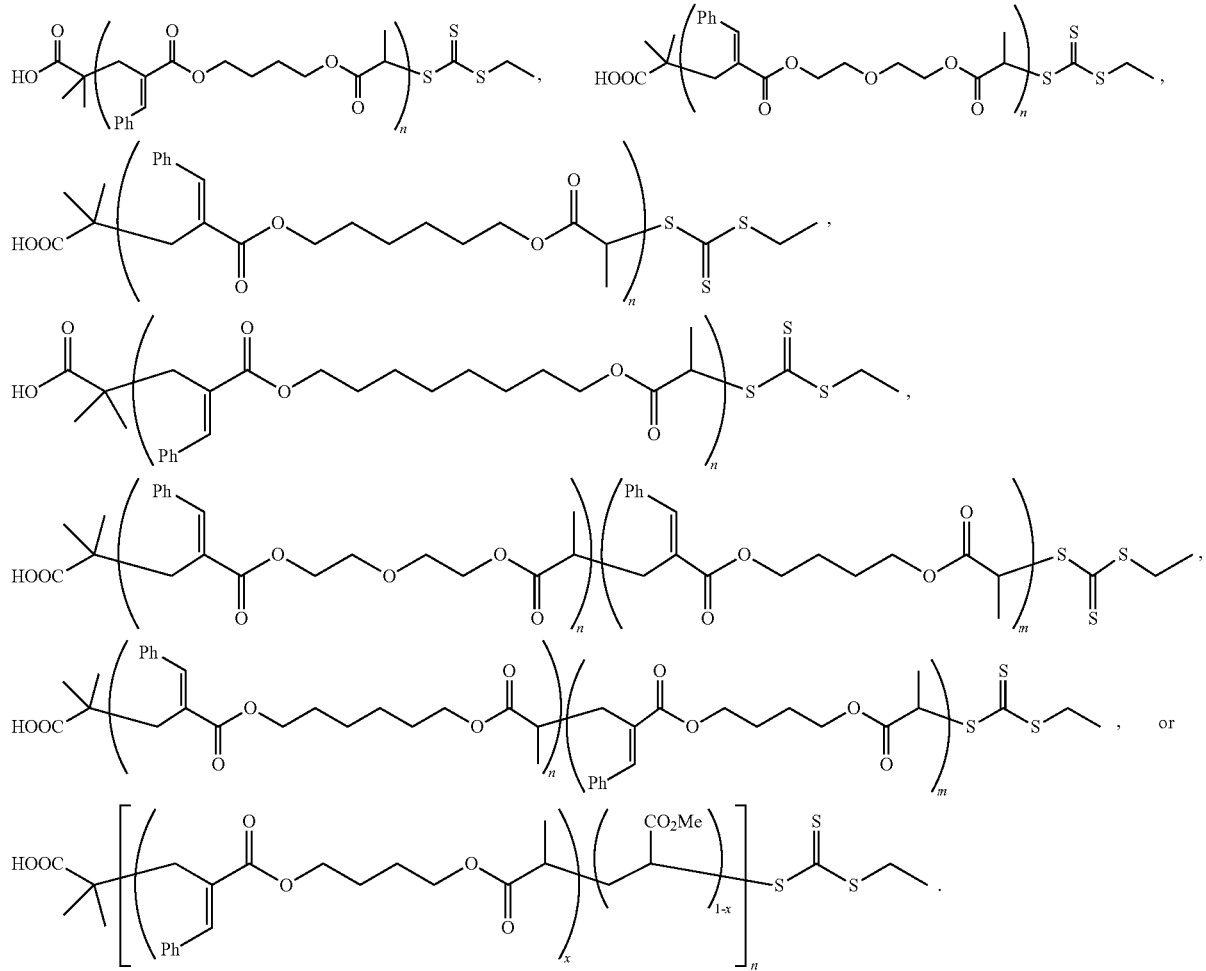

group compatibility; (2) the novel radical polymerization approach described in the present disclosure can be applied to prepare a wide variety of well-defined copolymers, including block copolymers, random copolymers, etc.; (3) the radical cascade reaction to extrude gaseous $SO_2$ make the ring opening irreversible, allowing fast reaction kinetics and excellent chain end fidelity.

The compounds and polymers of this disclosure can be prepared by employing reactions as shown in the disclosed syntheses, in addition to other standard manipulations that are known in the literature, exemplified in the experimental sections or clear to one skilled in the art. For clarity, examples having fewer substituents can be shown where multiple substituents are allowed under the definitions disclosed herein. Thus, the following examples are provided so that the disclosure might be more fully understood, are illustrative only, and should not be construed as limiting.

It is contemplated that each disclosed method can further comprise additional steps, manipulations, and/or components. It is also contemplated that any one or more step, manipulation, and/or component can be optionally omitted from the disclosure. It is understood that a disclosed method can be used to provide the disclosed compounds. It is also understood that the products of the disclosed methods can be employed in the disclosed compositions, kits, and uses.

In one aspect, a useful intermediate for the preparation of a monomer of the present disclosure can be prepared generically by the synthesis scheme as shown below. All positions are as defined herein. In the scheme below, the PG is a carboxylic acid protecting group. Any suitable carboxylic acid protecting group can be used as an ester, e.g., a methyl, t-butyl, or benzyl ester; an ester of a 2,6-disubstituted phenol, e.g., 2,6-dimethylphenol, 2,6-diisopropylphenol, 2,6-di-tert-butylphenol; a silyl ester; an orthoester; or a oxazoline protecting group. Suitable carboxylic acid protecting groups and reaction conditions can be determined by the skilled artisan by consulting an appropriate reference, e.g., T. W. Green, P. G. M. Wuts, Protective Groups in Organic Synthesis, Wiley-Interscience, New York, 1999, at pages 372-381, 383-387, and 728-731.

SCHEME 1A

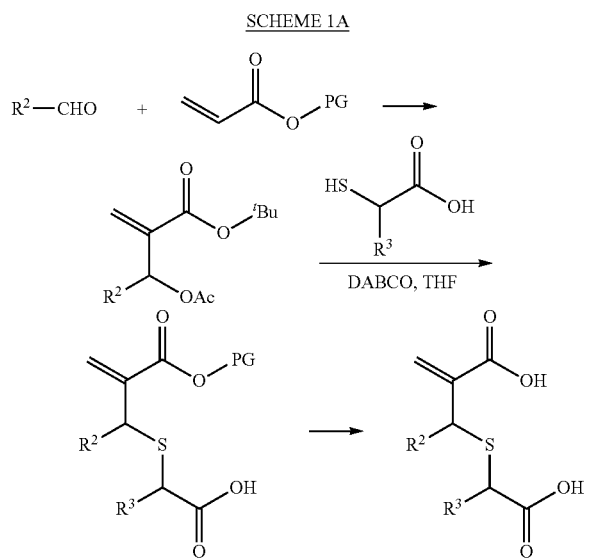

Compounds are represented in generic form, with substituents as noted in compound descriptions elsewhere herein. A more specific example is set forth below.

Scheme 1B

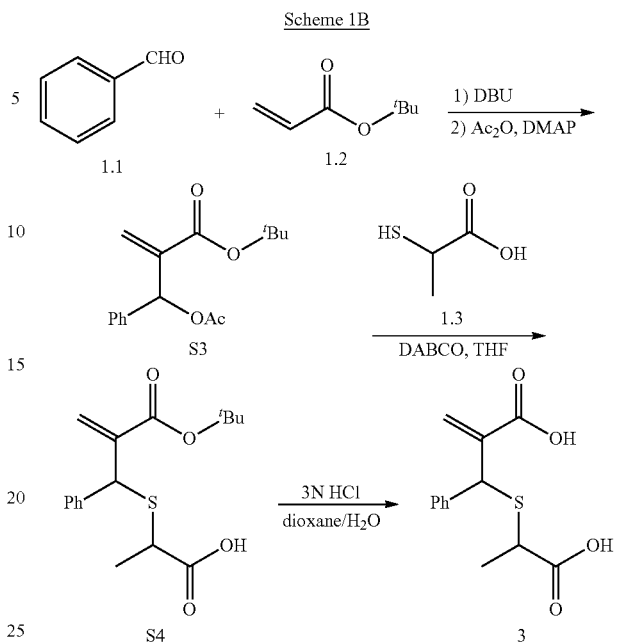

In various aspects, a monomer precursor, such as compound 3, can be prepared using the foregoing reaction being with a suitable aldehyde, such as benzaldehyde (compound 1.1), reacted with a protected alkenyl carboxylic acid, such as a tert-butyl acrylate (compound 1.2), and a suitable non-nucleophilic base, e.g., 1,8-diazabicyclo[5.4.0]undec-7-ene, with stirring a suitable temperature for a suitable period of time e.g., at about room temperature for about 96 h. Suitable relative amounts can be as described in the Examples herein below. The reaction can be worked up as deemed appropriate by the skilled artisan or as described herein below in the Examples. The isolated reaction product in a suitable solvent, e.g., dichloromethane, is then cooled to a suitable temperature, e.g., about 0° C., and to this is added a suitable anhydride, e.g., acetic anhydride. The reaction mixture is then warmed to a suitable temperature, e.g., about 20-30° C., and stirred for a suitable period of time, e.g., 6-12 hours. The reaction mixture can be worked up as deemed appropriate by the skilled artisan or as described herein below in the Examples to yield the target product, compound S3.

To a well-stirred solution of compound S3 in a suitable solvent, e.g., tetrahydrofuran, a suitable base-catalyst is added, e.g., 1,4-diazabicyclo[2.2.2]octane, followed by stirring a suitable temperature for a suitable period of time at a suitable temperature, e.g., about 20-30° C. for about 30 min. A suitable mercaptocarboxylic acid is added, e.g., 2-mercaptopropionic acid (compound 1.3), to the foregoing mixture, and stirring continued for a suitable period of time at a suitable temperature, e.g., about 20-30° C. for about 60 min. The reaction can be worked up as deemed appropriate by the skilled artisan or as described herein below in the Examples to yield the desired product, compound S4.

Then, to a solution of compound S4 in a suitable solvent, e.g., 1,4-dioxane, a suitable acid is added, e.g., 6 N HCl. The reaction mixture is then heated at reflux temperature for a suitable period of time, e.g., about 2 hours. After cooled to room temperature, can be worked up as deemed appropriate by the skilled artisan or as described herein below in the Examples to yield the desired product, compound 3.

In one aspect, a monomer of the present disclosure can be prepared generically by the synthesis scheme as shown below.

SCHEME 2A

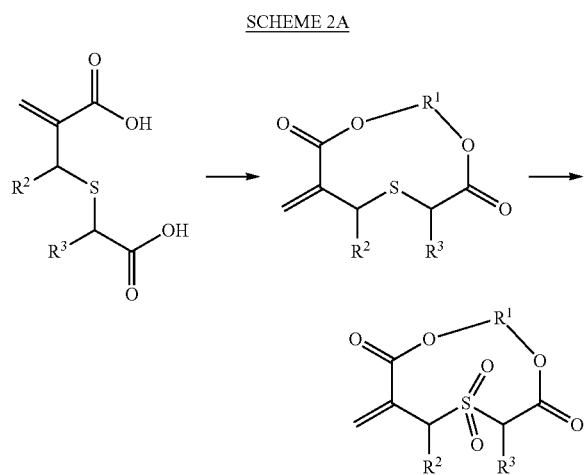

Compounds are represented in generic form, with substituents as noted in compound descriptions elsewhere herein. A more specific example is set forth below.

Scheme 2B

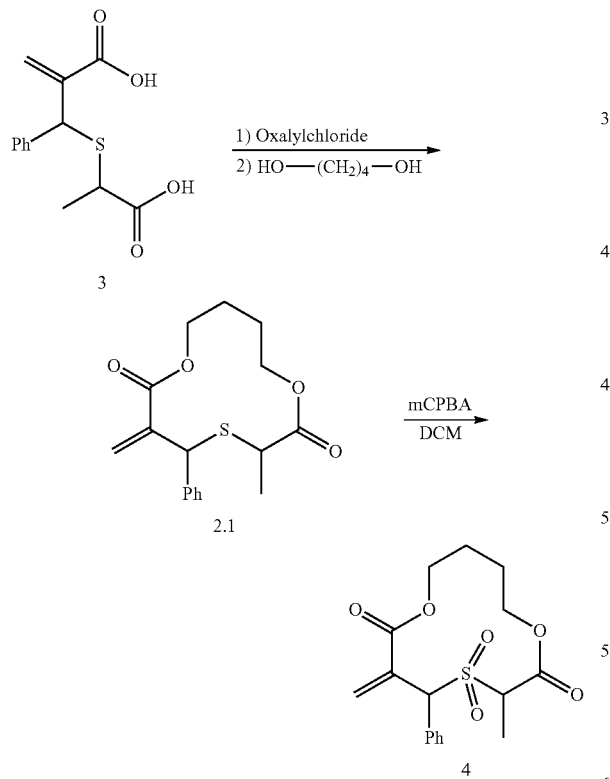

A disclosed monomer, e.g., compound 4, can be prepared by the foregoing reaction. Briefly, compound 3 is dissolved in a suitable dry solvent, e.g., dichloromethane, and cooled to a suitable temperature, e.g., about 0° C., followed by slow addition of an appropriate acylating agent, e.g., oxalylchloride. After complete addition, a suitable catalyst, e.g., DMF, is added, followed by continued stirring for a suitable period of time, e.g., about 2 hours. The solvent is then removed under reduced pressure, and the remaining material is immediately dissolved in a suitable dry solvent, e.g., dichloromethane. A suitable diol, e.g., 1,4-dibutanol, is dissolved in a suitable dry solvent, e.g., dry THF and dry dichloromethane. Both solutions are then added to one another in a controlled manner, e.g., via a syringe pump, to a solution of pyridine in dry dichloromethane over a suitable period of time, e.g., about 90 min. After completed, the solution can be stirred for an additional suitable period of time, e.g., about 30 min. The solvent is concentrated under reduced pressure to provide pyridinium chloride salts. The residue is removed by filtration, and the supernatant worked up as deemed appropriate by the skilled artisan or as described herein below in the Examples to yield the desired product, compound 2.1. This product can then directly be subjected to oxidation following dissolution in an appropriate solvent, dichloromethane, and a suitable oxidizing agent, e.g., mCPBA, is added and the reaction allowed to proceed for a suitable period of time at a suitable temperature, e.g. about 2 hours at about 20-30° C. The desired product can be isolated by suitable means, e.g., removal of the solvent by evaporation and purification of the remaining residue using flash column chromatography. Suitable relative amounts in the foregoing can be as described in the Examples herein below, or as determined by the skilled artisan.

In one aspect, a polymer of the present disclosure can be prepared generically by the synthesis schemes as shown below.

SCHEME 3A

SCHEME 3B

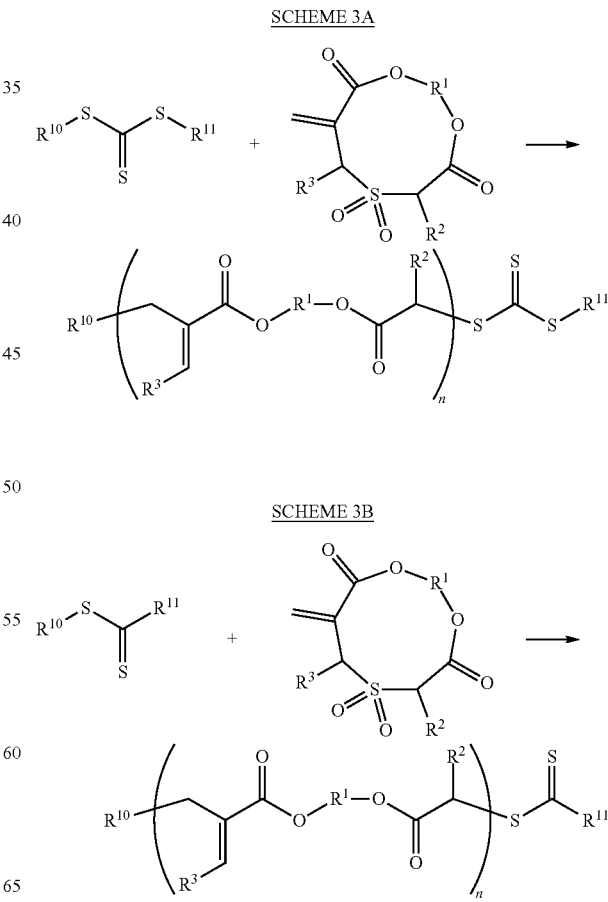

Polymers are represented in generic form, with substituents as noted in compound descriptions elsewhere herein. A more specific example is set forth below.

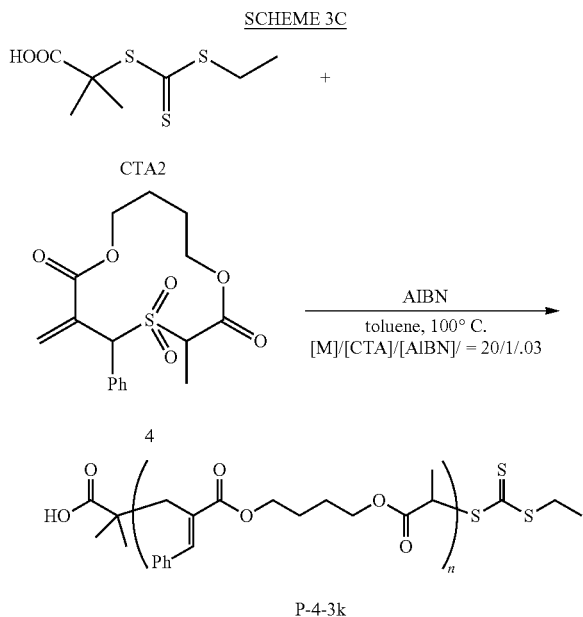

A disclosed polymer can be prepared by methods such as those described above and in the Examples herein below. The disclosed methods can be suitably modified and varied based upon the disclosure herein, and as determined by the skilled artisan in view of the present disclosure. Briefly, polymerization reactions are performed under nitrogen atmosphere and can utilize a standard Schlenk technique. A stock solution of a suitable CTA, e.g., (((ethylthio)carbonothioyl)thio)-2-methylpropanoic acid (compound CTA2), and stock solution of a suitable radical initiator or photocatalyst, e.g., AIBN, are prepared in a suitable degassed solvent, e.g., degased toluene, at a suitable concentration, e.g., about 5-20 mM. The reaction can then be heated at a suitable temperature, e.g., about 60-100° C., for a suitable period of time, e.g., about 1-24 hours. After reaction, the vial was cooled by ice bath and open to air to stop the polymerization. The desired product, compound P-4-3k, can be isolated by suitable means, e.g., precipitation. The product polymer can be characterized methods such as SEC, $^1$H-NMR and $^{13}$C-NMR. Suitable relative amounts in the foregoing can be as described in the Examples herein below, or as determined by the skilled artisan.

Block copolymers are contemplated by the present disclosure, and can utilize a polymer or macroinitiator prepared by the foregoing method in a second reaction involving the polymer reacted with a disclosed monomer. An exemplary block copolymer of the present disclosure can be prepared by the generalized reaction below using the methods as described herein above and in the Examples, e.g., as described for the preparation of diblock copolymer P-5-b-P-4 and P-6-b-P-4 in the Examples.

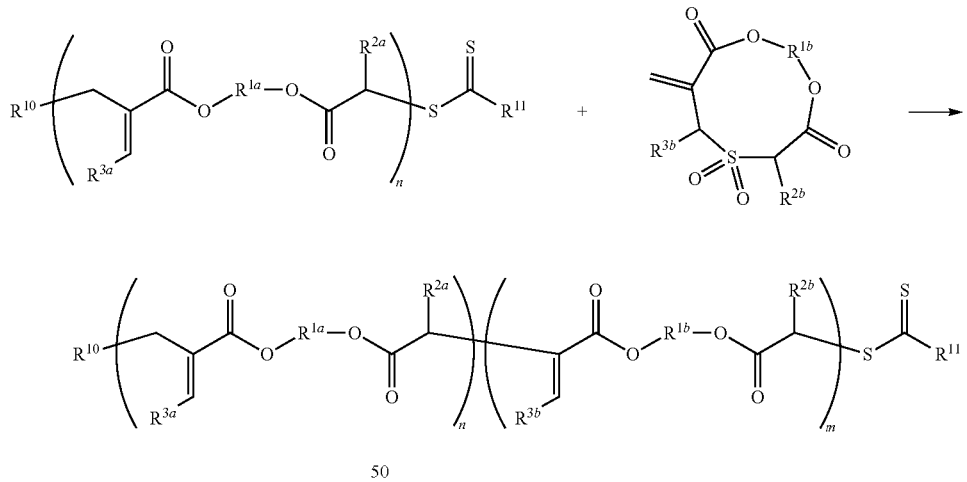

Alternatively, an exemplary block copolymer of the present disclosure can be prepared by the generalized reaction below using the methods as described herein above and in the Examples, e.g., as described for the preparation of diblock copolymer P-5-b-P-4 and P-6-b-P-4 in the Examples.

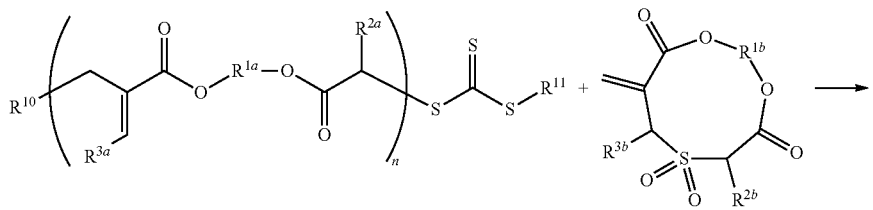

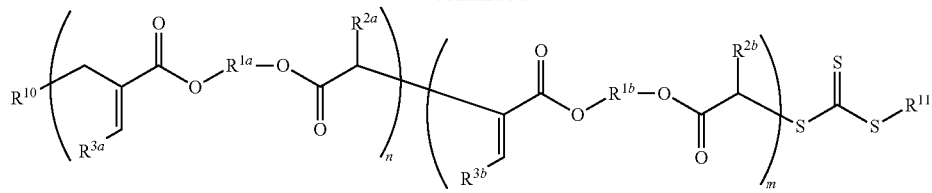

-continued

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Figure 14A:
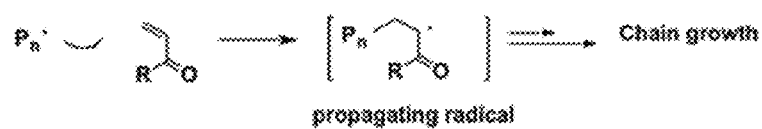
FIGS. 14A-14C show various reaction mechanisms.
Figure 14B:
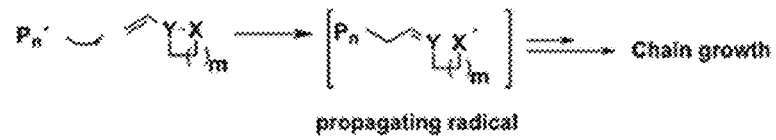

Over the recent decades, controlled radical polymerization has emerged as a powerful technique for the preparation of functional polymers with well-defined architectures. However, despite the successful incorporation of a plethora of functional pendant groups, traditional controlled radical polymerization techniques have been limited to simple vinyl (acrylic, methacrylic, and styrenic) monomers (FIG. 14A), resulting in major constraints on the structural and functional scope of the main-chain functional groups of the synthetic polymers generated by these techniques. Ring-opening polymerization (ROP) is a powerful approach to enable the incorporation of diverse functional groups into the polymer backbone, but so far the majority of ROP reactions through a controlled radical mechanism still require highly strained cyclic monomers (FIG. 14B), limiting their utility in incorporating extended main-chain structural motifs into synthetic polymers.

To overcome this limitation, the present disclosure provides a general strategy for the synthesis of precision polymers with complex main-chain structures. The major challenge for this vision is that it is kinetically and thermodynamically disfavored toward the incorporation of complex main-chain structural motifs via radical polymerization. Inspired by the radical cascade reaction, a widely used approach for carbon skeleton construction in small molecule synthesis, in which substrates undergo sequential radical processes to form or cleave chemical bonds, the present disclosure provides a novel strategy based on the radical cascade reaction to provide the driving force for the incorporation of complex main-chain structural motifs via radical polymerization.

Figure 14C:
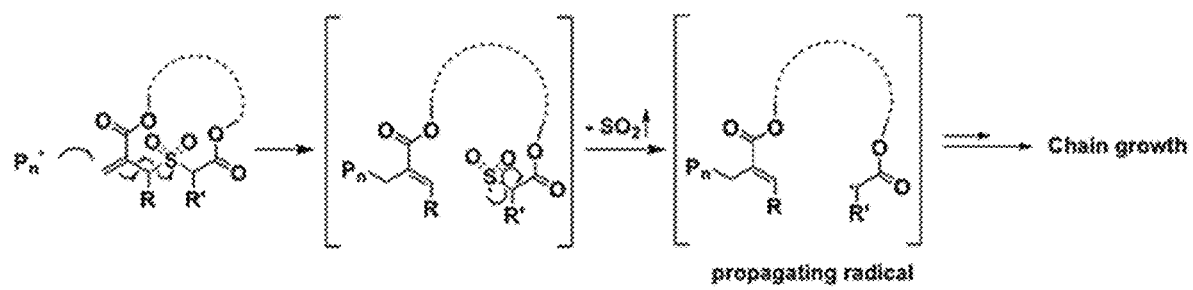
Figure 15A:
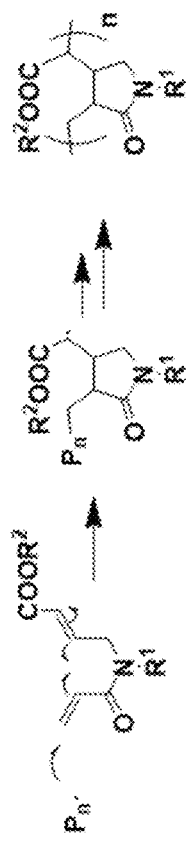
FIGS. 15A-15D show the mechanism of radical cascade ring-closing polymerization and radical cascade-triggered ring-opening polymerization in accordance with the present disclosure.
Figure 15B:
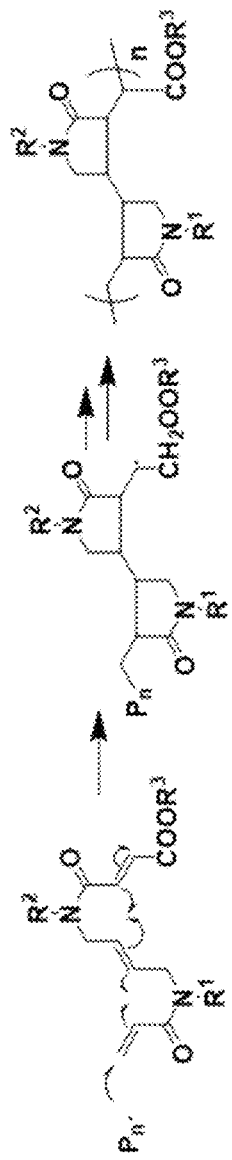
Figure 15C:
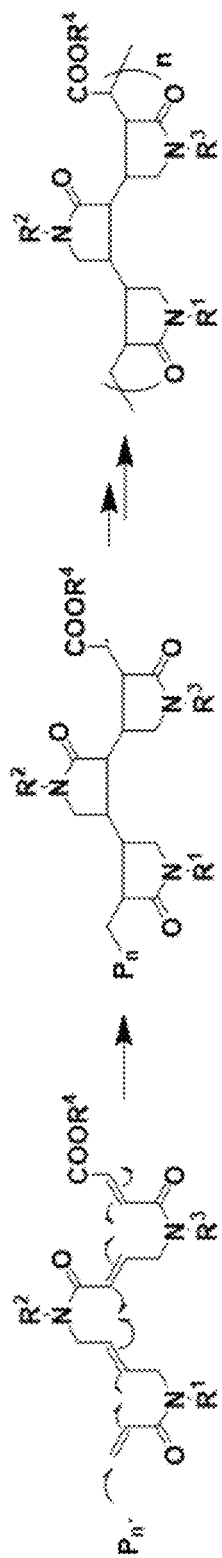
Figure 15D:
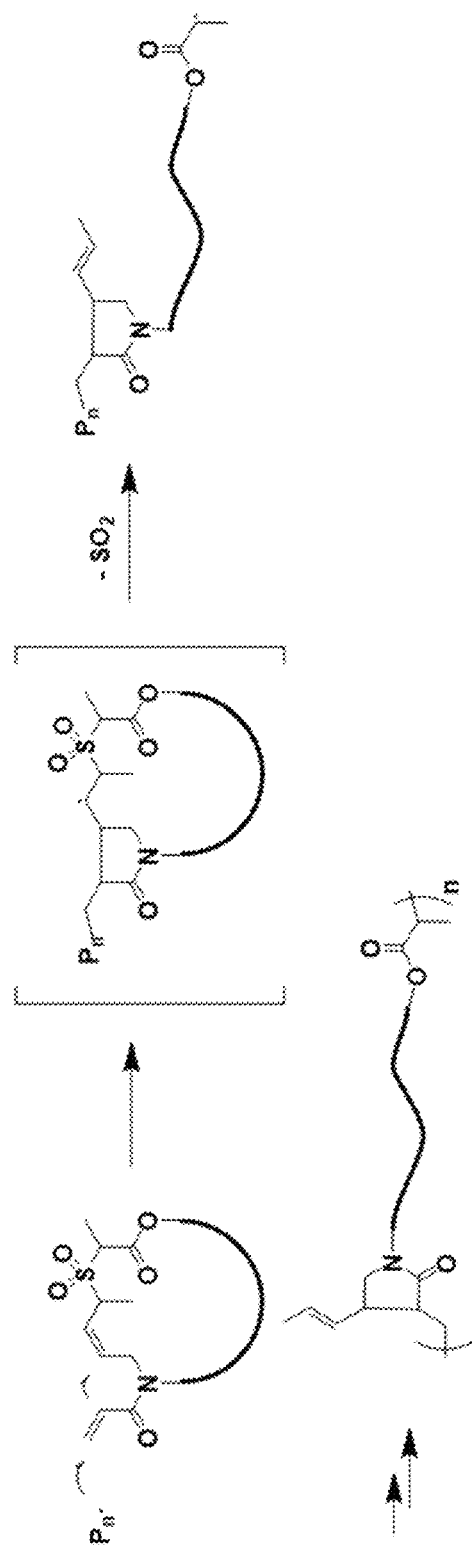

In certain embodiments, the present disclosure provides a series of radical cascade-enabled polymerization strategies, including radical cascade ring-closing polymerization (FIGS. 15A-15C) and radical cascade-triggered ring-opening polymerization (FIG. 14C and FIG. 15D).

The polycyclization of squalene in nature and in laboratories to generate steroid suggests that the polyene structures can undergo rapid radical cascade cyclization reactions. Based on this principle, a model monomer was designed to incorporate 1,6-diene such that the radical attack at the terminal vinyl group can lead to 2,6-cyclization and the formation of a five-membered ring and a secondary radical stabilized by the adjacent carbonyl group. The secondary alkyl radical can then serve as a propagating radical for the chain-growth polymerization (FIG. 15A). Alternatively, the initial 2,6-cyclization can be coupled with other kinetic- or thermodynamic-driven reactions, increasing the number of total cascade sequences. For example, monomers capable of cascade reactions consisting of two and three consecutive 2,6-cyclization steps can be designed, with the cascade ending with a carbonyl-stabilized secondary radical for chain-growth polymerization (FIGS. 15B and 15C). By varying the pendant groups of each 1,6-diene unit, the polymerization of these polyene monomers will generate novel chain-growth, sequence-controlled periodic polymers with defined periodicity.

In other embodiments, the present disclosure provides that the ring-opening trigger was designed such that when attacked by a radical, it can undergo a radical cascade reaction starting with β-elimination to form a sulfonyl radical intermediate, followed by rapid desulfonation to extrude a molecule of $SO_2$, resulting in a secondary alkyl radical stabilized by an adjacent carbonyl group capable of chain propagation (FIG. 14C). By irreversibly extruding gaseous $SO_2$, this radical cascade-triggered-ROP process provides a strong thermodynamic and kinetic driving force for ring opening. Crucially, the "stable" secondary alkyl radical next to a carbonyl group is structurally similar to the propagating acrylic chain end (FIGS. 14A and 14C) and is hypothesized to enable controlled chain growth via existing controlled radical polymerization techniques.

The allylsulfone ring-opening trigger can also be coupled with polyenes capable of the radical 2,6-cyclization cascade in a macrocyclic monomer (FIG. 15D). The polymerization of this type of monomers could lead to periodic polymers with even more complex main-chain structures consisting of both a motif of defined pendant group sequence and an extended main-chain functional motif.

F. Examples

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The following examples are provided to illustrate embodiments of the present invention but are by no means intended to limit its scope.

The examples described herein will be understood by one of ordinary skill in the art as exemplary protocols. One of ordinary skill in the art will be able to modify the below procedures appropriately and as necessary.

Example 1

Methods and Experimental Procedures

Materials

The organic solvents such as tetrahydrofuran (THF), toluene, chlorobenzene 1, 4-dioxane, Dimethyl sulfoxide (DMSO) and dimethyformamide (DMF) were purchased from Sigma-Aldrich and used as received. Chain transfer regents were prepared according to the reported procedures. Azobis (isobutyronitrile) (AIBN) was purchased from Sigma-Aldrich and was recrystallized from methanol before use. All other reagents were purchased from either Aldrich, Alfa Aesar or Acros and used without further purification. Thin layer chromatography was performed on Merck TLC plates (silica gel 60 F254). Column chromatography was carried out using an automated column (Biotage).

Characterization $^1$H and $^{13}$C NMR spectra were recorded in CDCl$_3$, unless otherwise noted, on either a Varian Gemini-600 (600 MHz) or Varian (nova-500 (500 MHz) spectrometer using residual chloroform ($\delta$=7.26 for $^1$H and $\delta$=77.16 for $^{13}$C) as internal standard. High-resolution mass spectrometry was performed on a JEOL AccuTOF DART Micromass LCT ESI-MS and an Agilent 6220 Time-of-Flight LC/MS instruments. Matrix-assisted laser desorption/ionization time-of-flight (MALDI-TOF) mass spectrometry was performed on an Applied Biosystem Voyager DE instrument (positive mode). Size-exclusion chromatography (SEC) measurements were performed on an Tosoh's high performance SEC system HLC-8320GPC with TSKgel Alpha-M columns at 50° C. and a flow rate of 1 mL/min. HPLC grade dimethylformamide (DMF) with 0.01 M LiBr (anhydrous, purchased from Sigma-Aldrich) was used as the eluent. Polystyrene standards (ReadyCal Kit, Sigma-Aldrich #81434) were used to determine the molecular weight and molecular weight distribution of polymers. The polymers were dissolved in the above DMF solution and filtered through a 0.20 μm PTFE filter before being injected into the SEC system.

EXPERIMENTAL PROCEDURES

Synthesis of Compound 1

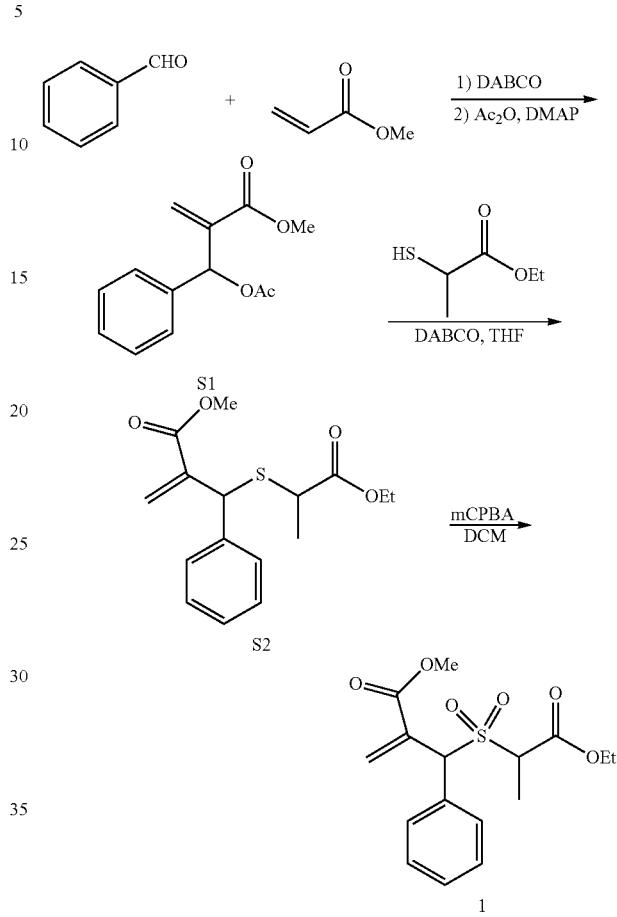

Following a slightly modified procedure, the reaction mixture of benzaldehyde (5.31 g, 50.0 mmol), methyl acrylate (8.61 g, 100.0 mmol) and 1,4-diazabicyclo[2.2.2]octane (2.80 g, 25.0 mmol) was stirred at room temperature for 24 h. The reaction was subsequently diluted with ethyl acetate (50 mL) and washed with 1 M HCl (3×30 mL), brine (30 mL) and dried over Na$_2$SO$_4$, then concentrated to give a yellow liquid. This yellow liquid was dissolved in dichloromethane (30 mL), followed by addition of acetic anhydride (7.1 mL, 75.0 mmol) and N,N-dimethylaminopyridine (1.22 g, 10.0 mmol). The reaction mixture was stirred at room temperature for 12 h. The solvent was then removed under reduced pressure. The residue was purified by flash column chromatography to give a yellow liquid S1 (5.10 g, 44% yield). $^1$H NMR (500 MHz, CDCl$_3$): δ 7.39-7.27 (m, 5H), 6.68 (s, 1H), 6.39 (s, 1H), 5.86 (s, 1H), 3.70 (s, 3H), 2.10 (s, 3H); $^{13}$C NMR (125 MHz, CDCl3): δ 169.5, 165.5, 139.8, 137.9, 128.5, 128.5, 127.7, 125.8, 73.2, 52.1, 21.2.

To a well-stirred solution of methyl 2-[acetoxy(phenyl) methyl]prop-2-enoate S1 (1.0 g, 4.3 mmol) in tetrahydrofuran (20 mL) 1,4-diazabicyclo[2.2.2]octane (575 mg, 5.2 mmol) was added. The mixture was stirred at room temperature for 30 min, followed by the addition of ethyl 2-sulfanylpropanoate (573 mg, 4.3 mmol). After stirring for 1 h at room temperature, the reaction mixture was slowly poured into water (20 mL) and extracted with dichloromethane (3×30 mL). The combined organic layers were washed with brine (30 mL), dried over $Na_2SO_4$ and concentrated in vacuo. The crude material was purified by flash column chromatography to give a colorless oil S2 (926 mg, 96% yield). $^1$H NMR (600 MHz, CDCl3): (major isomer) δ 7.41 (d, J=7.8 Hz, 2H), 7.34-7.22 (m, 3H), 6.40 (s, 1H), 5.95 (s, 1H), 5.31 (s, 1H), 4.19-4.09 (m, 2H), 3.72 (s, 3H), 3.16 (qd, J=7.2, 1.7 Hz, 1H), 1.36 (d, J=7.2 Hz, 3H), 1.30 (t, J=7.1 Hz, 3H); $^{13}$C NMR (150 MHz, CDCl$_3$): (major isomer) δ 172.9, 166.2, 140.5, 139.6, 128.6, 127.7, 127.4, 61.4, 52.3, 48.9, 41.5, 17.0, 14.3; HRMS (m/z) [M+H]$^+$ calculated for $C_{16}H_{21}O_4S$, 309.1155, found 309.1160.

S2 (500 mg, 1.6 mmol) was dissolved in dichloromethane (20 mL), and 77% mCPBA (1.07 g, 4.8 mmol) was added. After stirring for 2 h at room temperature, the solvent was evaporated and the residue was purified by flash column chromatography to give a colorless oil, compound 1 (450 mg, 82% yield). $^1$H NMR (500 MHz, CDCl3): δ 7.65-7.61 (m, 2H), 7.45-7.34 (m, 3H), 6.71 (s, 1H), 6.66 (s, 1H), 6.28 (s, 1H), 4.41-4.24 (m, 2H), 3.89-3.80 (m, 1H), 3.77 (s, 3H), 1.48 (d, J=7.3 Hz, 3H), 1.41 (t, J=7.1 Hz, 3H); $^{13}$C NMR (125 MHz, CDCl$_3$): δ 165.9, 165.8, 132.5, 132.1, 131.1, 130.3, 129.5, 129.2, 64.9, 62.9, 59.7, 52.8, 14.1, 9.3; HRMS (m/z) [M+H]$^+$ calculated for $C_{16}H_{21}O_6S$, 341.1053, found 341.1056.

Synthesis of Monomer Fragment 3

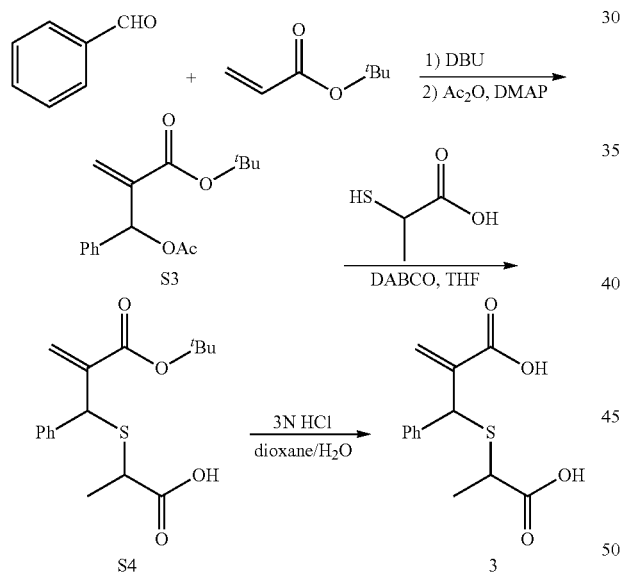

Following a slightly modified procedure, the reaction mixture of benzaldehyde (53.1 g, 0.5 mol), tert-butyl acrylate (64.1 g, 0.5 mmol) and 1,8-diazabicyclo[5.4.0]undec-7-ene (45.7 g, 0.3 mol) was stirred at room temperature for 96 h. The reaction was diluted with ethyl acetate (100 mL). The organic phase was washed with 3 M HCl (5×50 mL), brine (50 mL) and dried by $Na_2SO_4$, then concentrated. The residue benzaldehyde and tert-butyl acrylate were distilled away under reduced pressure to give yellow liquid (61.1 g). To the ice-cooled solution of this product (61.1 g, 260.8 mmol) in dichloromethane (50 mL) was added acetic anhydride (30.0 mL, 313.0 mmol) and N,N-dimethylaminopyridine (6.4 g, 52.2 mmol). The reaction mixture was warmed to room temperature and stirred overnight. The reaction mixture was then washed with 1 M HCl (2×50 mL), brine (50 mL) and dried over Na2SO4, filtered, and concentrated in vacuo. The residue was purified by flash column chromatography to give a yellow liquid S3 (56.3 g, 42% yield). 1H NMR (500 MHz, CDCl$_3$): δ 7.38-7.27 (m, 5H), 6.64 (s, 1H), 6.32 (t, J=1.1 Hz, 1H), 5.72 (t, J=1.4 Hz, 1H), 2.10 (s, 3H), 1.37 (s, 9H); $^{13}$C NMR (125 MHz, CDCl$_3$): δ 169.5, 164.3, 141.2, 138.1, 128.4, 128.4, 127.9, 124.8, 81.5, 73.5, 28.0, 21.2.

To a well-stirred solution of tert-butyl 2-[acetoxy(phenyl)methyl]prop-2-enoate S3 (13.82 g, 50.0 mmol) in tetrahydrofuran (30 mL), 1,4-diazabicyclo[2.2.2]octane (6.73 g, 60.0 mmol) was added and stirred at room temperature for 30 min. Followed by addition 20 mL 2-mercaptopropionic acid (5.31 g, 50.0 mmol) and 1,4-diazabicyclo[2.2.2]octane (5.61 g, 50.0 mmol) mixture THF solution. After stirring for 1 h at room temperature, the solvent was evaporated under reduced pressure, then diluted with ethyl acetate (50 mL), the organic solution was washed with 3 M HCl (3×30 mL) and brine (30 mL), dried by $Na_2SO_4$, filtered, and concentrated in vacuo. The crude product was purified by column chromatography to afford a colorless oil S4 (13.1 g, 81% yield). $^1$H NMR (500 MHz, CDCl3): (major isomer) δ 7.41 (d, J=7.5 Hz, 2H), 7.28 (dt, J=36.1, 7.3 Hz, 3H), 6.33 (s, 1H), 5.85 (s, 1H), 5.27 (s, 1H), 3.14 (q, J=7.2 Hz, 1H), 1.39 (s, 9H), 1.36 (d, J=7.2 Hz, 3H); 13C NMR (125 MHz, CDCl$_3$): (major isomer) δ 179.1, 164.9, 141.9, 139.6, 128.7, 128.6, 127.6, 126.3, 81.6, 49.3, 40.9, 28.0, 16.8; HRMS (m/z) [M+H]$^+$ calculated for $C_{17}H_{23}O_4S$, 323.1312, found 323.1311.

To a solution of S4 (13.1 g, 40.6 mmol) in 1,4-dioxane (12 ml), 6 N HCl (12 ml) was added. The reaction mixture was reflux at 100° C. for 2 h. After cooled to room temperature, water (100 ml) was added and the solution was extracted with ethyl acetate (2×50 ml). The organic layer was washed with brine (3×50 mL), dried by $Na_2SO_4$, filtered, and concentrated in vacuo to give the white solid 3 (10.2 g, 95% yield). $^1$H NMR (500 MHz, CDCl3): (major isomer) δ 7.48 (d, J=7.7 Hz, 2H), 7.33 (dt, J=28.0, 7.5 Hz, 3H), 6.50 (s, 1H), 5.84 (s, 1H), 5.41 (s, 1H), 3.18 (q, J=7.2 Hz, 1H), 1.35 (d, J=7.2 Hz, 3H); $^{13}$C NMR (125 MHz, CDCl$_3$): (major isomer) δ 179.9, 171.5, 140.2, 139.1, 129.7, 128.8, 128.7, 127.9, 48.7, 41.3, 16.5; HRMS (m/z) [M+NH$_4$]$^+$ calculated for $C_{13}H_{18}NO_4S$, 284.0951, found 284.0952.

General Procedure for Synthesis of Macrocyclic Monomers

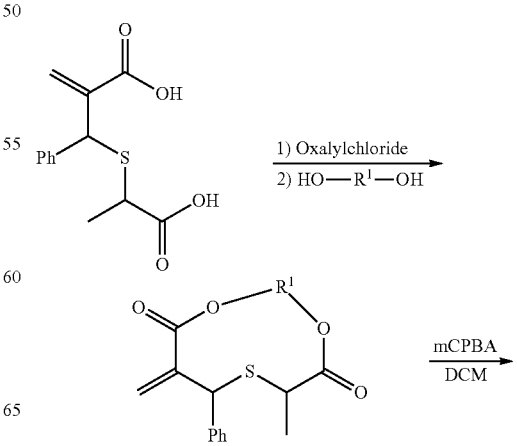

-continued

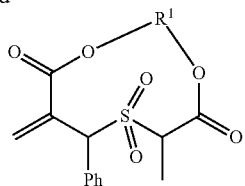

Following a slightly modified procedure, 3 (1.0 eq.) was dissolved in dry dichloromethane (30 mL), which was cooled to 0° C. Oxalylchloride (4 eq.) was added slowly. After complete addition, three drops of DMF was added. The solution was left stirring for 2 h. The solvent was then removed under reduced pressure and the remaining oil was immediately dissolved in dry dichloromethane (30 mL) and transferred into a syringe. Diol (1.0 eq.) was dissolved in dry THF (10 mL) and dry dichloromethane (20 mL), and transferred into another syringe. Both solutions were added via a syringe pump to a solution of pyridine (5.0 eq.) in dry dichloromethane (180 mL) over 90 min. After completed, the solution was left stirring for another 30 min. The solvent was concentrated under reduced pressure, yielding brown pyridinium chloride salts. The residue was filtered and the supernatant was diluted with DCM (25 mL) and washed with 1M HCl. Subsequent concentration in vacuo and purification via column chromatography yielded a colorless oil. The colorless oil was then directly subjected to oxidation. The colorless oil (1.0 eq.) was dissolved in dichloromethane (20 mL), and 77% mCPBA (1.0 eq.) was added. After stirring for 2 h at room temperature, the solvent was evaporated and the residue was purified by flash column chromatography.

Preparation of Corn Pound 4 (3-Methyl-6-Methylene-5-Phenyl-1,8-Dioxa-4-thiacyclododecane-2,7-dione 4,4-dioxide)

4

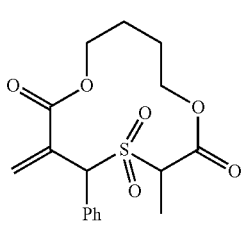

Figure 28:
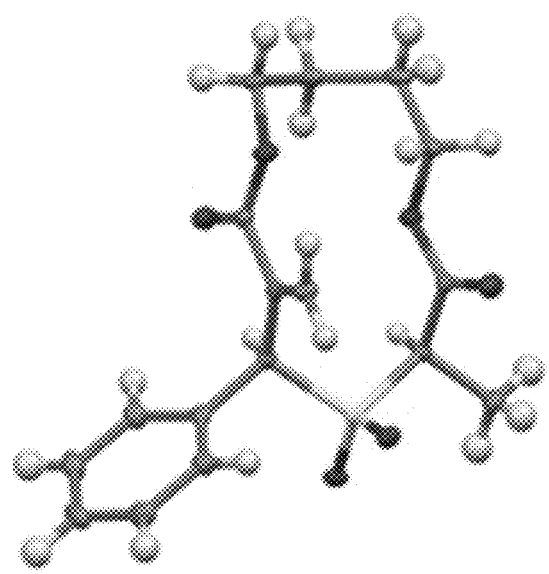
FIG. 28 provides a molecular structure for compound 4 represented using a ball-and-stick model.

Following the general procedure, the reaction of 3 (6.2 g, 23.3 mmol) and 1,4-butanediol (2.10 g, 23.3 mmol) afforded macrocyclic monomer 4 as a white solid (0.87 g, 11% total yield). $^1$H NMR (500 MHz, CDCl3): (major isomer) δ 7.67-7.59 (m, 2H), 7.46-7.37 (m, 3H), 6.69 (s, 1H), 6.30 (s, 1H), 6.18 (s, 1H), 4.49-4.27 (m, 4H), 3.85 (q, J=8.4, 7.8 Hz, 1H), 2.19-1.79 (m, 5H), 1.57 (d, J=7.3 Hz, 3H); 13C NMR (125 MHz, CDCl3): (major isomer) δ 166.8, 165.3, 132.9, 132.8, 131.1, 130.7, 129.5, 129.1, 67.0, 66.7, 66.0, 61.3, 25.8, 25.1, 10.2; HRMS (m/z) [M+H]$^+$ calculated for C$_{17}$H$_{21}$O$_6$S, 353.1053, found 353.1039. The colorless crystalloid of 4 were obtained via slow solvent evaporation from a toluene solution of the compound at room temperature (the crystallographic data see Table 1). A representative spatial model of compound 4 is given in FIG. 28.

Preparation of Compound 5 (9-methyl-12-methylene-11-phenyl-1,4,7-trioxa-10-thiacyclotridecane-8,13-dione 10,10-dioxide)

5

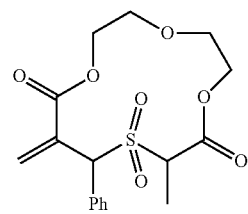

Following the general procedure, the reaction of 3 (2.0 g, 7.5 mmol) and 2-(2-hydroxyethoxy)ethanol (797.0 mg, 7.5 mmol) afforded macrocyclic monomer 5 as a white solid (312 mg, 12% total yield). $^1$H NMR (500 MHz, CDCl$_3$): (major isomer) δ 7.73-7.66 (m, 2H), 7.48-7.39 (m, 3H), 6.72 (s, 1H), 6.45 (s, 1H), 6.26 (s, 1H), 4.77-4.70 (m, 1H), 4.53 (dd, J=12.1, 4.7 Hz, 1H), 4.44 (dd, J=12.1, 7.9 Hz, 1H), 4.17-4.08 (m, 1H), 3.93-3.66 (m, 5H), 1.48 (d, J=7.4 Hz, 3H).; $^{13}$C NMR (125 MHz, CDCl$_3$): (major isomer) δ 166.0, 165.0, 132.9, 132.6, 132.1, 130.5, 129.6, 129.4, 69.6, 69.2, 65.9, 65.6, 63.6, 59.8, 9.3; HRMS (m/z) [M+H]$^+$ calculated for C$_{17}$H$_{21}$O$_7$S, 369.1003, found 369.1002.

Preparation of Compound 6 (3-methyl-6-methylene-5-phenyl-1,8-dioxa-4-thiacyclotetradecane-2,7-dione 4,4-dioxide)

6

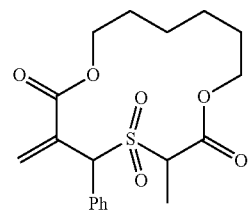

Following the general procedure, the reaction of 3 (4.26 g, 16.0 mmol) and 1,6-hexanediol (1.89 g, 16.0 mmol) afforded macrocyclic monomer 6 as a white solid (426 mg, 7% total yield). $^1$H NMR (600 MHz, CDCl3): (major isomer) δ 7.63 (d, J=7.8 Hz, 2H), 7.47-7.39 (m, 3H), 6.82 (s, 1H), 6.47 (s, 1H), 6.23 (s, 1H), 4.52-4.46 (m, 1H), 4.42-4.35 (m, 1H), 4.35-4.29 (m, 1H), 4.22-4.15 (m, 1H), 3.82 (q, J=8.1, 7.5 Hz, 1H), 1.94-1.52 (m, 8H), 1.48 (d, J=8.3 Hz, 3H); $^{13}$C NMR (150 MHz, CDCl$_3$): (major isomer) δ 165.9, 165.1, 133.3, 132.5, 132.3, 130.1, 129.6, 129.4, 67.7, 66.5, 65.6, 59.2, 28.3, 27.3, 26.1, 25.9, 9.0; HRMS (m/z) [M+H]$^+$ calculated for C$_{19}$H$_{25}$O$_6$S, 381.1366, found 381.1368.

Preparation of Compound 7 (3-methyl-6-methylene-5-phenyl-1,8-dioxa-4-thiacyclohexadecane-2,7-dione 4,4-dioxide)

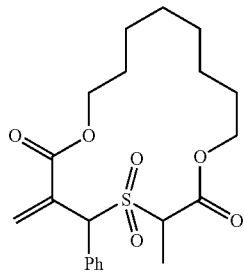

7

Following the general procedure, the reaction of 3 (4.50 g, 16.9 mmol) and 1,8-octanediol (2.47 g, 16.9 mmol) afforded macrocyclic monomer 7 as a colorless oil (230 mg, 4% total yield). $^1$H NMR (500 MHz, CDCl$_3$): (major isomer) δ 7.65 (dd, J=7.7, 1.7 Hz, 2H), 7.46-7.36 (m, 3H), 6.76 (s, 1H), 6.55 (s, 1H), 6.11 (s, 1H), 4.44 (dt, J=11.3, 5.8 Hz, 1H), 4.32-4.20 (m, 3H), 3.88 (q, J=7.4 Hz, 1H), 1.81-1.35 (m, 15H); $^{13}$C NMR (125 MHz, CDCl$_3$): (major isomer) δ 166.3, 165.4, 132.6, 132.5, 131.8, 130.3, 129.5, 129.3, 67.1, 66.0, 65.0, 59.5, 28.5, 28.2, 27.3, 26.5, 24.3, 23.7, 9.3; HRMS (m/z) [M+H]$^+$ calculated for C$_{21}$H$_{29}$O$_6$S, 409.1679, found 409.1670.

Synthesis of Macrocyclic Monomer 11

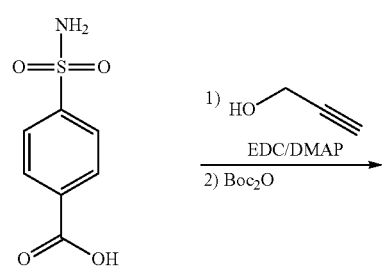

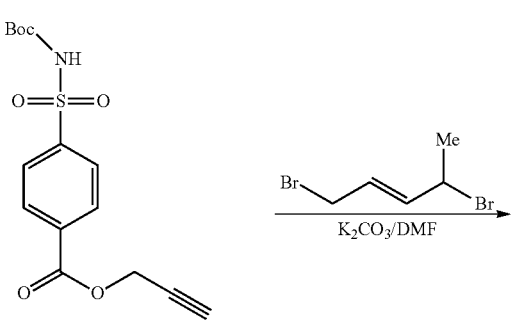

6

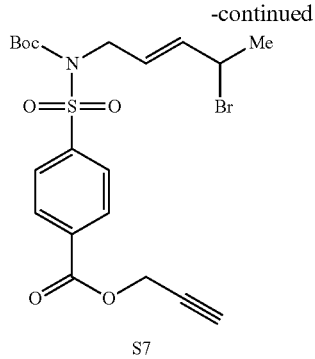

S7

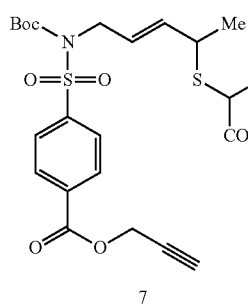

7

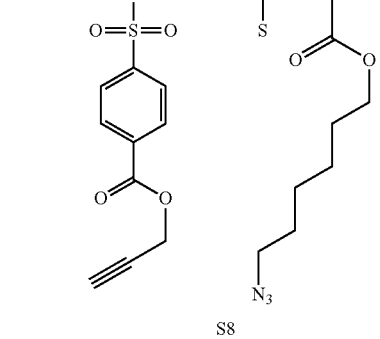

S8

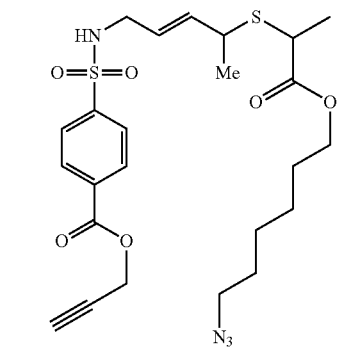

8

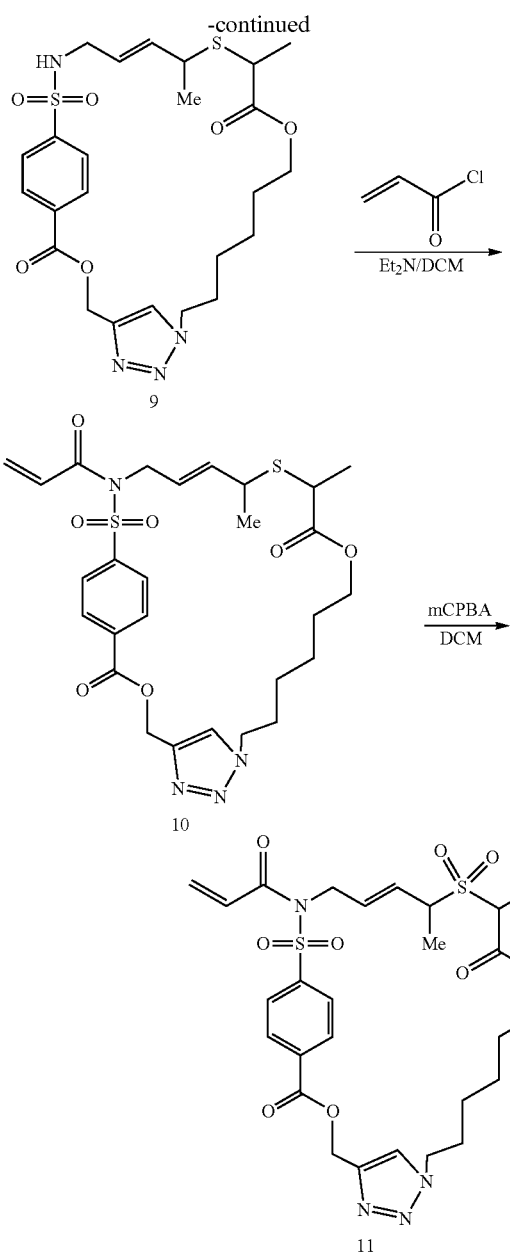

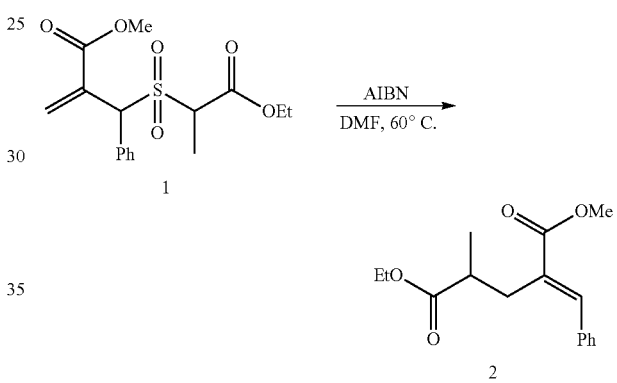

Table 1 below shows crystal structure data and structure refinement for macrocyclic monomer 4.

TABLE 1

| Parameter | Value |
|---|---|
| Identification code | C$_{17}$H$_{20}$O$_6$S |
| Empirical formula | C$_{17}$ H$_{20}$ O$_6$ S |
| Formula weight | 352.39 |
| Temperature | 100(2) K |
| Wavelength | 1.54178 Å |
| Crystal system | Monoclinic |
| Space group | Cc |
| Unit cell dimensions | a = 10.9830(4) Å; α = 90°. |
| | b = 16.5417(7) Å; β = 102.9790(10)°. |
| | c = 9.7709(6) Å; γ = 90°. |
| Volume | 1729.80(14) Å$^3$ |
| Z | 4 |
| Density (calculated) | 1.353 Mg/m$^3$ |
| Absorption coefficient | 1.927 mm$^{-1}$ |

TABLE 1-continued

| Parameter | Value |
|---|---|
| F(000) | 744 |
| Crystal size | 0.280 × 0.140 × 0.080 mm$^3$ |
| Theta range for data collection | 4.922 to 68.399°. |
| Index ranges | −12 <= h <= 13, −18 <= k <= 19, −11 <= l <= 11 |
| Reflections collected | 6434 |
| Independent reflections | 2724 [R(int) = 0.0214] |
| Completeness to theta = 67.679° | 99.7% |
| Absorption correction | Semi-empirical from equivalents |
| Max. and min. transmission | 0.7531 and 0.6429 |
| Refinement method | Full-matrix least-squares on F$^2$ |
| Data/restraints/parameters | 2724/2/218 |
| Goodness-of-fit on F$^2$ | 1.019 |
| Final R indices [I > 2sigma(I)] | R1 = 0.0248, wR2 = 0.0639 |
| R indices (all data) | R1 = 0.0250, wR2 = 0.0642 |
| Absolute structure parameter | 0.071(6) |
| Extinction coefficient | n/a |
| Largest diff. peak and hole | 0.251 and −0.268 e. Å$^{-3}$ |

Radical Reaction of Compound 1

A 10 mL Schlenk vial equipped with a stir bar was charged with 1 (34.0 mg, 0.1 mmol), AIBN (8.2 mg, 0.05 mmol) and DMF (1.0 mL). The vial was sealed and the solution was deoxygenated via three freeze-pump-thaw cycles and then backfilled with nitrogen. The reaction mixture was heated at 60° C. for 10 h, yielding the product 2 as a colorless oil (75% yield). $^1$H NMR (600 MHz, CDCl$_3$): δ 7.75 (s, 1H), 7.41-7.29 (m, 5H), 4.09-3.98 (m, 2H), 3.82 (s, 3H), 2.95 (dd, J=13.4, 7.1 Hz, 1H), 2.78 (h, J=6.7 Hz, 1H), 2.72 (dd, J=13.4, 7.7 Hz, 1H), 1.18 (t, J=7.1 Hz, 3H), 1.10 (d, J=6.9 Hz, 3H); $^{13}$C NMR (150 MHz, CDCl$_3$): δ 165.9, 165.1, 133.3, 132.5, 132.3, 130.1, 129.6, 129.4, 67.7, 66.5, 65.6, 59.2, 28.3, 27.3, 26.1, 25.9, 9.0; HRMS (m/z) [M+H]$^+$ calculated for C$_{16}$H$_{21}$O$_4$, 277.1440, found 277.1446.

Polymerization General Procedure and NMR Data of Polymers

All polymerization reactions were performed under nitrogen atmosphere using a standard Schlenk technique. The stock solution 2-(((ethylthio)carbonothioyl)thio)-2-methylpropanoic acid (CTA2) and stock solution of AIBN are prepared in degassed toluene at either 8 or 16 mM depending on the reaction. A typical procedure for the preparation of P-4 was given below as an example. A 10 mL Schlenk vial equipped with a stir bar was charged with macrocyclic monomer 4 (0.2 mmol), followed by the stock solution of 16 mM CTA2 (250 µL), 16 mM AIBN (75 µL) and toluene (175 µL). The vial was sealed. The solution was deoxygenated via three freeze-pump-thaw cycles, backfilled with nitrogen, and then heated at 100° C. for a given time. After reaction, the vial was cooled by ice bath and open to air to stop the polymerization. The reaction mixture was diluted with dichloromethane (1 mL) and precipitated in hexane, yielding the polymer which was then characterized using SEC, $^1$H-NMR and $^{13}$C-NMR.

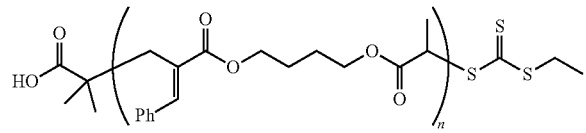

$^1$H NMR (500 MHz, CDCl3): δ 7.72 (s, 1H), 7.40-7.28 (m, 5H), 4.24-4.15 (m, 2H), 4.06-3.96 (m, 2H), 2.96 (dt, J=13.2, 5.8 Hz, 1H), 2.82-2.67 (m, 2H), 1.82-1.62 (m, 4H), 1.08 (d, J=6.8 Hz, 3H). $^{13}$C NMR (125 MHz, CDCl3): δ 175.8, 168.0, 141.0, 135.5, 130.9, 129.3, 128.7, 128.7, 64.6, 64.0, 38.9, 31.0, 25.5, 25.5, 16.8.

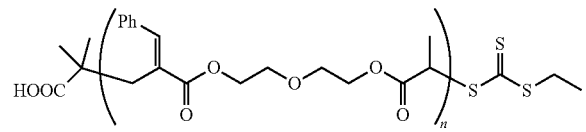

$^1$H NMR (500 MHz, CDCl3): δ 7.74 (s, 1H), 7.40-7.27 (m, 5H), 4.36-4.27 (m, 2H), 4.12 (t, J=4.5 Hz, 2H), 3.80-3.68 (m, 2H), 3.66-3.59 (m, 2H), 2.94 (dd, J=13.6, 6.8 Hz, 1H), 2.81 (dq, J=13.9, 6.9 Hz, 1H), 2.71 (dd, J=13.5, 7.9 Hz, 1H), 1.07 (d, J=6.9 Hz, 3H). $^{13}$C NMR (125 MHz, CDCl3): δ 175.8, 168.0, 141.4, 135.4, 130.6, 129.3, 128.7, 128.7, 69.2, 69.1, 64.1, 63.5, 38.7, 30.9, 16.8.

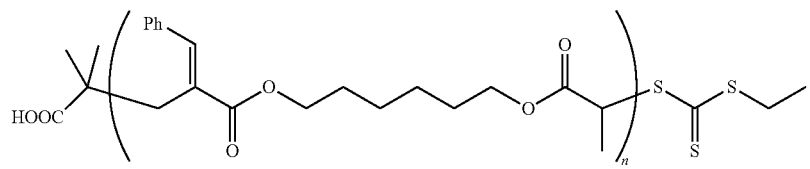

$^1$H NMR (500 MHz, CDCl3): δ 7.73 (s, 1H), 7.40-7.28 (m, 5H), 4.23-4.12 (m, 2H), 4.02-3.91 (m, 2H), 3.02-2.91 (m, 1H), 2.84-2.67 (m, 2H), 1.70 (quint, J=6.8 Hz, 2H), 1.57 (quint, J=7.3, 6.8 Hz, 2H), 1.46-1.29 (m, 4H), 1.08 (d, J=6.8 Hz, 3H). $^{13}$C NMR (500 MHz, CDCl$_3$): δ 175.9, 168.2, 140.8, 135.5, 131.1, 129.3, 128.7, 128.6, 65.0, 64.4, 38.9, 31.0, 28.7, 28.6, 25.8, 25.7, 16.8.

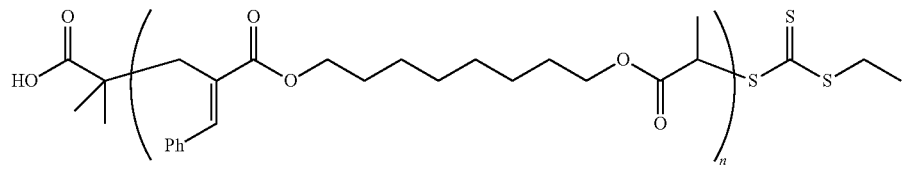

$^1$H NMR (500 MHz, CDCl$_3$): δ 7.73 (s, 1H), 7.40-7.28 (m, 5H), 4.19 (t, J=6.7 Hz, 2H), 4.02-3.89 (m, 2H), 2.95 (dd, J=13.3, 6.6 Hz, 1H), 2.83-2.67 (m, 2H), 1.70 (p, J=6.8 Hz, 2H), 1.60-1.48 (m, 2H), 1.44-1.24 (m, 8H), 1.08 (d, J=6.8 Hz, 3H); $^{13}$C NMR (500 MHz, CDCl3): δ 176.0, 168.2, 140.7, 135.6, 131.1, 129.3, 128.7, 128.6, 65.2, 64.6, 38.8, 31.0, 29.3, 29.3, 28.8, 28.7, 26.1, 26.0, 16.8.

Monomer Conversion Analysis by NMR

Figure 3:
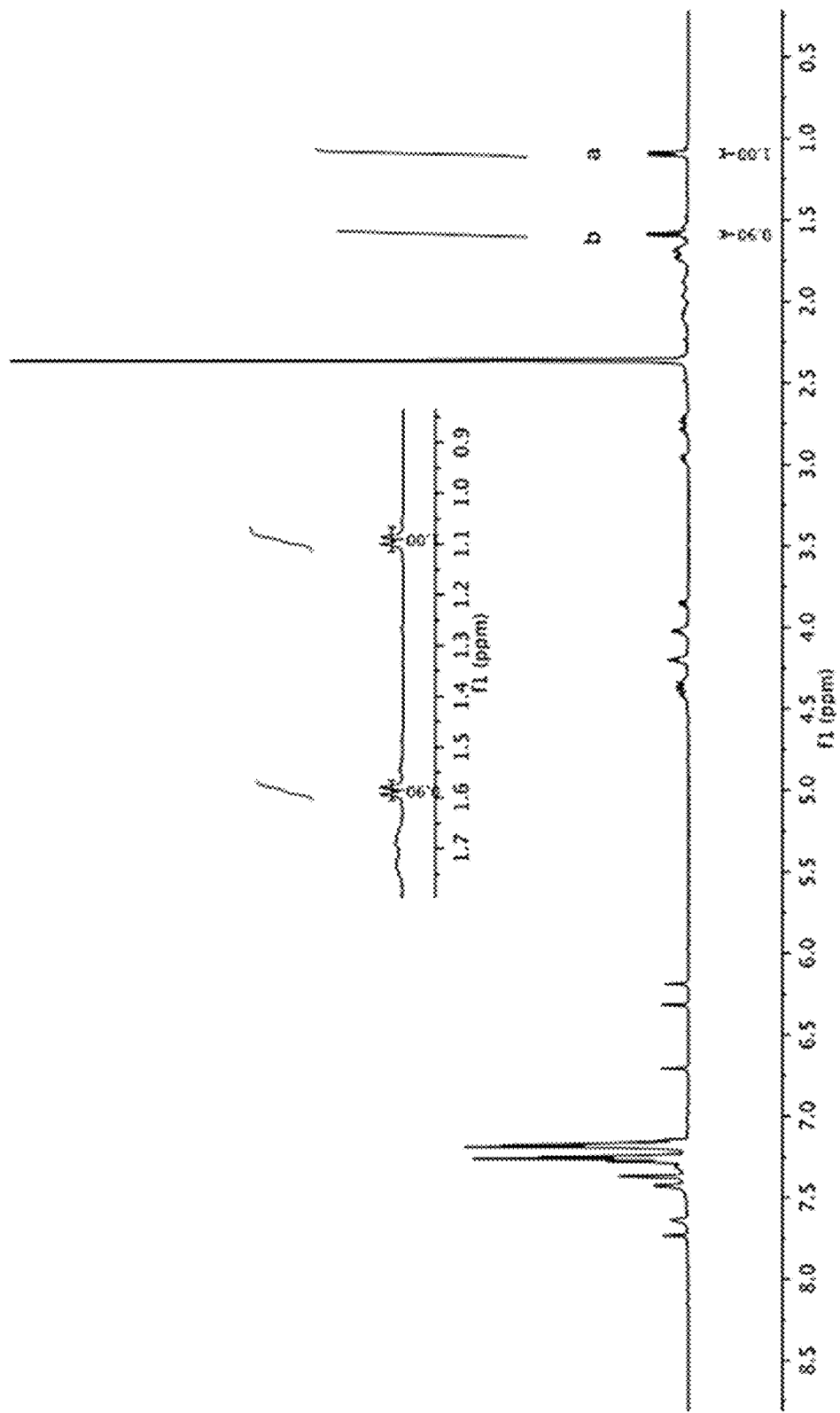
FIG. 3 shows representative NMR determination of monomer conversion for the polymerization of macrocyclic monomer 4. When Peak a (the methyl group of the polymer) is normalized to 1, the conversion is thus calculated as $\alpha = 1/(1+0.90) \times 100\% = 53\%$.
Figure 4:
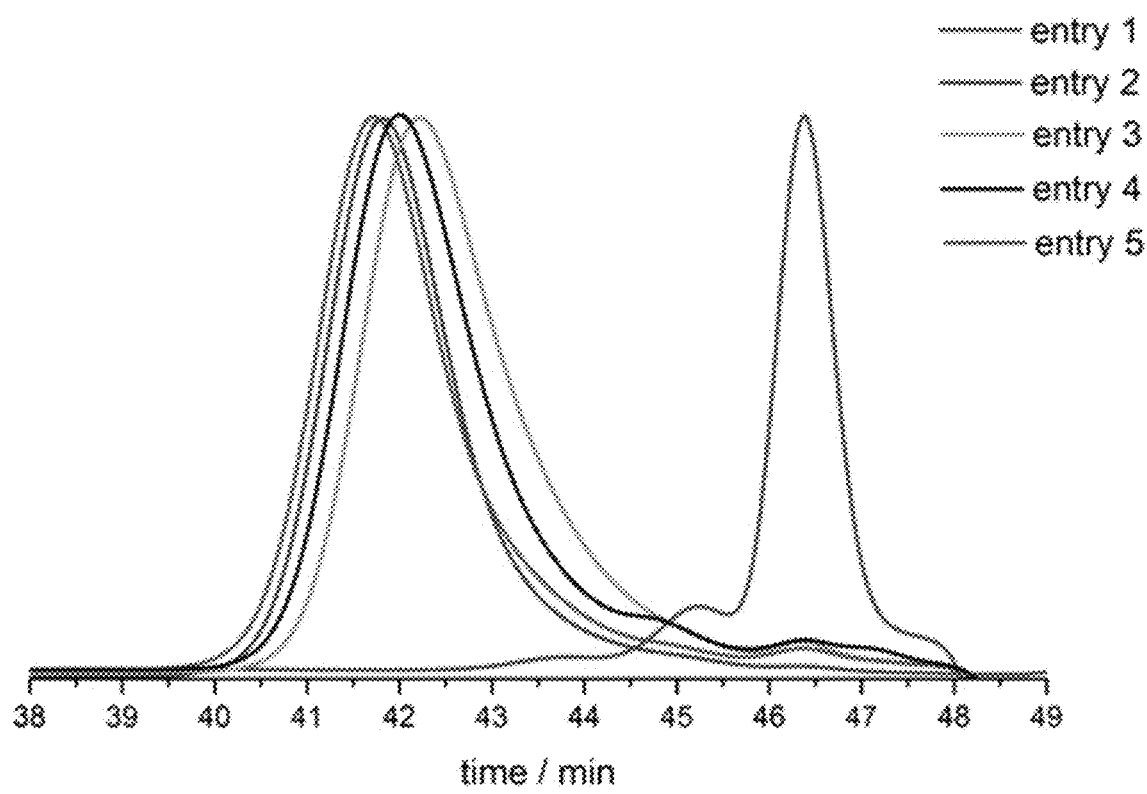
FIG. 4 shows representative data for SEC analysis on the effect of different CTAs on the polymerization.
Figure 5:
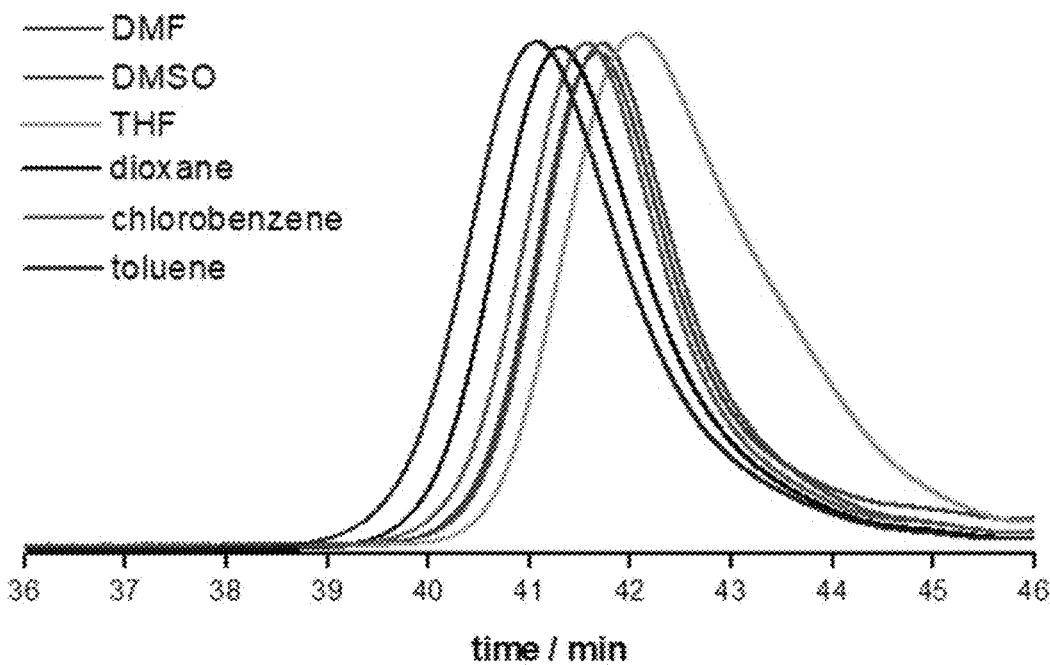
FIG. 5 shows representative data for SEC analysis on the effect of different solvent on the polymerization.
Figure 6:
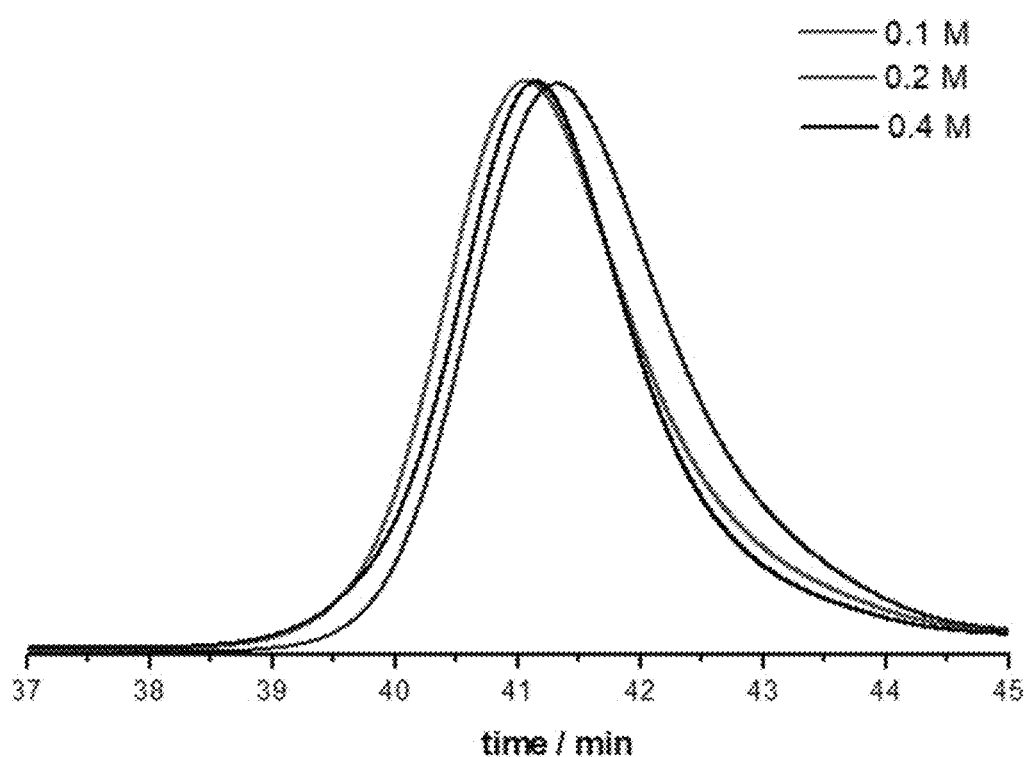
FIG. 6 shows representative data for SEC analysis on the effect of different concentration on the polymerization.
Figure 7:
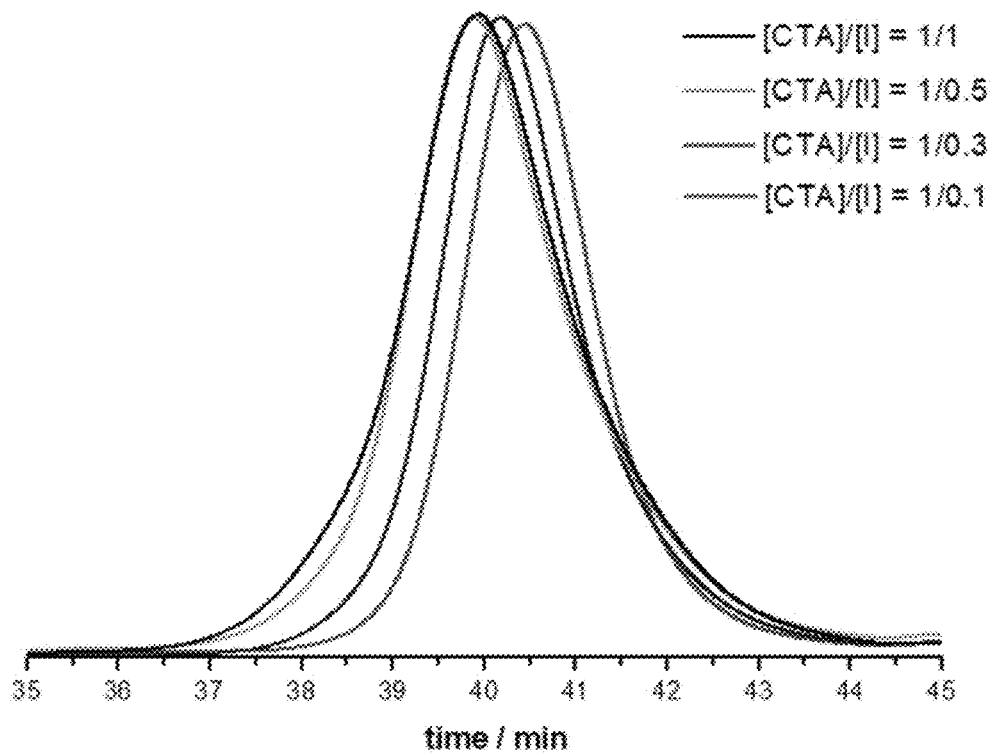
FIG. 7 shows representative data for SEC analysis on the effect of different ratio of CTA and AIBN on the polymerization.
Figure 8:
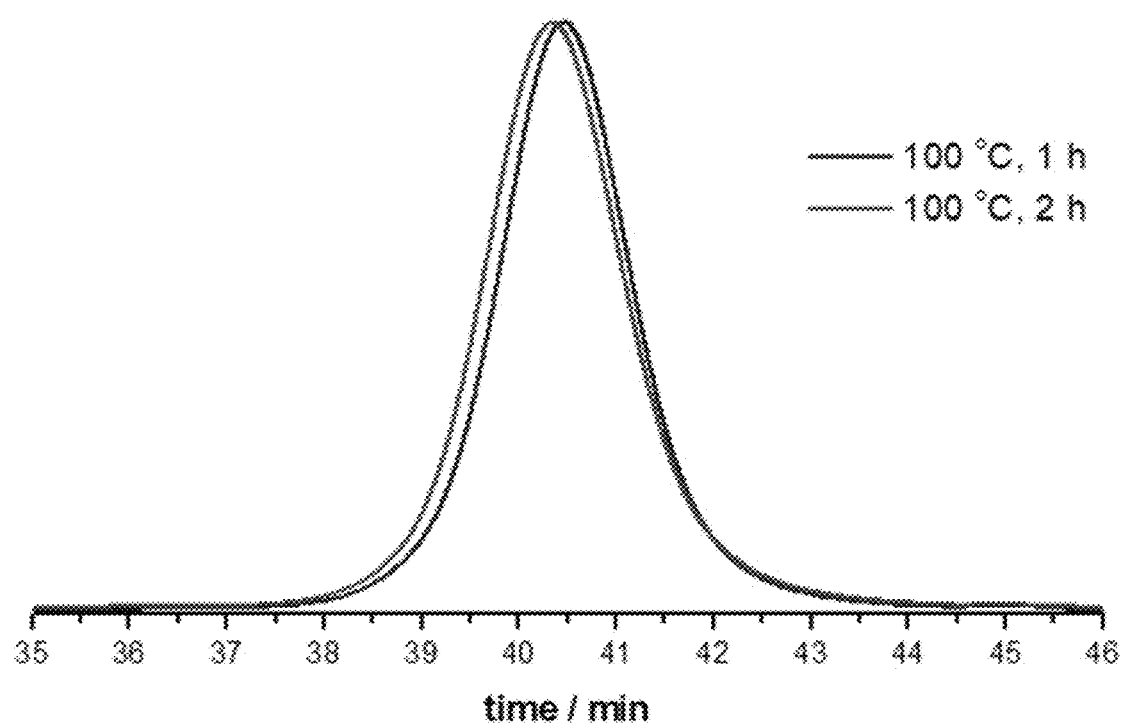
FIG. 8 shows representative data for SEC analysis on the effect of temperature on the polymerization.

Determination of monomer conversions for the polymerizations of macrocyclic monomer 4 was made based on the assumption that the integral of the peak at δ=1.10 ppm (Peak a, FIG. 3) corresponds to the methyl group of the polymer P4, and the integral of the peak at δ=1.59 ppm (Peak b, FIG. 3) corresponds to methyl group of unreacted monomer. When the integral of Peak is normalized to 1, the monomer conversion a is calculated based on the following equation:

$$\alpha = \frac{1}{1+I_b} \times 100\%$$

Using the foregoing method for determination of monomer conversion, various reaction conditions were assessed and the data are provided in the tables given below, with an exemplary reaction scheme shown immediately before the relevant table. The tables below are as follows: (a) Table 2 shows the effect of different CTAs on the polymerization for the reaction given immediately preceding Table 2; (b) Table 3 shows the solvent effect on the polymerization for the reaction given immediately preceding Table 3; (c) Table 4 shows the concentration effect on the polymerization for the reaction immediately preceding Table 4; (d) Table 5 shows the effect of different ratio of CTA and AIBN on the polymerization for the reaction given immediately preceding Table 5; and (e) Table 6 shows the effect of temperature on the polymerization for the reaction given immediately before Table 6.

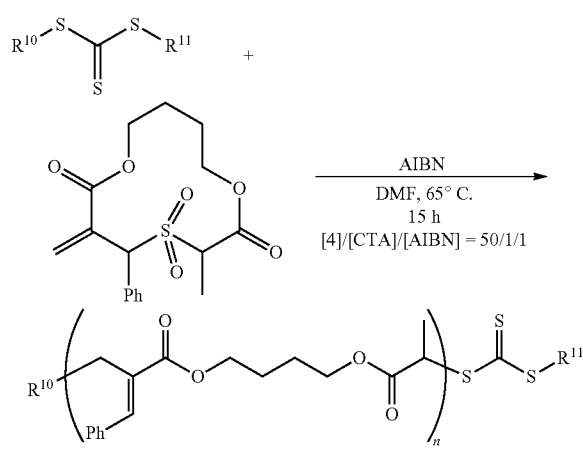

TABLE 3

| Entry | Solvent [a] | Conversion[b] | $M_{n\ (theo)}$[c] | $M_{n\ (SEC)}$[d] | $M_w/M_n$[d] |
|---|---|---|---|---|---|
| 1 | DMF | 50% | 7400 | 4900 | 1.20 |
| 2 | DMSO | 60% | 8800 | 5000 | 1.20 |
| 3 | THF | 63% | 9300 | 3700 | 1.26 |
| 4 | Dioxane | 69% | 10100 | 6900 | 1.19 |
| 5 | Chlorobenzene | 50% | 7400 | 5300 | 1.20 |
| 6 | Toluene | 76% | 11100 | 7500 | 1.21 |

[a] Experimental conditions: [4] = 0.2M, 65° C. under nitrogen for 15 h, unless otherwise noted.
[b] Monomer conversion was determined by $^1$H NMR spectroscopy.
[c] Theoretical molecular weight was calculated using the following equation: $M_{n\ (theo)} = [M]_0/[CTA]_0 \times MW^M \times$ conversion $+ MW^{CTA}$, where $[M]_0$, $[CTA]_0$, $MW^M$, and $MW^{CTA}$ correspond to initial monomer concentration, initial CTA concentration, molar mass of monomer, and molar mass of CTA, respectively.
[d] Molecular weight and polydispersity index ($M_w/M_n$) were determined by SEC analysis calibrated to polystyrene standards.

TABLE 2

| Entry | CTA[a] | Conversion[b] | $M_{n(theo)}$[c] | $M_{n(SEC)}$[d] | $M_w/M_n$[d] |
|---|---|---|---|---|---|
| 1 | NC-S-C(=S)-S-C$_{12}$H$_{25}$ | <5% | — | — | — |
| 2 | HOOC-CH(S-C(=S)-S-C$_2$H$_5$)-C(CH$_3$)$_2$(CN)(S-C(=S)-S-C$_2$H$_5$) | 42% | 6200 | 4300 | 1.17 |
| 3 | (structure) | 31% | 4600 | 3100 | 1.32 |
| 4 | HOOC-(CH$_2$)$_2$-C(CH$_3$)(CN)-S-C(=S)-S-C$_{12}$H$_{25}$ | 44% | 6500 | 3600 | 1.32 |
| 5 | HOOC-C(CH$_3$)$_2$-S-C(=S)-S-C$_2$H$_5$ | 50% | 7400 | 4900 | 1.20 |

[a] Experimental conditions: [4] = 0.2M, 65° C. under nitrogen for 15 h, unless otherwise noted.
[b] Monomer conversion was determined by $^1$H NMR spectroscopy.
[c] Theoretical molecular weight was calculated using the following equation: $M_{n(theo)} = [M]_0/[CTA]_0 \times MW^M \times$ conversion $+ MW^{CTA}$, where $[M]_0$, $[CTA]_0$, $MW^M$, and $MW^{CTA}$ correspond to initial monomer concentration, initial CTA concentration, molar mass of monomer, and molar mass of CTA, respectively.
[d] Molecular weight and polydispersity index ($M_w/M_n$) were determined by SEC analysis calibrated to polystyrene standards.

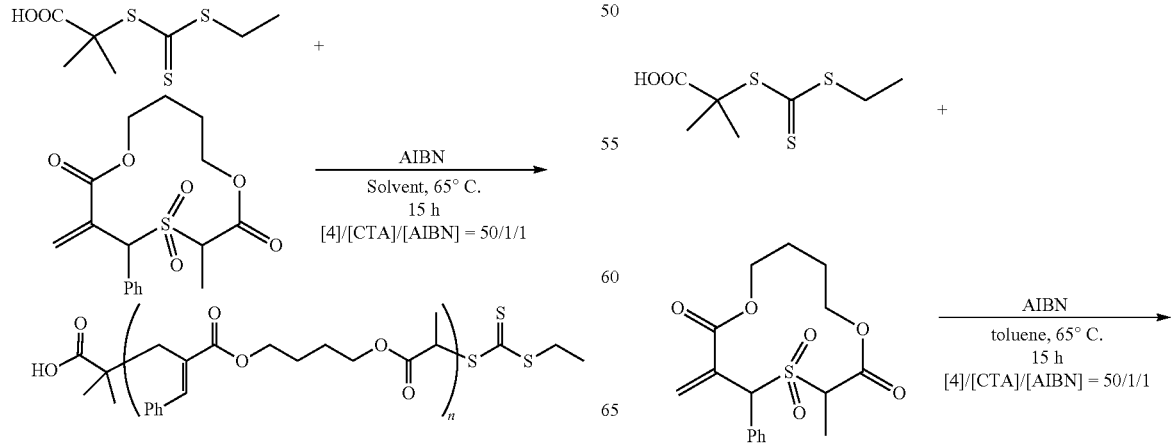

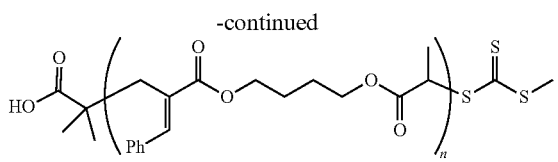
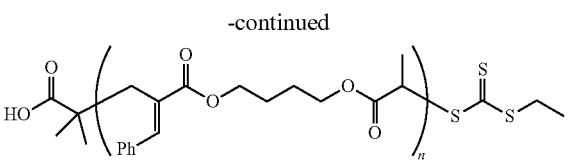

TABLE 4

| Entry | Concetration of 4[a] | Conversion[b] | $M_{n\,(theo)}$[c] | $M_{n\,(SEC)}$[d] | $M_w/M_n$[d] |
|---|---|---|---|---|---|
| 1 | 0.1M | 64% | 9400 | 6600 | 1.23 |
| 2 | 0.2M | 76% | 11100 | 7500 | 1.21 |
| 3 | 0.4M | 77% | 11300 | 7800 | 1.19 |

[a]Experimental conditions: 65° C. under nitrogen for 15 h, unless otherwise noted.
[b]Monomer conversion was determined by $^1$H NMR spectroscopy.
[c]Theoretical molecular weight was calculated using the following equation: $M_{n\,(theo)}$ = $[M]_0/[CTA]_0 \times MW^M \times$ conversion + $MW^{CTA}$, where $[M]_0$, $[CTA]_0$, $MW^M$, and $MW^{CTA}$ correspond to initial monomer concentration, initial CTA concentration, molar mass of monomer, and molar mass of CTA, respectively.
[d]Molecular weight and polydispersity index ($M_w/M_n$) were determined by SEC analysis calibrated to polystyrene standards.

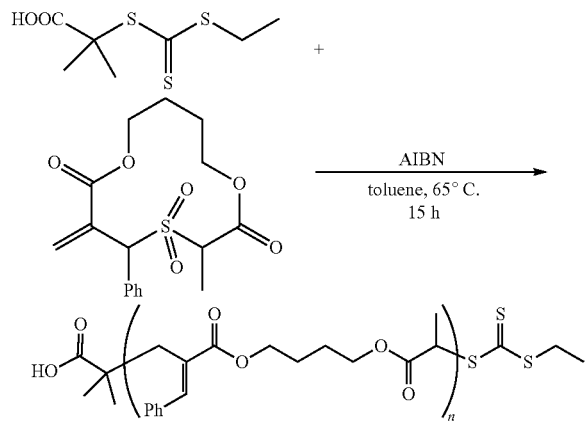

TABLE 5

| Entry | [4]/[CTA]/[AIBN][a] | Conversion[b] | $M_{n\,(theo)}$[c] | $M_{n\,(SEC)}$[d] | $M_w/M_n$[d] |
|---|---|---|---|---|---|
| 1 | 100/1/1 | 76% | 22100 | 13100 | 1.29 |
| 2 | 100/1/0.5 | 71% | 20600 | 13000 | 1.26 |
| 3 | 100/1/0.3 | 64% | 18600 | 12100 | 1.19 |
| 4 | 100/1/0.1 | 50% | 14600 | 11300 | 1.15 |

[a]Experimental conditions: [4] = 0.8M, 65° C. under nitrogen for 15 h, unless otherwise noted.
[b]Monomer conversion was determined by $^1$H NMR spectroscopy.
[c]Theoretical molecular weight was calculated using the following equation: $M_{n\,(theo)}$ = $[M]_0/[CTA]_0 \times MW^M \times$ conversion + $MW^{CTA}$, where $[M]_0$, $[CTA]_0$, $MW^M$, and $MW^{CTA}$ correspond to initial monomer concentration, initial CTA concentration, molar mass of monomer, and molar mass of CTA, respectively.
[d]Molecular weight and polydispersity index ($M_w/M_n$) were determined by SEC analysis calibrated to polystyrene standards.

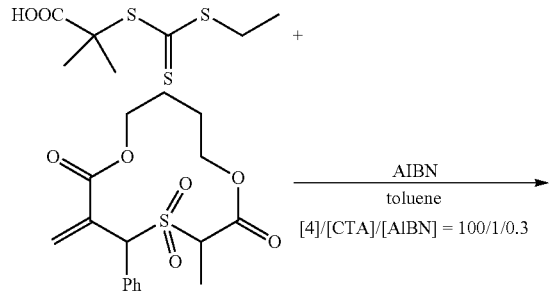

TABLE 6

| Entry | Temperature[a] | Conversion[b] | $M_{n\,(theo)}$[c] | $M_{n\,(SEC)}$[d] | $M_w/M_n$[d] |
|---|---|---|---|---|---|
| 1 | 65° C., 1 h | <1% | — | — | — |
| 2 | 80° C., 1 h | 5% | — | — | — |
| 3 | 100° C., 1 h | 61% | 17800 | 11700 | 1.14 |
| 4 | 100° C., 2 h | 62% | 18100 | 12100 | 1.15 |

[a]Experimental conditions: [4] = 0.8M, 65° C. under nitrogen for 15 h, unless otherwise noted.
[b]Monomer conversion was determined by $^1$H NMR spectroscopy.
[c]Theoretical molecular weight was calculated using the following equation: $M_{n\,(theo)}$ = $[M]_0/[CTA]_0 \times MW^M \times$ conversion + $MW^{CTA}$, where $[M]_0$, $[CTA]_0$, $MW^M$, and $MW^{CTA}$ correspond to initial monomer concentration, initial CTA concentration, molar mass of monomer, and molar mass of CTA, respectively.
[d]Molecular weight and polydispersity index ($M_w/M_n$) were determined by SEC analysis calibrated to polystyrene standards.

Synthesis of Polymer P-4-3k

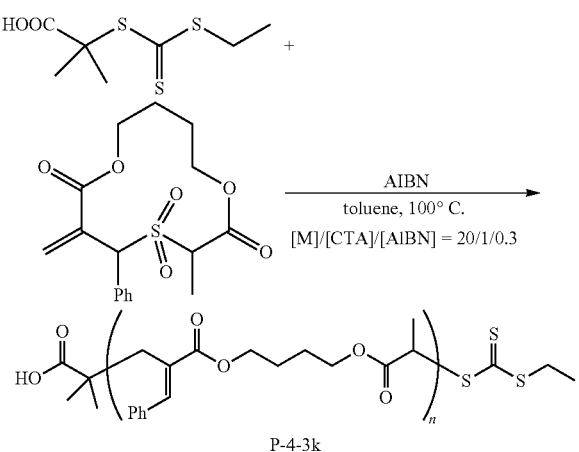

Figure 11:
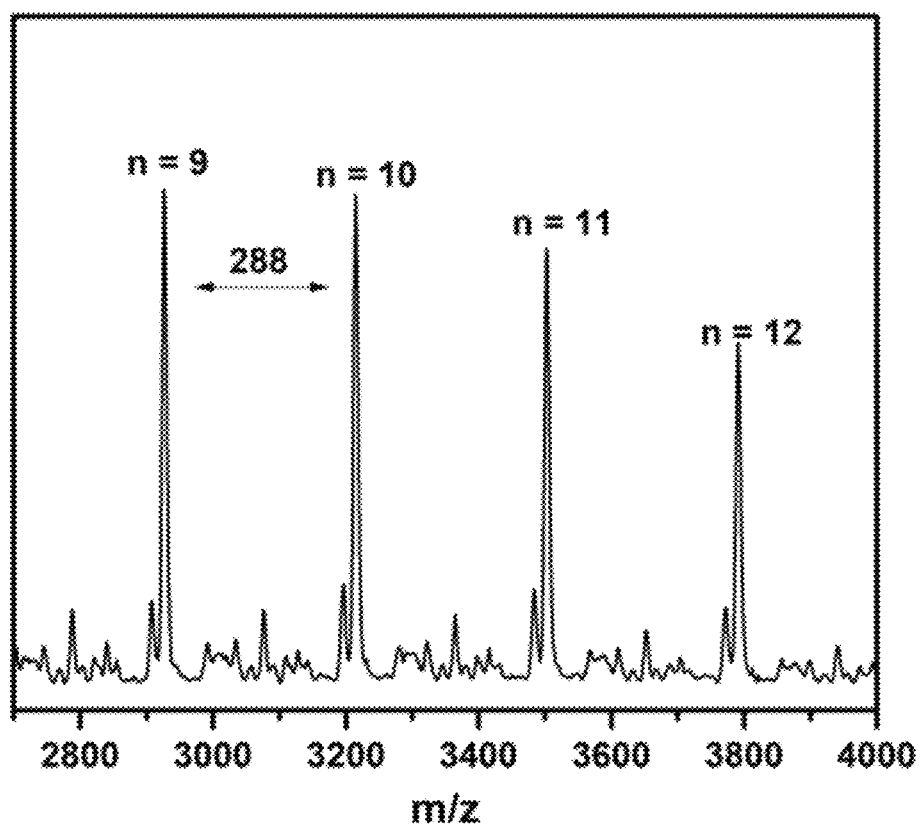
FIG. 11 shows representative MALDI-TOF data obtained for polymer P-4-3k.
Figure 12:
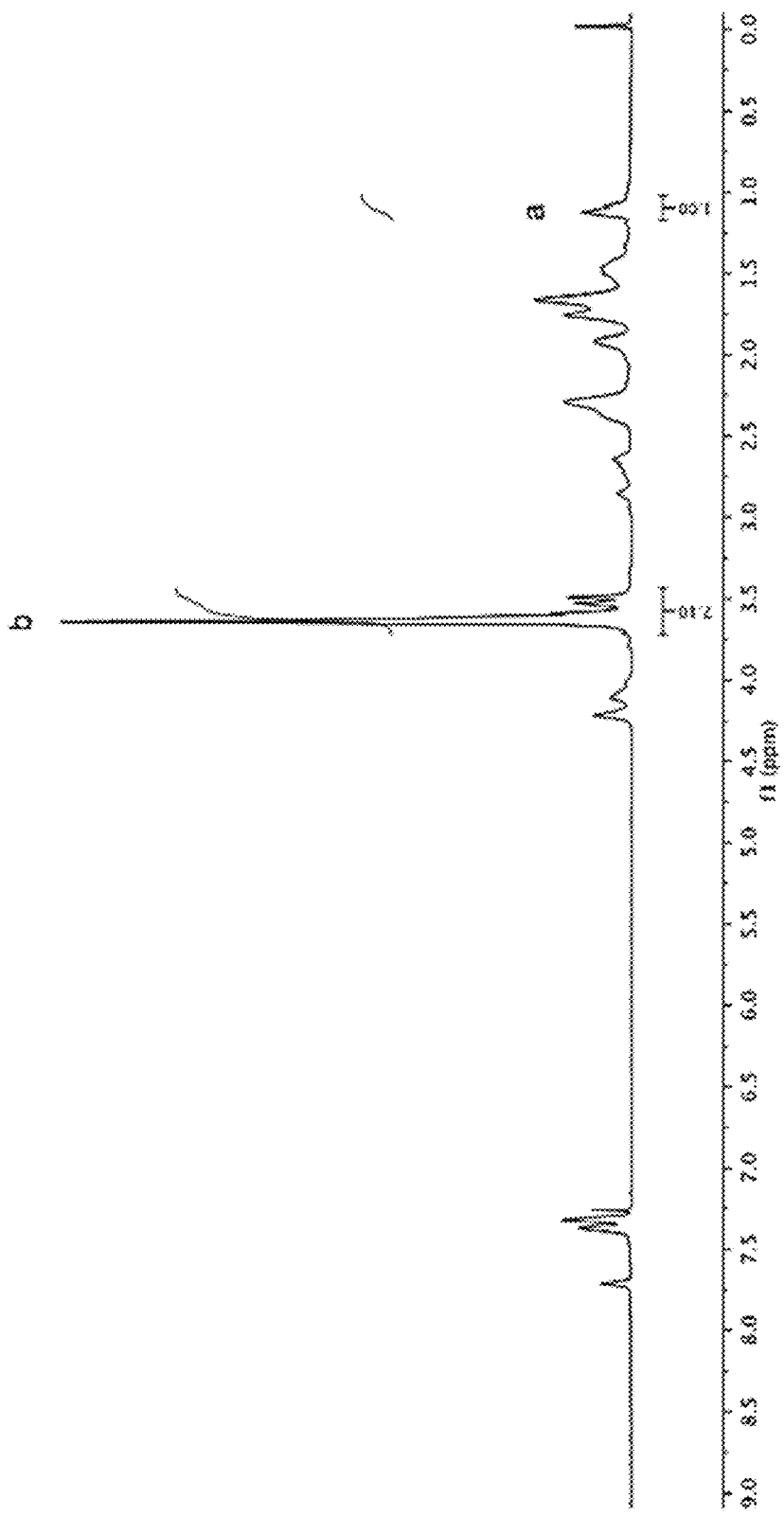
FIG. 12 shows representative $^1$H NMR data obtained for a disclosed random copolymer. The peak a corresponds to the methyl group of macrocyclic repeat units, and the peak b corresponds to methyl group of methyl acrylate repeat units. When peak a is normalized to 1, the mole % of macrocyclic repeat units is thus calculated as $1/(1+7.10) \times 100\% = 12\%$.

Following the polymerization general procedure, a 10 mL Schlenk vial was charged with macrocyclic monomer 4 (70.5 mg, 1.0 mmol), CTA2 (16 mM in toluene, 312.5 μL, 50 μmol), AIBN (16 mM in toluene, 93.8 μL, 15 μmol) and toluene (93.7 μL). The vial was sealed and the solution was deoxygenated via three freeze-pump-thaw cycles, backfilled with nitrogen, then heated at 100° C. for 30 min. The vial was cooled by ice bath and open to air to stop the polymerization. The monomer conversion was monitored by $^1$H NMR spectroscopy (49% monomer conversion). The reaction mixture was diluted with minimum amount of DCM and precipitated with hexane. The obtained solid was re-dissolved with a minimum amount of DCM for further precipitation, yielding the polymer P-4-3k, which was then characterized using NMR ($M_{n,NMR}$=3400) and SEC ($M_{n,SEC}$=3300, Đ=1.15). Subsequent analysis of P-4-3k by matrix-assisted laser desorption/ionization time-of-flight (MALDI-TOF) mass spectrometry further confirmed intact chain-end groups of P-4-3k (FIG. 11).

Procedure for Synthesis of Diblock Copolymers

Synthesis of Diblock Copolymers P-5-b-P-4

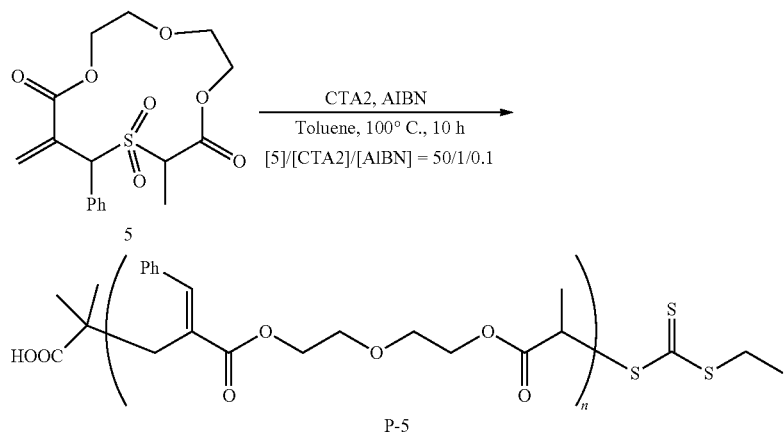

Following the polymerization general procedure, a 10 mL Schlenk vial was charged with macrocyclic monomer 5 (51.0 mg, 138.4 µmol), followed by CTA2 (16 mM in toluene, 174 µL, 2.77 µmol), AIBN (16 mM in toluene, 17.4 µL, 0.277 µmol) and toluene (58.6 µL). The vial was sealed and the solution was deoxygenated via three freeze-pump-thaw cycles, backfilled with nitrogen, then heated at 100° C. for 10 h. The vial was cooled by ice bath and open to air to stop the polymerization. The monomer conversion was monitored by $^1$H NMR spectroscopy (65% monomer conversion). The reaction mixture was diluted with minimum amount of DCM and precipitated with hexane. The obtained solid was re-dissolved with a minimum amount of DCM for further precipitation, yielding the polymer. The produced P-5 was then characterized using SEC.

A 10 mL Schlenk vial was charged with macrocyclic monomer 4 (48.8 mg, 138.4 mmol), macroinitiator P-5 (2.77 µmol), AIBN (16 mM in toluene, 17.4 µL, 0.277 µmol) and toluene (232.6 µL). The vial was sealed and the solution was deoxygenated via three freeze-pump-thaw cycles, backfilled with nitrogen, then heated at 100° C. for 2 h. The vial was cooled by ice bath and open to air to stop the polymerization. The monomer conversion was monitored by $^1$H NMR spectroscopy (37% monomer conversion). The reaction mixture was diluted with minimum amount of DCM and precipitated with hexane for two times, yielding the polymer. The produced block copolymers P-5-b-P-4 was then characterized using SEC, $^1$H NMR and $^{13}$C NMR.

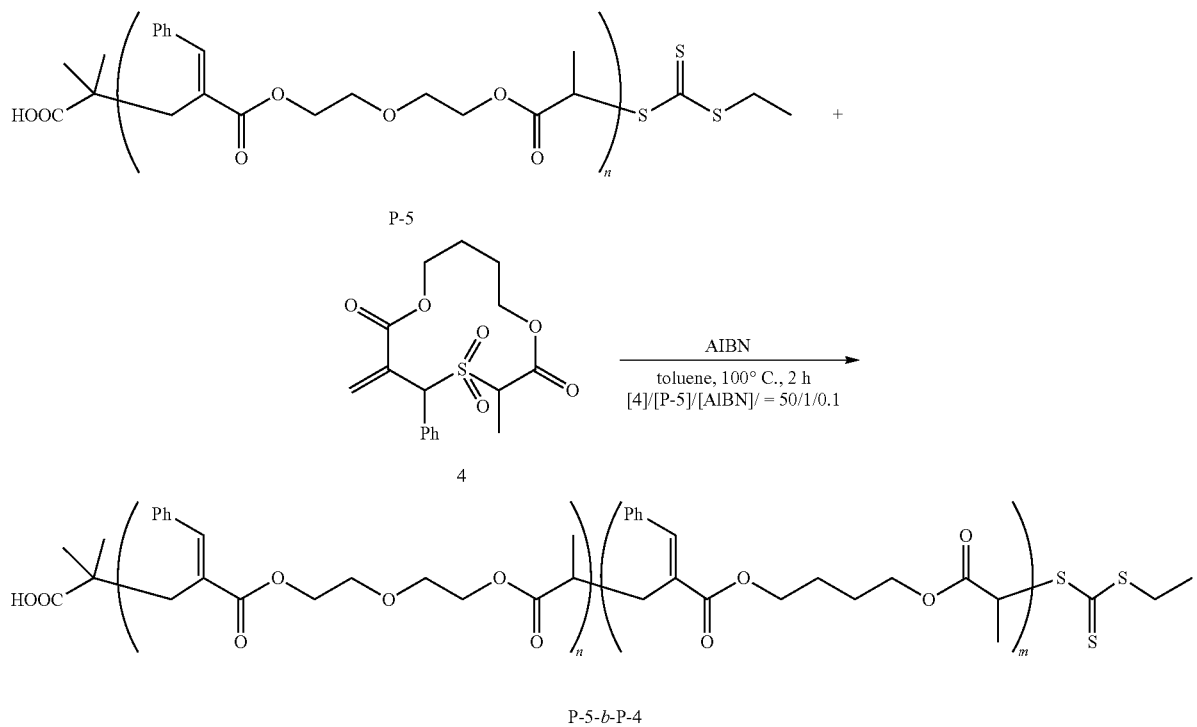

Synthesis of diblock copolymers P-6-b-P-4

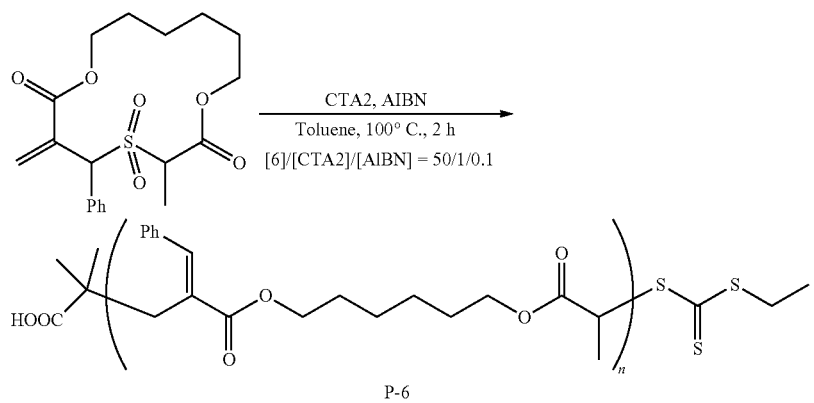

Following the polymerization general procedure, a 10 mL Schlenk vial was charged with macrocyclic monomer 5 (53.7 mg, 141.2 µmol), followed by CTA2 (16 mM in toluene, 177 µL, 2.82 µmol), AIBN (16 mM in toluene, 17.7 µL, 0.282 µmol) and toluene (55.3 µL). The vial was sealed and the solution was deoxygenated via three freeze-pump-thaw cycles, backfilled with nitrogen, then heated at 100° C. for 2 h. The vial was cooled by ice bath and open to air to stop the polymerization. The monomer conversion was monitored by $^1$H NMR spectroscopy (46% monomer conversion). The reaction mixture was diluted with minimum amount of DCM and precipitated with hexane. The obtained solid was re-dissolved with a minimum amount of DCM for further precipitation, yielding the polymer. The produced P-6 was then characterized using SEC.

A 10 mL Schlenk vial was charged with macrocyclic monomer 4 (49.7 mg, 0.141 µmol), macroinitiator P-6 (2.82 µmol), AIBN (16 mM in toluene, 17.7 µL, 0.282 µmol) and toluene (232.3 µL). The vial was sealed and the solution was deoxygenated via three freeze-pump-thaw cycles, backfilled with nitrogen, then heated at 100° C. for 2 h. The vial was cooled by ice bath and open to air to stop the polymerization. The monomer conversion was monitored by $^1$H NMR spectroscopy (49% monomer conversion). The reaction mixture was diluted with minimum amount of DCM and precipitated with hexane for two times, yielding the polymer. The produced block copolymers P-6-b-P-4 was then characterized using SEC, $^1$H NMR and $^{13}$C NMR.

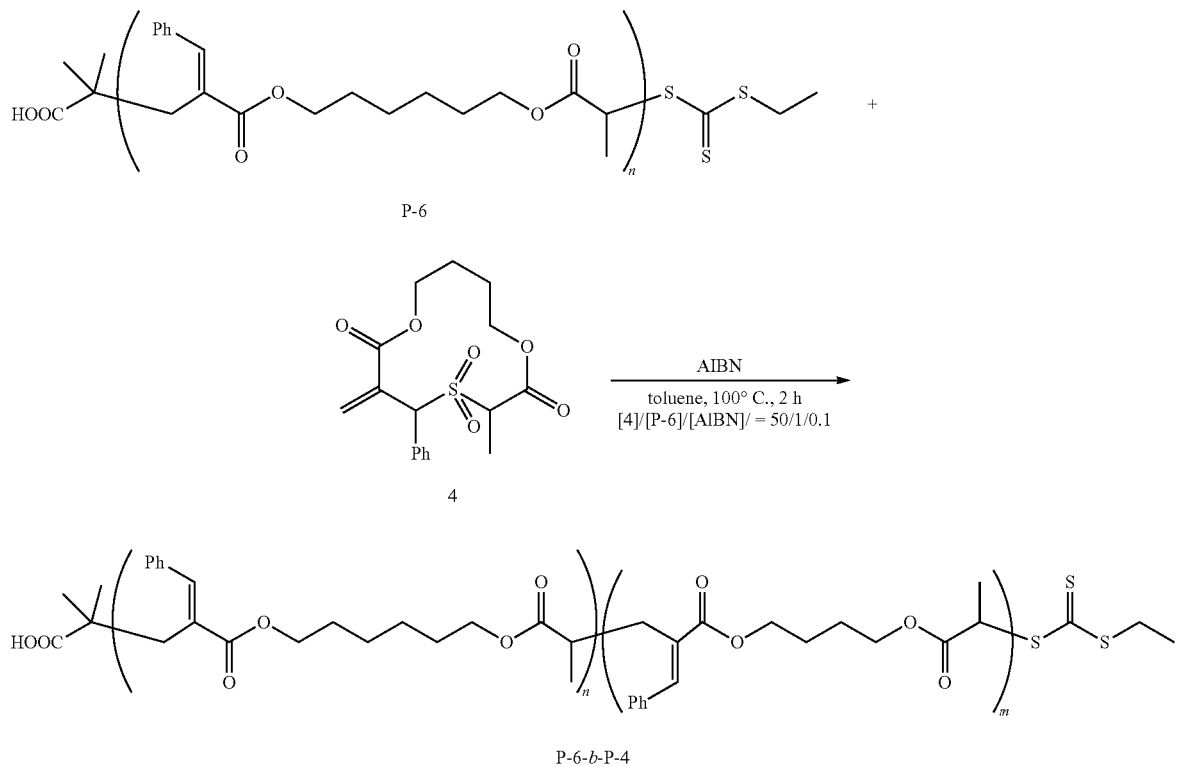

Synthesis of polymers P-7

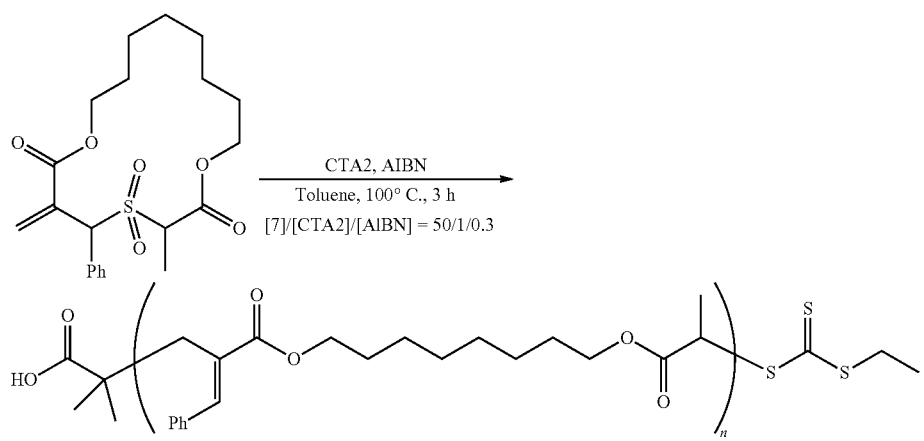

Following the polymerization general procedure, a 10 mL Schlenk vial was charged with macrocyclic monomer 7 (43.0 mg, 105.3 μmol), followed by CTA2 (16 mM in toluene, 132 μL, 2.11 μmol), AIBN (16 mM in toluene, 40 μL, 0.63 μmol) and toluene (78 μL). The vial was sealed and the solution was deoxygenated via three freeze-pump-thaw cycles, backfilled with nitrogen, then heated at 100° C. for 3 h. The vial was cooled by ice bath and open to air to stop the polymerization. The monomer conversion was monitored by $^1$H NMR spectroscopy (61% monomer conversion). The reaction mixture was diluted with minimum amount of DCM and precipitated with hexane. The obtained solid was re-dissolved with a minimum amount of DCM for further precipitation, yielding the polymer. The produced P-7 was then using SEC, $^1$H NMR and $^{13}$C NMR.

Copolymerization of Methyl Acrylate and Macrocyclic Monomer 4

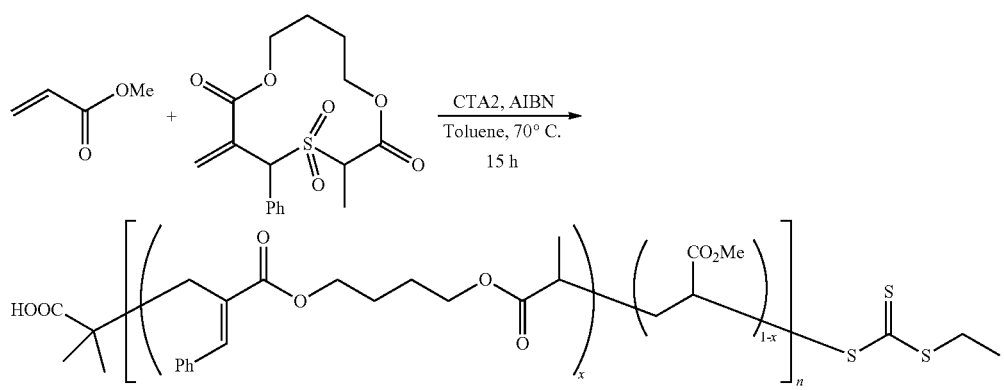

A 10 mL Schlenk vial was charged with methyl acrylate (90.1 μL, 1.0 mmol), macrocyclic monomer 4 (17.6 mg, 50.0 μmol), CTA2 (16 mM in toluene, 209 μL, 3.33 μmol), AIBN (16 mM in toluene, 20.9 μL, 0.333 μmol) and toluene (170 μL). The vial was sealed and oxygen was removed via three freeze-pump-thaw cycles, backfilled with nitrogen, then heated at 70° C. for 15 h. The vial was cooled by ice bath and open to air to stop the polymerization. The monomer conversion was monitored by $^1$H NMR spectroscopy (91% conversion of monomer 4). The reaction mixture was diluted with minimum amount of DCM and precipitated with hexane for two times, yielding the copolymer P10 (SEC: $M_n$=10.2k, Đ=1.17, 12 mol incorporation of macrocyclic repeat units). The higher incorporation of 4 than the feed ratio indicates that 4 reacts faster than methyl acrylate in the propagating polymer chain under these reaction conditions.

Methanolysis of Homopolymer P-4

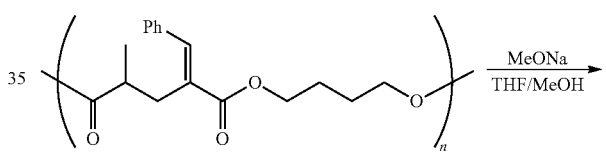

-continued

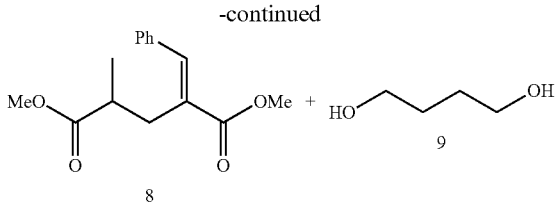

P-4 (20 mg) was added to a 4 mL vial equipped with a stir bar, dissolved in THF (1 mL) and stirred at room temperature. A solution of sodium methoxide (100 μL of a 25 wt % solution in methanol) was added and the vial is capped. The reaction was stirred at room temperature for 10 min and stopped by the addition of a 1 M aqueous hydrochloric acid (0.5 mL) and the mixture was extracted with DCM (5 mL). The organic phase was concentrated and purified by column chromatography to afford colorless oil 8 and 9 whose structure were further confirmed by NMR and mass spectrometry.

8: $^1$H NMR (600 MHz, CDCl$_3$): δ 7.76 (s, 1H), 7.45-7.29 (m, 5H), 3.82 (s, 3H), 3.57 (s, 3H), 2.95 (dd, J=13.5, 7.2 Hz, 1H), 2.79 (h, J=6.9 Hz, 1H), 2.72 (dd, J=13.5, 7.5 Hz, 1H), 1.10 (d, J=6.9 Hz, 3H); $^{13}$C NMR (150 MHz, CDCl$_3$): δ 176.4, 168.7, 141.1, 135.5, 130.8, 129.3, 128.7, 128.6, 52.2, 51.7, 38.8, 31.0, 16.8; HRMS (m/z) [M+H]$^+$ calculated for C$_{15}$H$_{19}$O$_4$, 263.1278, found 263.1285.

9: $^1$H NMR (600 MHz, CDCl$_3$): δ 3.71-3.62 (m, 4H), 1.70-1.63 (m, 4H).

Methanolysis of Copolymer P10

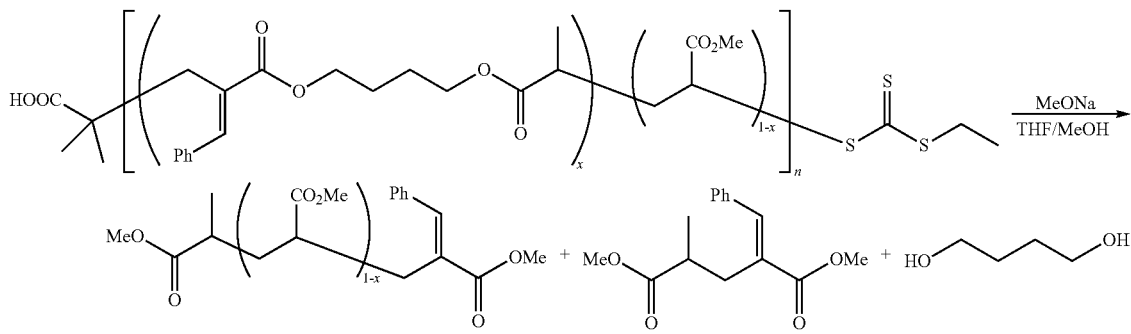

P10 (10 mg) was added to a 4 mL vial equipped with a stir bar, dissolved in THF (1 mL) and stirred at room temperature. A solution of sodium methoxide (20 μL of a 25 wt % solution in methanol) was added and the vial is capped. At the given time, the reaction is stopped by the addition of a 1 M aqueous hydrochloric acid (0.1 mL) and the mixture was extracted with DCM (2 mL). The organic phase was dried with Na$_2$SO$_4$ and concentrated in vacuo. The sample was analyzed with NMR and SEC.

Example 2

Results and Discussion

Figure 16A:
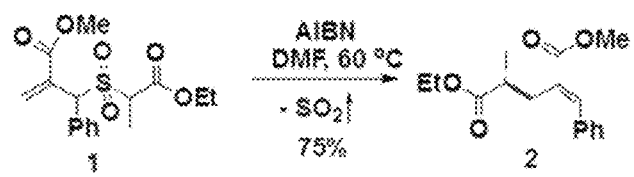
FIGS. 16A-16B shows reactions for: trigger-testing Compound 1 as shown in FIG. 16A; and the macrocyclic monomers 4-7 (numbers in the structure indicate ring size) as shown in FIG. 16B.

In order to test the design of the present invention, a concise route was first devised to synthesize a "trigger-testing" compound 1 (FIG. 16A). Benzaldehyde was first coupled with tert-butyl acrylate via the Morita-Baylis-Hillman reaction. Upon protecting the hydroxyl group with acetic anhydride, this intermediate was reacted with ethyl 2-mercaptopropanoate to afford the thiol ether, which was further oxidized with meta-chloroperoxybenzoic acid (mCPBA) to afford the desired product 1 in 42% overall yield over four steps.

Next, the ability of 1 to undergo the radical cascade process was investigated. The reaction in the presence of azobisisobutyronitrile (AIBN) in N,N-dimethylformamide (DMF) at 60° C. over 10 hours afforded the coupling product 2 in 75% isolated yield. $^1$H-NMR and mass spectrometry analysis of 2 unambiguously confirmed the complete consumption of 1 and the formation of 2 (radical reaction of compound 1.). Notably, no alkylsulfonyl radical byproduct that failed to extrude SO$_2$ was detected throughout the reaction, suggesting that the alkylsulfonyl radical was short-lived and could be rapidly transformed into the alkyl radical.

Figure 16B:
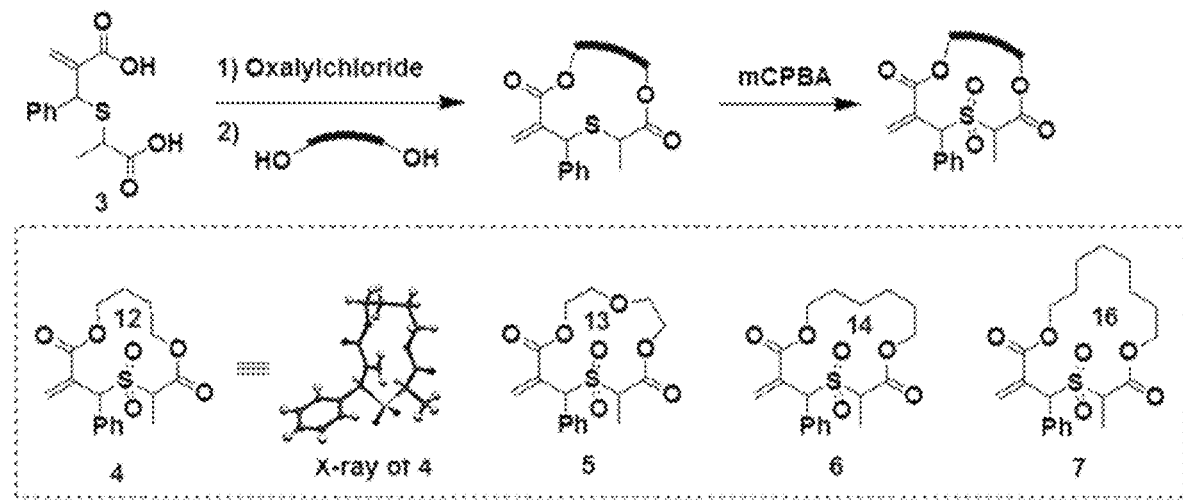
Figure 17A:
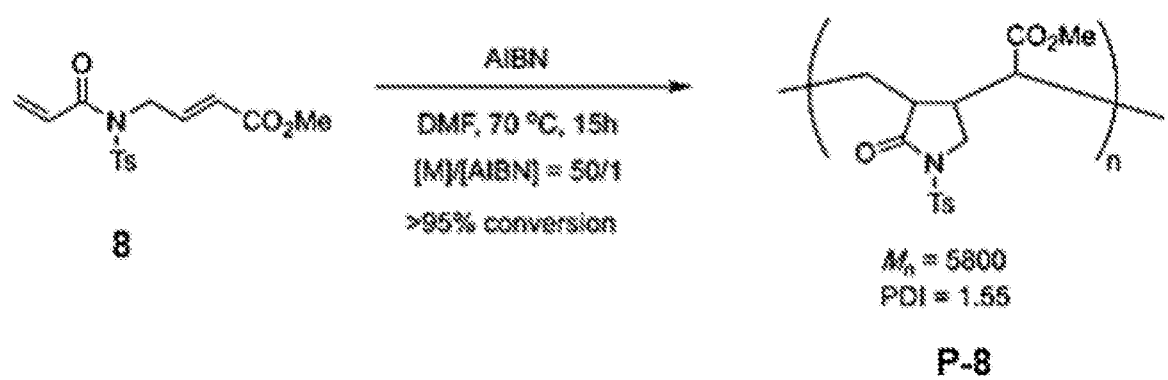
FIG. 17A shows a representative reaction for the free radical polymerization of 1,6-diene monomer 8.
Figure 17B:
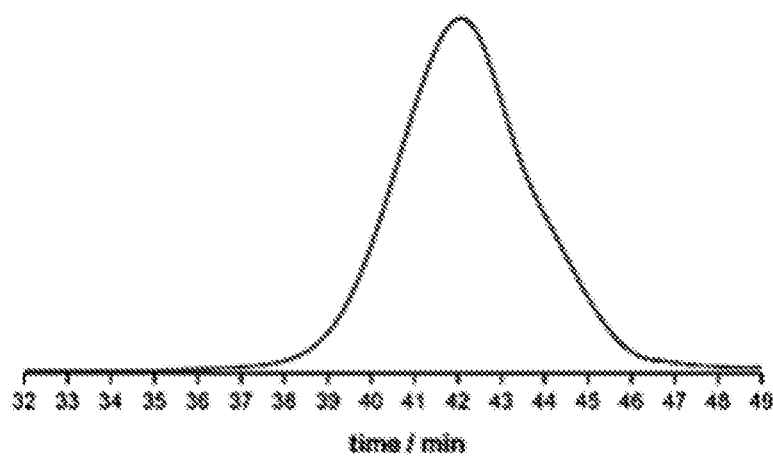
FIG. 17B representative SEC analysis data of the free radical polymerization of 1,6-diene monomer 8 reaction shown in FIG. 17A.
Figure 19A:
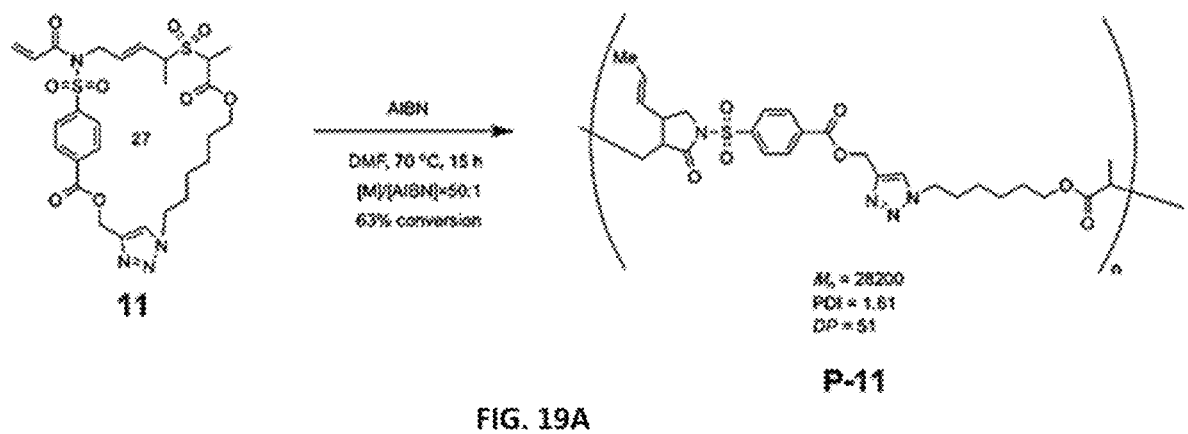
FIG. 19A shows a representative radical cascade-triggered ring-opening polymerization of the macrocyclic monomer 11 in the absence of 2-(((ethylthio)carbonothioyl) thio)-2-methylpropanoic acid.
Figure 19B:
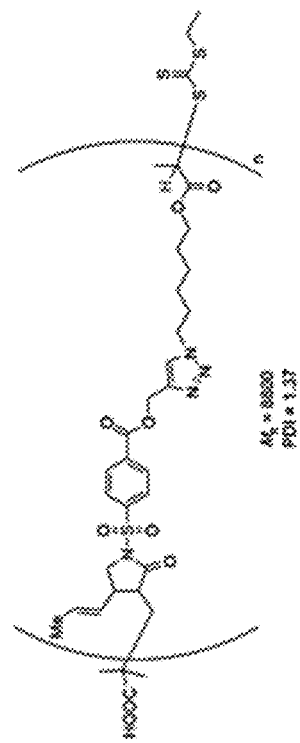
FIG. 19B shows a representative radical cascade-triggered ring-opening polymerization of the macrocyclic monomer 11 in the presence of 2-(((ethylthio)carbonothioyl)thio)-2-methylpropanoic acid.
Figure 19B:
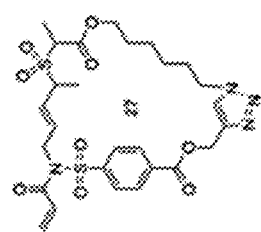
Figure 19B:
Figure 19C:
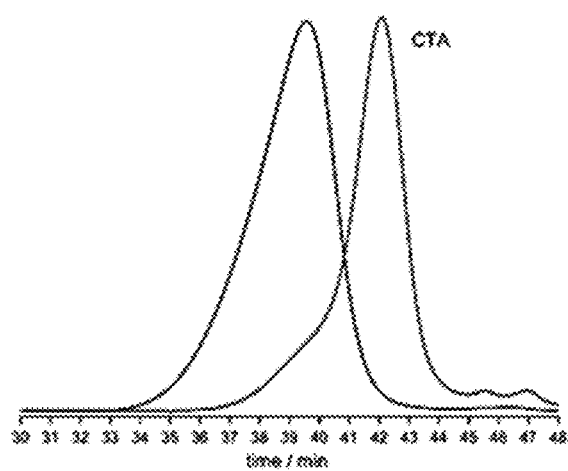
FIG. 19C shows representative SEC analysis data.

Encouraged by the ability of allyl sulfones to serve as the ring-opening trigger, an efficient and scalable synthesis of the macrocyclic monomers containing the ring-opening trigger was then developed using commercially available reagents. Similar to the synthesis of 1, the coupling product of benzaldehyde, tert-butyl acrylate, and 2-mercaptopropionic acid was deprotected by hydrochloric acid to yield diacid 3, which was then cyclized in one step by reacting with diols. In the present disclosure, 1,4-butanediol, diethylene glycol, 1,6-hexanediol, and 1,8-hexanediol were coupled with 3 to generate the macrocyclic thioethers, which were further oxidized by mCPBA to give model macrocyclic monomers 4, 5, 6, and 7 respectively (FIG. 16B). Given the myriad of building blocks containing diol functionalities that are commercially available or accessible through simple synthetic routes, macrocyclic monomers with diverse main-chain structural motifs can be readily prepared. Notably, this short route employs inexpensive, commercially available reagents, and multi-gram quantities of monomers were readily obtained.

Next, the ring-opening polymerization of 4 to the polymer product P-4 under different reaction conditions was examined, with the representative results summarized in Table 7. Consistent with the trigger-testing reaction, free radical polymerization of monomer 4 in the presence of the initiator AIBN in DMF at 65° C. under nitrogen atmosphere successfully yielded a polymer product with a number average molecular weight (Mn) by size-exclusion chromatography (SEC) of 5.3 kg/mol and dispersity (Đ) of 1.77 (Table 7, Entry 1). With this promising result, controlling over the polymerization was then focused and achieved. Noting that secondary alkyl radical formed after the radical cascade reaction resembles the structure of the propagating radical of an acrylic polymerization, existing controlled radical polymerization techniques, such as the reversible addition-fragmentation chain transfer (RAFT) polymerization mediated by chain transfer agents (CTAs), can be applied to control the polymerization of these macrocyclic monomers. CTA1-3 (Table 7) and other trithiocarbonate and dithiobenzoates (Table 2) were evaluated by their abilities to achieve control over polymerization. Among all CTAs screened, trithiocarbonates consistently achieved better control over polymerization than others, indicated by high molecular weights and low dispersity of the resulting polymers, and CTAs with shorter alkyl chains were superior to the ones with long alkyl chains (Table 2). CTA2 was found to be optimal chain transfer regent (Table 7, Entries 2-4). Next, polymerization in various solvents, including DMF, dimethyl sulfoxide (DMSO), tetrahydrofuran (THF), dioxane, chlorobenzene, and toluene were investigated (Table 3), and toluene was found to be the most suitable solvent, yielding polymers with highest molecular weight among all solvents used (Table 7, Entry 5).

Subsequently, the effect of monomer concentration on the polymerization was further investigated (Table 4). Increase of monomer concentration did not result in changes over the molecular weights and Đ, but sluggish reaction was resulted at monomer concentrations lower than 0.1 M. Consistent with controlled polymerization, the molecular weights of polymer were proportional to the ratio of monomer:CTA (Table 7, Entry 6). Further improvement of Đ was achieved by decreasing the amount of AIBN (Table 5).

Figure 9A:
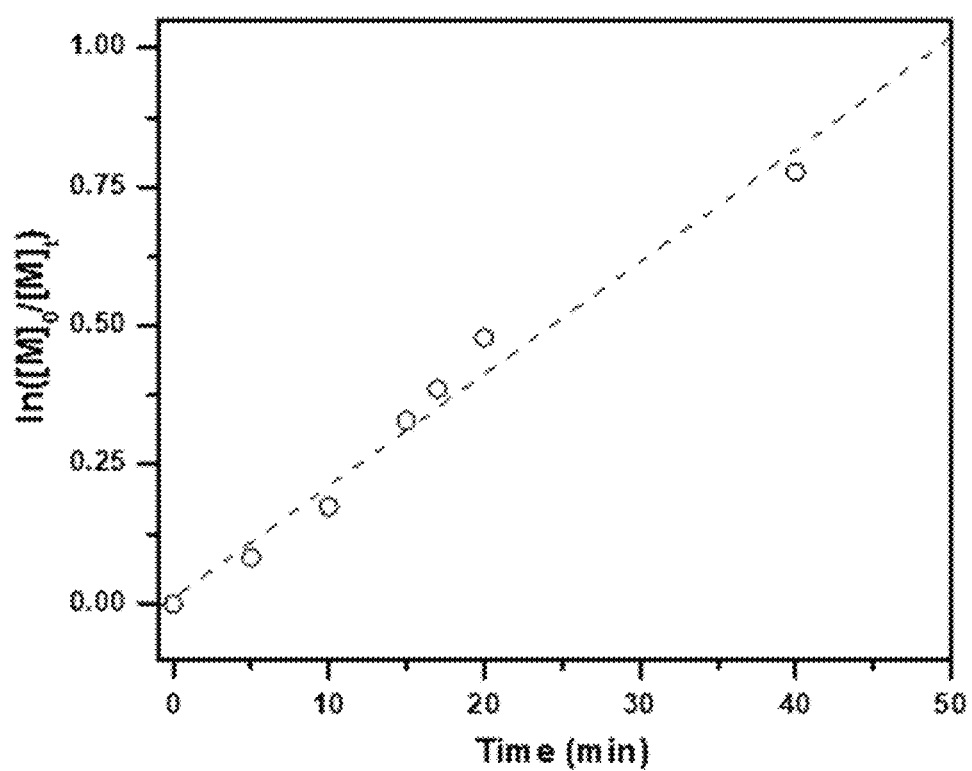
FIGS. 9A-9B show representative for a kinetic study on the polymerization of macrocyclic monomer 4.
Figure 9B:
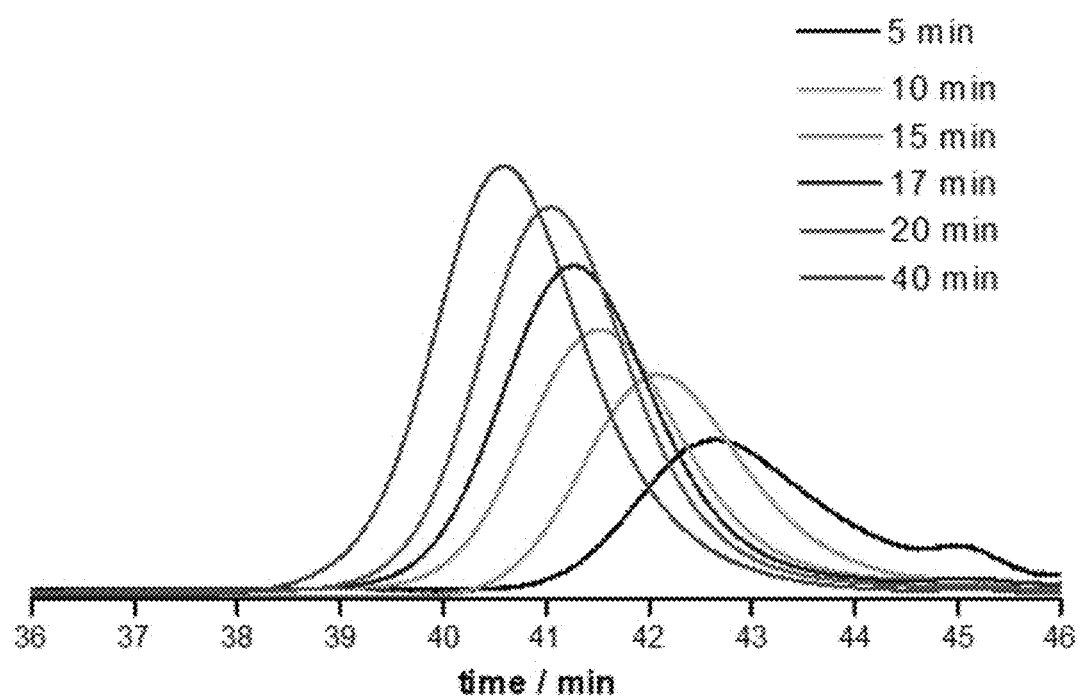

Lastly, the effect of temperature on the polymerization was also investigated, and increasing the reaction temperature to 100° C. can improve the polymerization rate while still maintaining good control (Table 6). The optimal condition of the polymerization at a monomer:CTA:initiator ratio of 100:1:0.3 in toluene at 100° C. resulted in 62% monomer conversion in two hours ($M_n$=12.1 kg/mol, Đ=1.15, Table 7, Entry 7). The chain growth nature of the polymerization and the excellent control are further confirmed by linear increase of the molecular weights with monomer conversion, low Đ (FIG. 1A). Notably, the relationship between $\ln([M]_0/[M]_t)$ versus irradiation time remained linear at monomer conversion 50% or lower, where $[M]_0$ is the initial monomer concentration and $[M]_t$ is the monomer concentration at a given time (t). The deviation from linearity at higher monomer conversions is attributed to the decrease of the reaction rate with reduced monomer concentration (FIG. 9).

Table 7 shows the polymerization of macrocyclic monomer 4 as shown below.

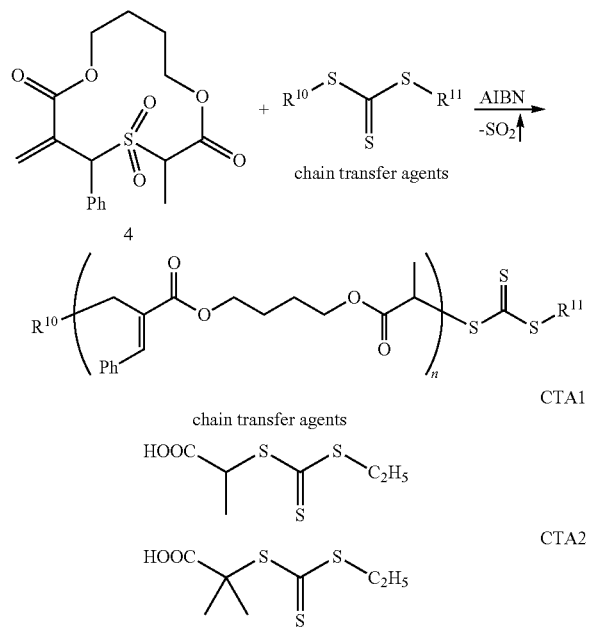

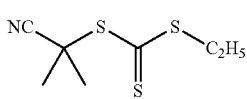

TABLE 7

| Entry | [M]/[CTA]/[initiator]$^a$ | CTA | Solvent | Conversion$^b$ | $M_{n\ (theo)}$$^c$ | $M_{n\ (SEC)}$$^d$ | $M_w/M_n$$^d$ |
|---|---|---|---|---|---|---|---|
| 1$^e$ | 50/0/15 | — | DMF | 83% | — | 5300 | 1.77 |
| 2 | 50/1/1 | CTA1 | DMF | 42% | 6200 | 4300 | 1.17 |
| 3 | 50/1/1 | CTA2 | DMF | 50% | 7400 | 4900 | 1.20 |
| 4 | 50/1/1 | CTA3 | DMF | 31% | 4600 | 3100 | 1.32 |
| 5 | 50/1/1 | CTA2 | Toluene | 76% | 11100 | 7500 | 1.21 |
| 6 | 100/1/1 | CTA2 | Toluene | 76% | 22100 | 13100 | 1.29 |
| 7$^f$ | 100/1/0.3 | CTA2 | Toluene | 62% | 18100 | 12100 | 1.15 |

$^a$Experimental conditions: [4] = 0.2M, 65° C. under nitrogen for 15 h, unless otherwise noted.
$^b$Monomer conversion was determined by $^1$H NMR spectroscopy.
$^c$Theoretical molecular weight was calculated using the following equation: $M_{n(theo)}$ = $[M]_0/[CTA]_0 * MW^M *$ conversion + $MW^{CTA}$, where $[M]_0$, $[CTA]_0$, $MW^M$, and $MW^{CTA}$ correspond to initial monomer concentration, initial CTA concentration, molar mass of monomer, and molar mass of CTA, respectively.
$^d$Molecular weight and dispersity ($M_w/M_n$) were determined by SEC analysis calibrated to polystyrene standards.
$^e$6 h.
$^f$100° C., 2 h.

Figure 10:
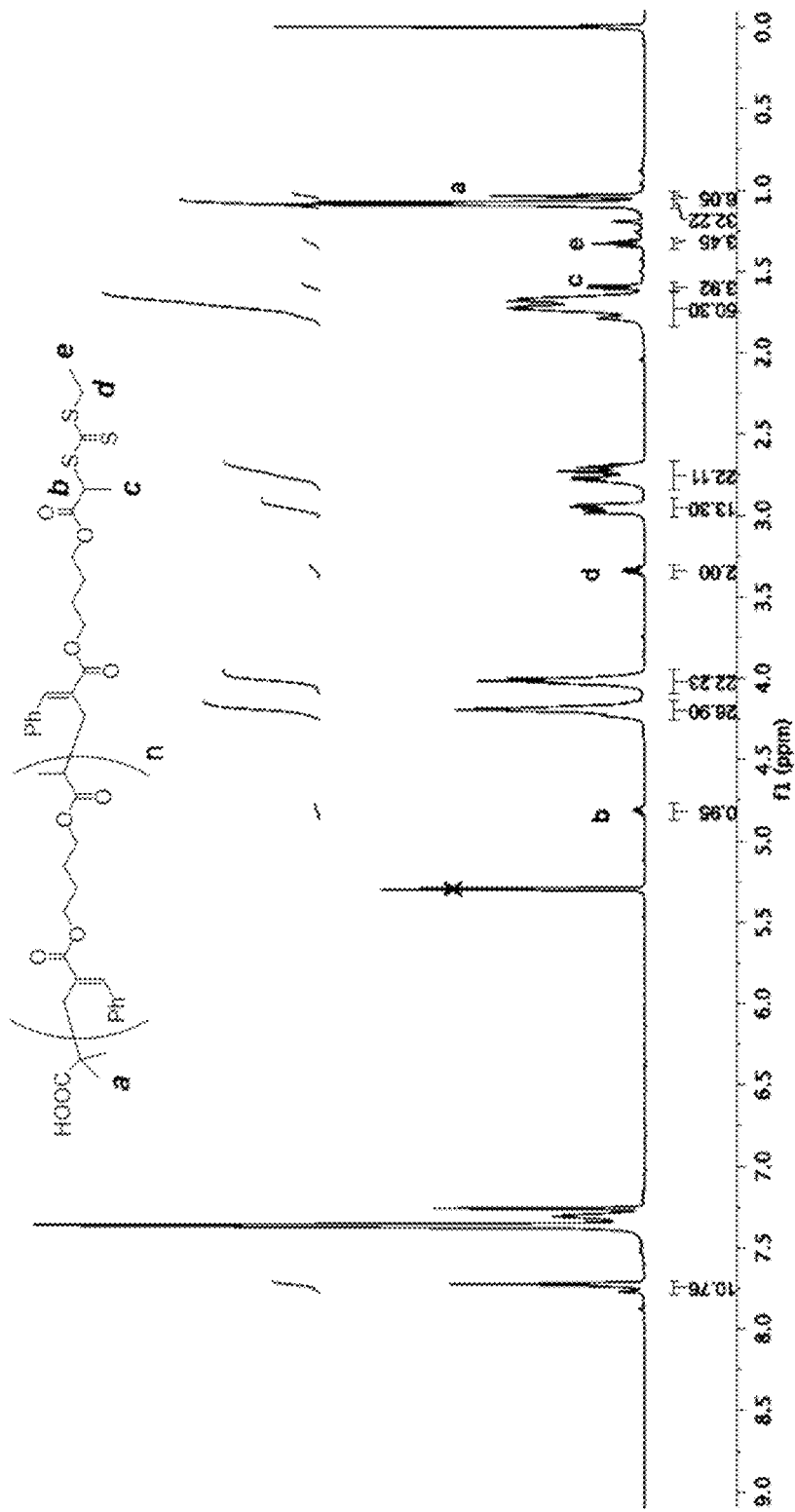
FIG. 10 shows representative $^1$H NMR data obtained for polymer P-4-3k. The structure of the compound is shown as an inset, with the structures identified with letters corresponding to the labeled peaks in the $^1$H NMR data.

The controlled synthesis of polymers with desired main-chain structural motifs was further confirmed by NMR and mass spectrometry analyses of P-4. In order to increase the molar fraction of the chain ends to the backbone in polymers to facilitate the quantitative chain-end analysis using $^1$H-NMR, polymerization with reduced monomer: CTA ratio (20/1) and limited monomer conversion (49%) afforded P-4-3k with low molecular weight measured by SEC ($M_{n(SEC)}$=3.3 kg/mol). The molecular weight of P-4-3k determined by the peak integration ratio of polymer backbone to the chain-end group is 3.4 kg/mol, consistent with theoretical value based on monomer conversion $M_{n(theo)}$= 3.1 kg/mol and $M_{n(SEC)}$, indicating a quantitative preservation of the polymer chain-end groups (FIG. 10). Subsequent analysis of P-4-3k by matrix-assisted laser desorption/ionization time-of-flight (MALDI-TOF) mass spectrometry further confirmed intact chain-end groups of the individual oligomers of P-4-3k (FIG. 1B and FIG. 11). The spacing between these discrete oligomers was consistent with the expected mass of the repeating unit (288 g/mol), unambiguously validating the outcome of the ROP process. These results clearly demonstrated the high chain-end fidelity of the ROP process, a hallmark of controlled polymerization, and highlight its capability to generate well-defined polymer architectures, such as block copolymers.

Figure 1C:
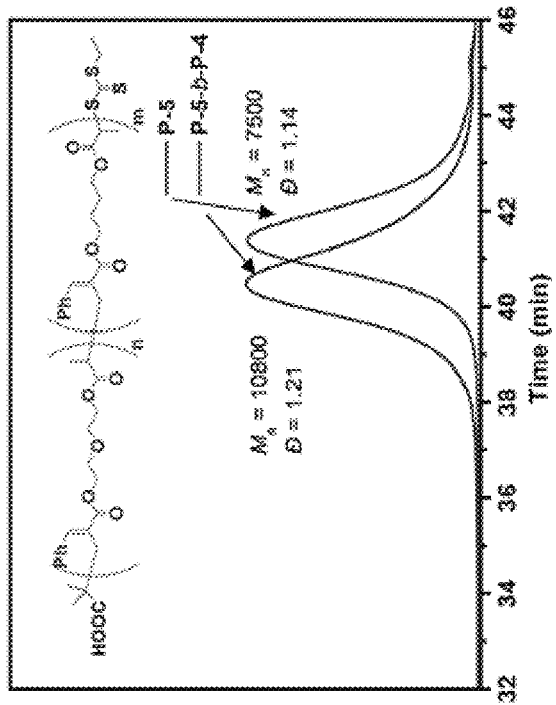

To demonstrate the utility of this technique in preparing block copolymers, chain extension experiments were studied in detail. First, ROP of a 13-membered macrocyclic monomer 5 yielded a macroinitiator P-5 ($M_n$=7.5 kg/mol, Đ=1.14), to which monomer 4 was polymerized. A clear shift to higher molecular weight was observed, yielding a diblock copolymer P-5-b-P-4 ($M_n$=10.8 kg/mol, Đ=1.21, FIG. 1C). Next, the ability of the present invention to incorporate a "strainless" (ring size≥14-membered ring) macrocyclic monomer was investigated. Encouragingly, ROP of macrocyclic monomer 6 and 7 successfully yielded the controlled polymers P-6 (Mn=7.2 kg/mol, Đ=1.11) and P-7 ($M_n$=8.3 kg/mol, Đ=1.09). P-6 was chosen to be further extended by monomer 4 to yield P-6-b-P-4 ($M_n$=12.8 kg/mol, Đ=1.26, FIG. 1D). The present disclosure presents the first examples of the successful controlled radical block copolymerization of macrocyclic monomers. These results illustrate the potential that diverse main-chain structural motifs can be incorporated by ROP into synthetic polymers with material properties ranging from biodegradability to self-assembly to biomimicry.

Owing to the ease of synthesis by chain-growth polymerization and the diverse functional pendant groups, acrylic polymers have been widely applied to as functional materials. However, the carbon-carbon backbone of the acrylic polymers is extremely resistant to chemical and biological degradation processes, which has caused serious environmental consequences. The development of polymerization strategies that possess the benefits of radical chain-growth polymerizations and are capable of complete or partial degradation is of great importance. It is envisioned that radical cascade-triggered ring-opening polymerization of low-strain macocyclic monomer consisting of hydrolytically degradable ester linkages offers a promising solution to this challenge.

Figure 2:
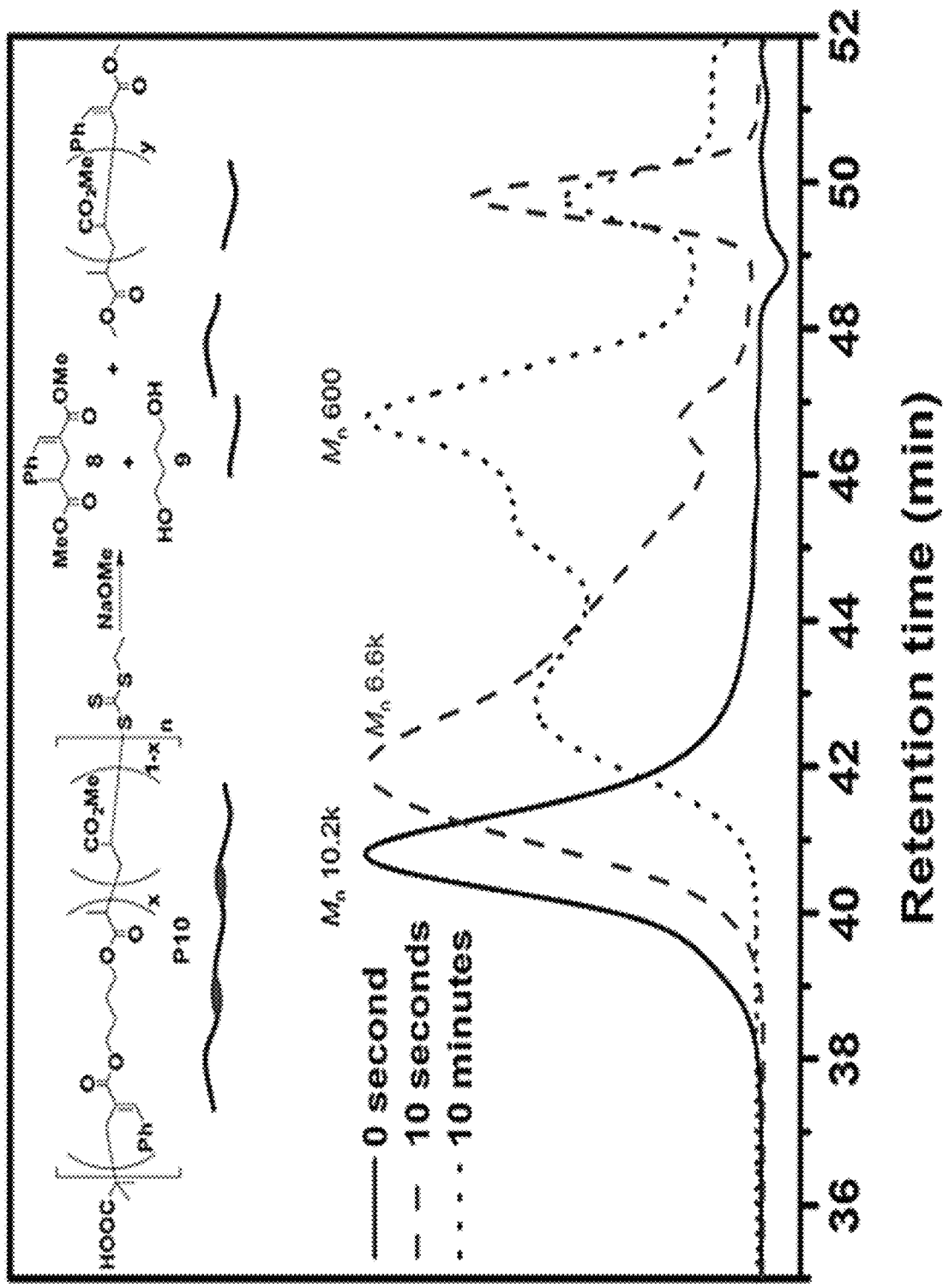
FIG. 2 shows representative data pertaining to the degradation of the random copolymer P10 as determined by SEC analysis.
Figure 13:
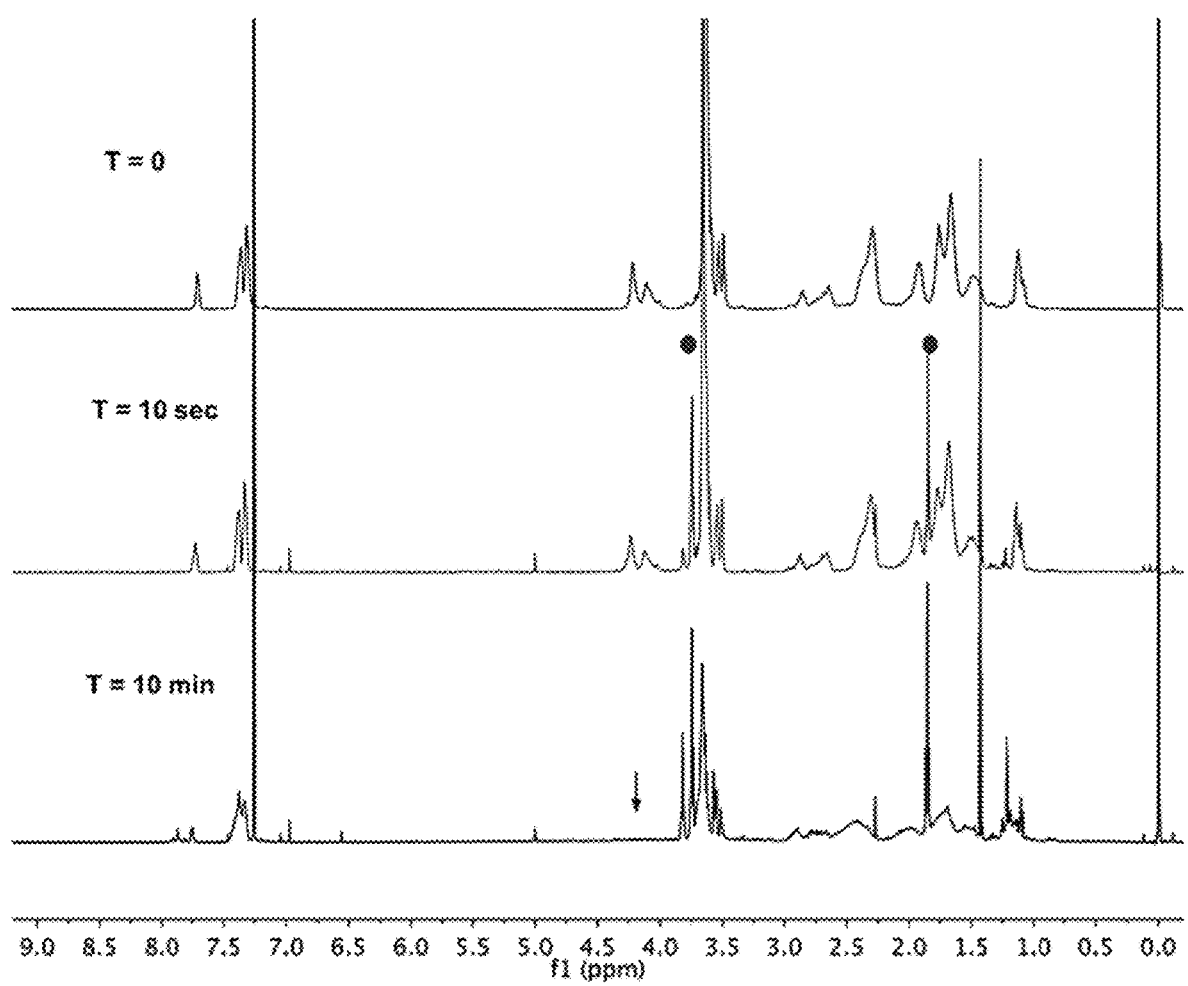
FIG. 13 shows representative $^1$H NMR data obtained for methanolysis of P10. T=0: all peaks in the starting polymer were broad; T=10 seconds: variety of oligomeric and small molecule species were found indicated by the emergence of sharp peaks (red circles); T=10 min: the ester peaks of polymer backbone disappeared (indicated by the black arrow) and most peaks are sharp, indicating the small hydrolysis fragments.

In order to test this concept, the degradation reactivity of the homopolymer P-4 was first investigated. P-4 was treated with sodium methoxide using the conditions developed by Hawker et al. and the residues were purified by column chromatography. $^1$H-NMR and mass spectrometry analyses of the purified residue confirmed small molecules 8 and 9 as the degradation products from the breaking down of the ester linkages (copolymerization of methyl acrylate and macrocyclic monomer 4). Next, the controlled degradation of a random copolymer incorporating main-chain ester functional groups was studied. Copolymerization of a 10:1 mixture of methyl methacrylate and monomer 4 controlled by CTA2 yielded a random copolymer P10 ($M_n$=10.2 kg/mol, Đ=1.17) with 12% of 4 incorporated, as confirmed by $^1$H-NMR (FIG. 13). The degradation of P10 was followed by SEC analysis. A dramatic molecular weight reduction was observed after only 10 seconds and the reaction reached complete conversion after 10 minutes (FIG. 2). These degradation experiments highlight the utility to fabricate synthetic polymers with functional main-chain structures such as novel (bio)degradable materials.

Figure 20A:
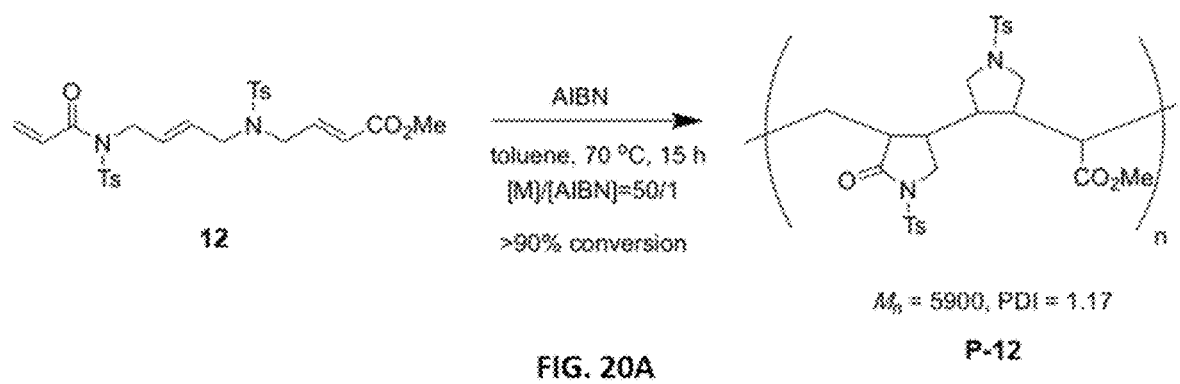
FIGS. 20A-20B show a representative radical cascade ring-closing polymerization reaction for monomer 12.
Figure 20B:
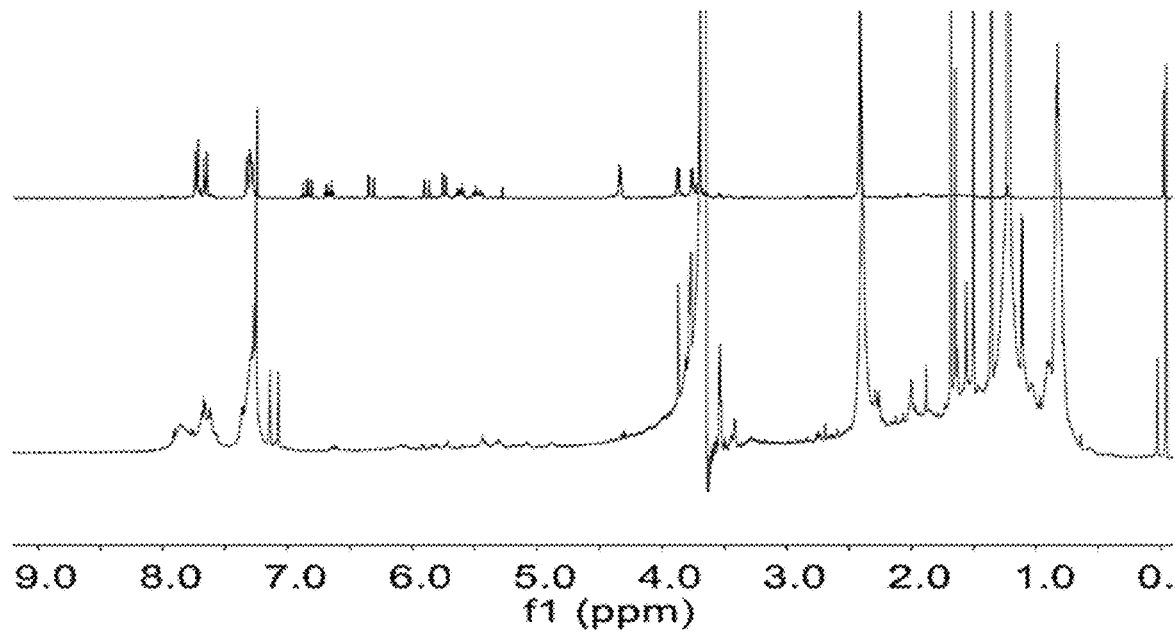

Next, the concept of radical cascade ring-closing polymerization was examined. A 1,6-diene monomer was polymerized in the presence of AIBN initiator successfully yielded ring-closing polymer P-8 ($M_n$=5.8 kg/mol, Đ=1.55). The controlled polymerization of 8 via RAFT mechanism was then studied, and various CTAs were evaluated for their ability to control polymerization (Table 8). CTA2 was again found to be the optimal chain transfer agent, yielding controlled polymer P-8 ($M_n$=6.5 kg/mol, Đ=1.18). Further investigation into an extended monomer 12 consisting of a 1,6,11-triene structure proved that a sequence of two ring-closing cascade can successfully yield polymer P-12 ($M_n$=5.9 kg/mol, Đ=1.17), suggesting that the ring-closing radical cascade polymerization (FIG. 20A) can be applied to generate sequence-controlled periodic polymers with ever complex periodicity (FIG. 20B).

Table 8 shows the polymerization of 1,6-diene-containing monomer 8, with the reaction shown immediately below.

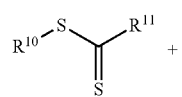

+

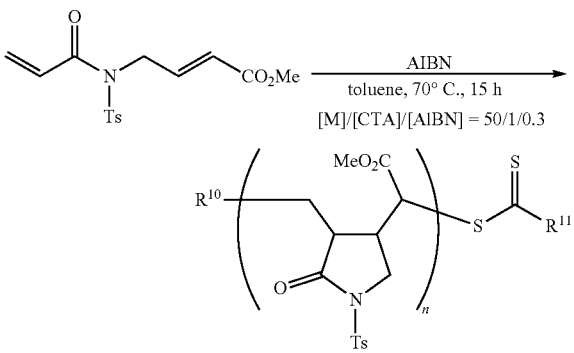

TABLE 8

| Entry | CTAs | Conversion | $M_{n(SEC)}$ | $M_w/M_n$ |
|---|---|---|---|---|
| 1 | NC-C(CH3)2-S-C(=S)-Ph | 5% | 4700 | 2.27 |
| 2 | NC-C(CH3)2-S-C(=S)-S-C2H5 | 13% | 4800 | 1.76 |
| 3 | HOOC-C(CH3)2-S-C(=S)-S-C2H5 | 83% | 6500 | 1.18 |
| 4 | HOOC-CH(CH3)-S-C(=S)-S-C2H5 | 77% | 5700 | 1.22 |
| 5 | NC-CH2-S-C(=S)-S-C12H25 | 75% | 6300 | 1.25 |

The coupling of ring-closing and ring-opening cascade was subsequently investigated. A model compound 9 was synthesized and its ability to undergo the radical cascade process was probed. The reaction in the presence of radical initiator AIBN at 70° C. over 5 hours afforded the coupling product 10 in 80% isolated yield. Mass spectrometry analysis of 10 unambiguously confirmed radical cascade process (FIG. 18). No byproducts or intermediates of the cascade reaction were detected, highlighting the efficiency of the radical cascade process.

With the ring-closing/ring-opening cascade validated, the ring-opening polymerization of 27-membered macrocyclic monomer 11 that couples the 1,6-diene and the allyl sulfone was investigated. The free radical polymerization of 11 using AIBN as the radical initiator successfully generated P-11 ($M_n$=28.2 kg/mol, Đ=1.51). The RAFT polymerization in the presence of CTA2 achieved good control over polymerization ($M_n$=8.8 kg/mol, Đ=1.37) (FIG. 19).

Table 9 shows the effect of different Chain Transfer Agents (CTA) on the polymerization shown immediately below.

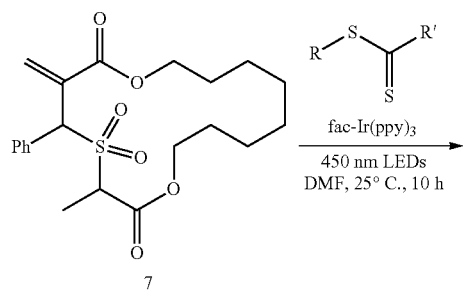

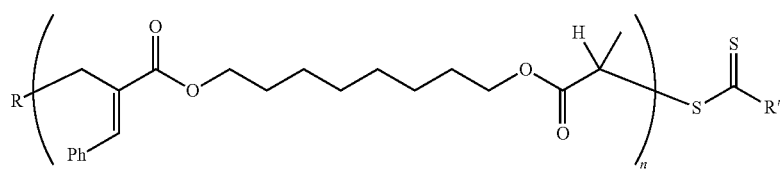

TABLE 9

| Entry[a] | CTA | Conversion[b] | $M_{n(theo)}$[c] | $M_{n(SEC)}$[d] | $M_w/M_n$[d] |
|---|---|---|---|---|---|
| 1 | — | 58% | 10200 | 20300 | 1.60 |
| 2 | HOOC-CH(CH3)-S-C(=S)-S-Et | 66% | 11600 | 9800 | 1.11 |
| 3 | HOOC-C(CH3)2-S-C(=S)-S-Et | 42% | 7400 | 7700 | 1.12 |
| 4 | NC-CH2-S-C(=S)-S-C12H25 | 67% | 11700 | 10600 | 1.11 |
| 5 | NC-C(CH3)2-S-C(=S)-S-Et | 26% | 4700 | 9200 | 1.08 |
| 6 | NC-C(CH3)2-S-C(=S)-Ph | 0% | 0 | — | — |

[a]Experimental conditions: 18 W blue LED light ($\lambda_{max}$ = 450 nm), [M]: [CTA]: [photocatalyst] = 50:1:0.01, initial monomer concentration [M]$_0$ = 0.2M, 25° C. under argon for 10 h.

[b]Monomer conversion was determined by $^1$H NMR spectroscopy.

[c]Theoretical molecular weight was calculated using the following equation: $M_{n(theo)}$ = [M]$_0$/[CTA]$_0$ × MW$^M$ × conversion + MW$^{CTA}$, where [M]$_0$, [CTA]$_0$, MW$^M$, and MW$^{CTA}$ correspond to initial monomer concentration, initial CTA concentration, molar mass of monomer, molar mass of CTA, respectively.

[d]Molecular weight ($M_n$) and dispersity ($M_w/M_n$) were determined by SEC analysis calibrated to polystyrene standards.

Table 10 shows the solvent effect on the polymerization for the reaction given immediately below.

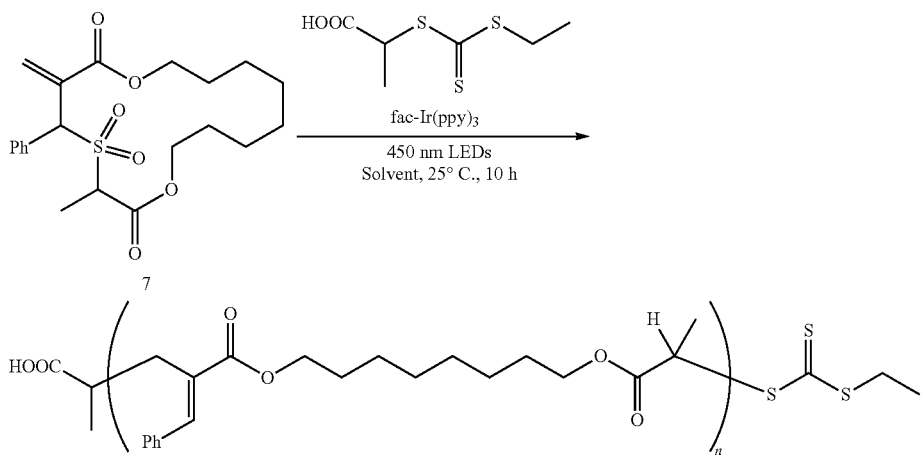

TABLE 10

| Entry[a] | Solvent | Conversion[b] | $M_{n\ (theo)}$[c] | $M_{n\ (SEC)}$[d] | $M_w/M_n$[d] |
|---|---|---|---|---|---|
| 1 | DMF | 66% | 11600 | 9800 | 1.11 |
| 2 | 1,4-dixoane | 67% | 11700 | 10000 | 1.14 |
| 3 | toluene | 52% | 9200 | 8800 | 1.10 |
| 4 | DMSO | 40% | 7100 | 10500 | 1.23 |
| 5 | THF | 40% | 7100 | 7100 | 1.11 |
| 6 | DCM | 17% | 3100 | 6800 | 1.10 |
| 7 | Acetonitrile | 19% | 3500 | 6300 | 1.06 |

[a]Experimental conditions: 18 W blue LED light ($\lambda_{max}$ = 450 nm), [M]:[CTA]:[photocatalyst] = 50:1:0.01, initial monomer concentration [M]$_0$ = 0.2M, 25° C. under argon for 10 h.
[b]Monomer conversion was determined by $^1$H NMR spectroscopy.
[c]Theoretical molecular weight was calculated using the following equation: $M_{n\ (theo)}$ = [M]$_0$/[CTA]$_0$ × MW$^M$ × conversion + MW$^{CTA}$, where [M]$_0$, [CTA]$_0$, MW$^M$, and MW$^{CTA}$ correspond to initial monomer concentration, initial CTA concentration, molar mass of monomer, molar mass of CTA, respectively.
[d]Molecular weight ($M_n$) and dispersity ($M_w/M_n$) were determined by SEC analysis calibrated to polystyrene standards.

Table 11 shows the effect of different photocatalysts on the polymerization for the reaction given immediately below.

TABLE 11

| Entry[a] | [M]$_0$ | Conversion[b] | $M_{n\ (theo)}$[c] | $M_{n\ (SEC)}$[d] | $M_w/M_n$[d] |
|---|---|---|---|---|---|
| 1 | 0.1M | 47% | 8300 | 7700 | 1.08 |
| 2 | 0.2M | 66% | 11600 | 9800 | 1.11 |
| 3 | 0.4M | 75% | 13100 | 10600 | 1.14 |

[a]Experimental conditions: 18 W blue LED light ($\lambda_{max}$ = 450 nm), [M]:[CTA]:[photocatalyst] = 50:1:0.01, initial monomer concentration [M]$_0$ = 0.2M, 25° C. under argon for 10 h.
[b]Monomer conversion was determined by $^1$H NMR spectroscopy.
[c]Theoretical molecular weight was calculated using the following equation: $M_{n\ (theo)}$ = [M]$_0$/[CTA]$_0$ × MW$^M$ × conversion + MW$^{CTA}$, where [M]$_0$, [CTA]$_0$, MW$^M$, and MW$^{CTA}$ correspond to initial monomer concentration, initial CTA concentration, molar mass of monomer, molar mass of CTA, respectively.
[d]Molecular weight ($M_n$) and dispersity ($M_w/M_n$) were determined by SEC analysis calibrated to polystyrene standards.

Table 12 shows the concentration effect on the polymerization for the reaction given immediately below.

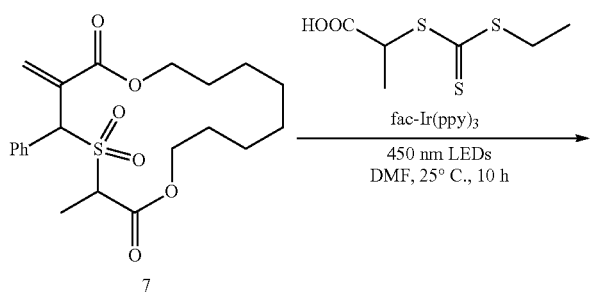

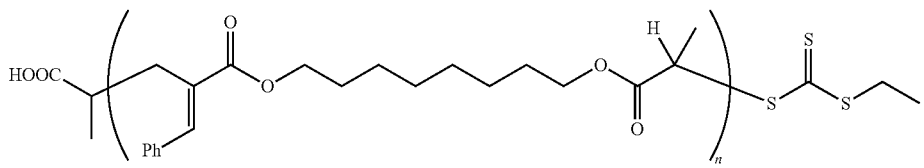

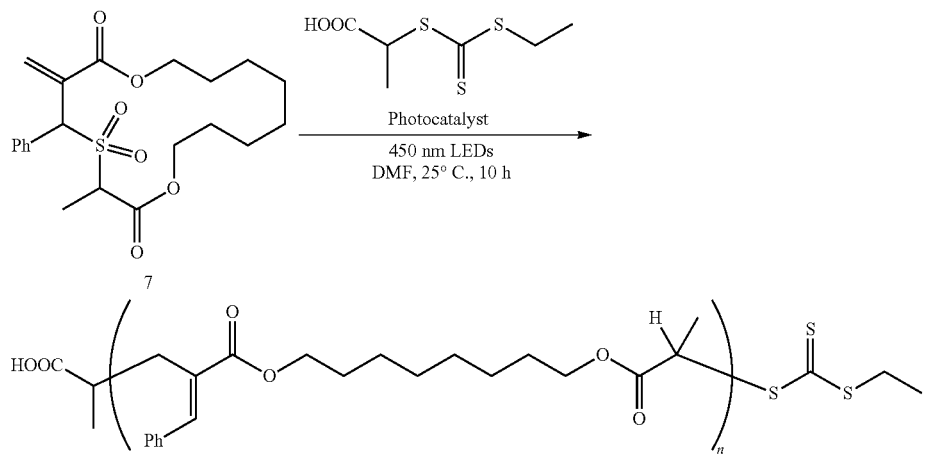

TABLE 12

| Entry[a] | photocatalyst | Conversion[b] | $M_{n\,(theo)}$[c] | $M_{n\,(SEC)}$[d] | $M_w/M_n$[d] |
|---|---|---|---|---|---|
| 1 | — | 0 | — | — | — |
| 2 | fac-Ir(ppy)$_3$ | 66% | 11600 | 9800 | 1.11 |
| 3 | Ru(bpy)$_3$ | 42% | 7400 | 8100 | 1.08 |

[a]Experimental conditions: 18 W blue LED light ($\lambda_{max}$ = 450 nm), [M]:[CTA]:[photocatalyst] = 50:1:0.01, initial monomer concentration [M]$_0$ = 0.2M, 25° C. under argon for 10 h.
[b]Monomer conversion was determined by $^1$H NMR spectroscopy.
[c]Theoretical molecular weight was calculated using the following equation: $M_{n\,(theo)}$ = [M]$_0$/[CTA]$_0$ × MW$^M$ × conversion + MW$^{CTA}$, where [M]$_0$, [CTA]$_0$, MW$^M$, and MW$^{CTA}$ correspond to initial monomer concentration, initial CTA concentration, molar mass of monomer, molar mass of CTA, respectively.
[d]Molecular weight ($M_n$) and dispersity ($M_w/M_n$) were determined by SEC analysis calibrated to polystyrene standards.

Figure 21:
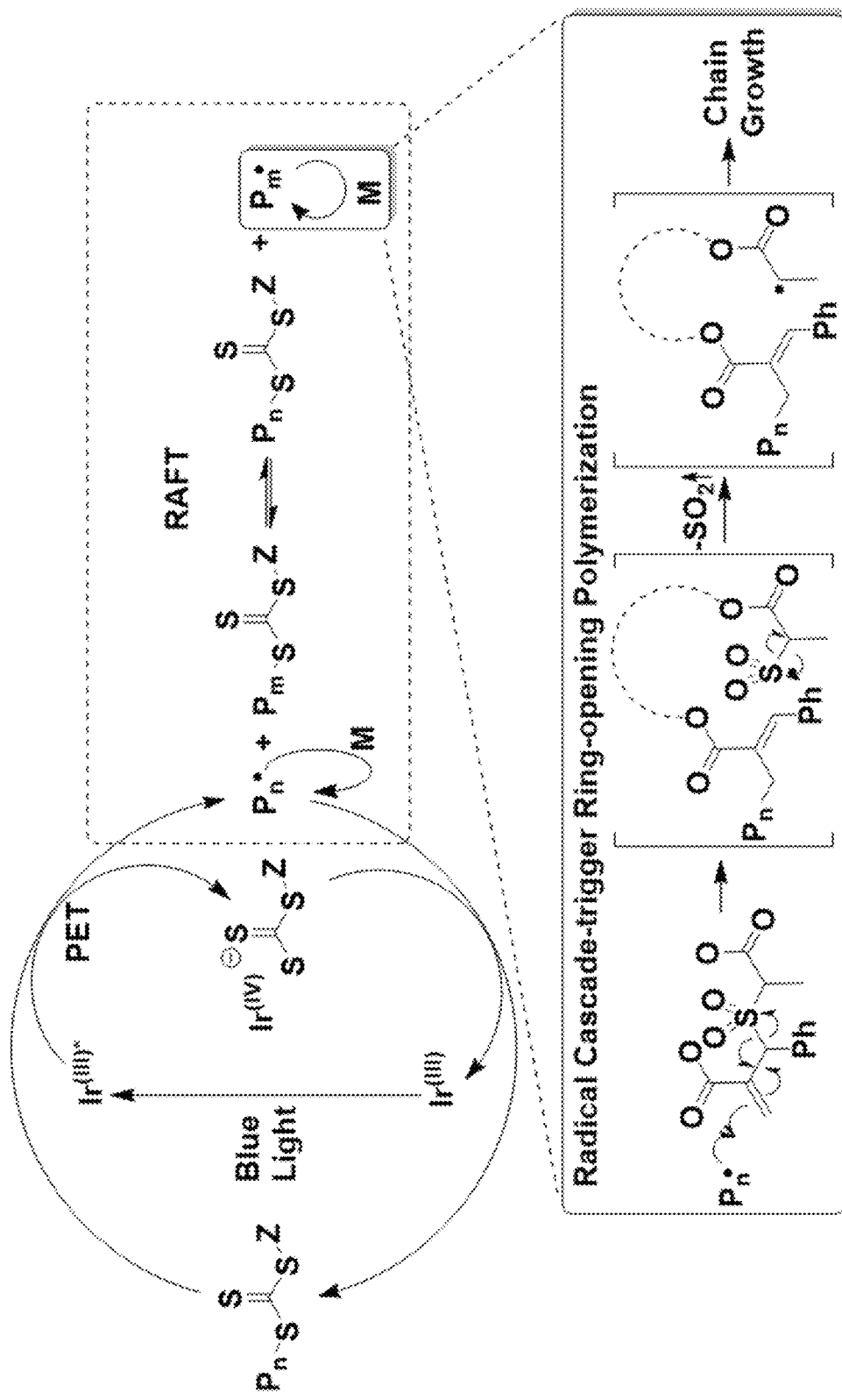
FIG. 21 shows a representative reaction for light-mediated ring-opening cascade polymerization using fac-Ir(ppy)$_3$ as photoredox catalyst.

Referring to FIG. 21, a reaction is shown for application of photoinduced electron transfer reversible addition-fragmentation chain transfer (PET-RAFT) polymerization technique to macrocyclic monomers assembled with an allyl alkylsulfone-based ring opening trigger. It starts with the excitation of photoredox catalyst, fac-[Ir(ppy)$_3$] from Ir$^{(III)}$ to Ir$^{(III)}$* under blue light irradiation. The photocatalyst at excited state [Irow] can reduce CTA, producing radicals (P.) and Ir$^{(IV)}$ species. The polymerization of macrocyclic monomer is then initiated by the radical (P.), which undergoes a radical cascade process with β-elimination of alkylsulfone followed by rapid a-scission to extrude SO$_2$. The resulting secondary alkyl radical (P$_n$.) structurally similar to the propagating radical of polyacrylates can undergo controlled chain growth via RAFT process. The secondary radical (P$_n$.) may be deactivated by Ir$^{(IV)}$ to regenerate the initial IR$^{(III)}$ and restart the catalytic cycle.

Figure 22:
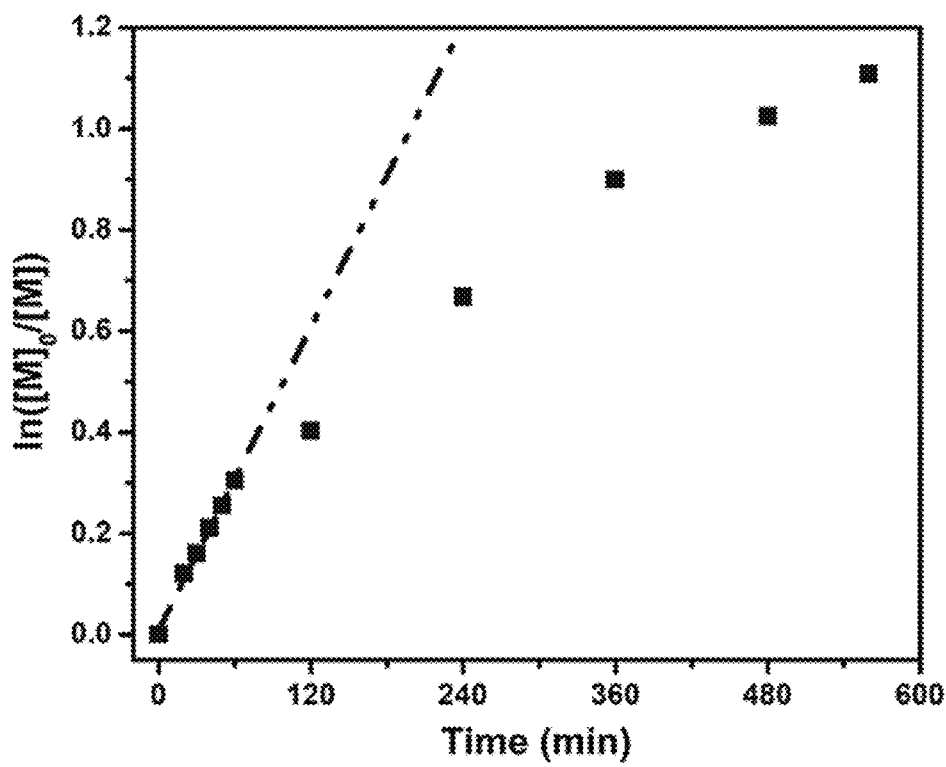
FIG. 22 shows representative data for a kinetic study on the polymerization of macrocyclic monomer 7. The experiment was performed at the following condition: 18 W blue LED light ($\lambda_{max}$=450 nm), [M]:[CTA]:[photocatalyst]=50:1:0.01, initial monomer concentration [M]$_0$=0.2 M, 25° C. under argon in a sealed 4 mL vial. A linear relationship between ln([M]$_0$[M]$_t$) and reaction time is observed at early stage. The plot deviates from the linear relationship with time after ln([M]$_0$/[M]$_t$) has reached to 0.4.

The data in FIG. 22 show the ln([M]$_0$/[M]) versus reaction time was plotted to analyze the polymerization kinetics. A linear relationship between ln([M]$_0$/[M]) and reaction time was observed at early stage. The plot deviated from the linear relationship after 60 min. The plot demonstrated the polymerization was in a controlled manner at early stage, following first order kinetics. However, the polymerization was slowed down in the late stage of the polymerization with accumulation of SO$_2$. The polymerization of macrocyclic monomer was performed under the irradiation of blue LED light (18 W, λmax=450 nm) with [M]$_0$:[CTA]$_0$:[photocatalyst]$_0$=50:1:0.01 at 25° C. under argon. The reaction was set up in a sealed 4 mL vial with initial monomer concentration [M]$_0$=0.2 M. Monomer conversion was determined by $^1$H NMR spectra.

Figure 23:
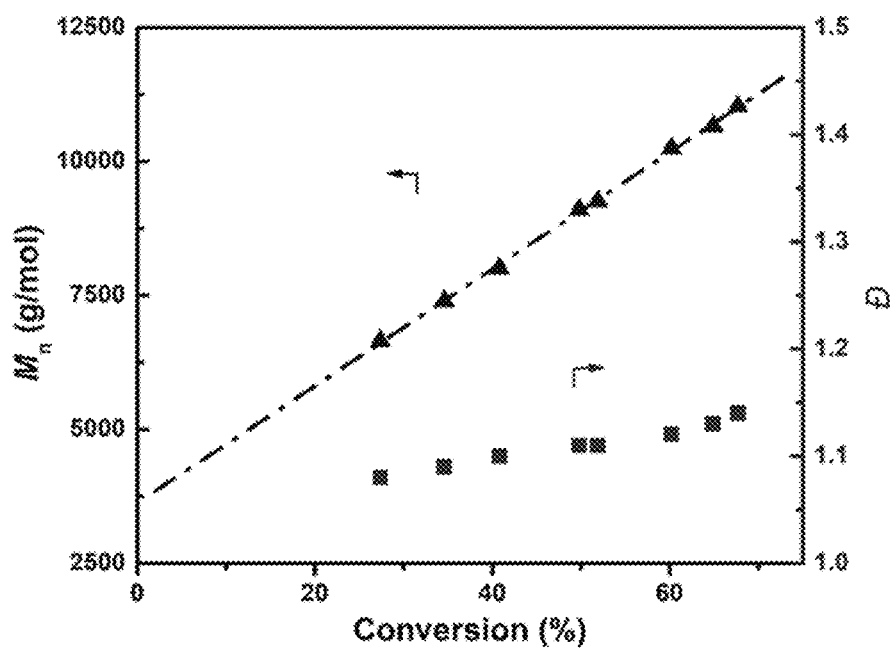
FIG. 23 shows representative data for a plot of $M_n$ (g/mol) and Ð versus monomer conversion. The experiment was performed at the following condition: 18 W blue LED light ($\lambda_{max}$=450 nm), [M]: [CTA]: [photocatalyst]=50:1:0.01, initial monomer concentration [M]$_0$=0.2 M, 25° C. under argon in a sealed 4 mL vial. The linear relationship between molecular weights ($M_n$) and monomer conversion shows excellent control during chain growth. The dispersity (Ð) can remain as low as 1.15 even at 70% conversion.

The molecular weight and dispersity versus monomer conversion were plotted to monitor the polymerization controllability as shown in FIG. 23. The linear relationship between molecular weight ($M_n$) and monomer conversion showed chain growth was highly controlled. The dispersity (Đ) remained as low as 1.15 even at 70% conversion, which also confirmed the excellent controllability. The polymerization of macrocyclic monomer was performed under the irradiation of blue LED light (18 W, λmax=450 nm) with [M]$_0$:[CTA]$_0$:[photocatalyst]$_0$=50:1:0.01 at 25° C. under argon. The reaction was set up in a sealed 4 mL vial with initial monomer concentration [M]$_0$=0.2 M. Monomer conversion was determined by $^1$H NMR spectra. Molecular weight ($M_n$) and dispersity (Đ) are determined by SEC analysis calibrated to polystyrene standards.

Figure 24:
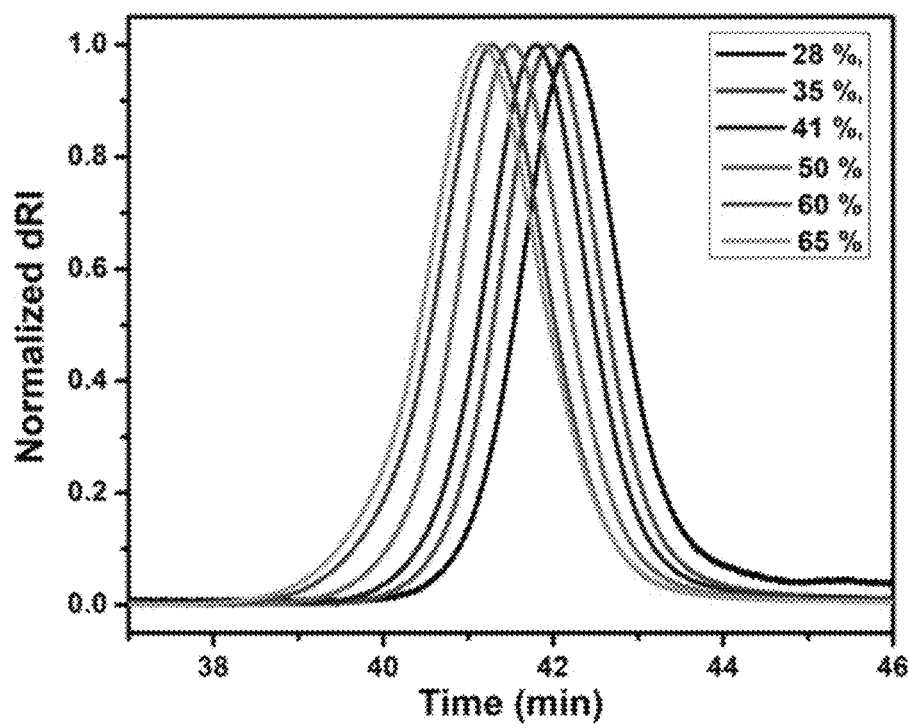
FIG. 24 shows representative data for overlay of SEC traces of different conversion. The experiment was performed at the following condition: 18 W blue LED light ($\lambda_{max}$=450 nm), [M]:[CTA]:[photocatalyst]=50:1:0.01, initial monomer concentration [M]$_0$=0.2 M, 25° C. under argon in a sealed 4 mL vial. As a support for FIG. 23, the overlay SEC traces of different conversion clearly illustrates the retention time of each curve gradually decreases as the monomer conversion increases.

The SEC traces of the polymers with different molecular weight were overlaid as shown in FIG. 24. The overlaid SEC traces clearly showed different molecular weights were achieved at different conversion as the retention time of SEC traces with different conversions shifted: the retention time of each trace gradually decreases as the monomer conversion increases. The polymerization of macrocyclic monomer was performed under the irradiation of blue LED light (18 W, λmax=450 nm) with [M]$_0$:[CTA]$_0$:[photocatalyst]$_0$=50:1:0.01 at 25° C. under argon. The reaction was set up in a sealed 4 mL vial with initial monomer concentration [M]$_0$=0.2 M. Monomer conversion was determined by $^1$H NMR spectra. Molecular weight ($M_n$) and dispersity (Đ) are determined by SEC analysis calibrated to polystyrene standards.

Figure 25:
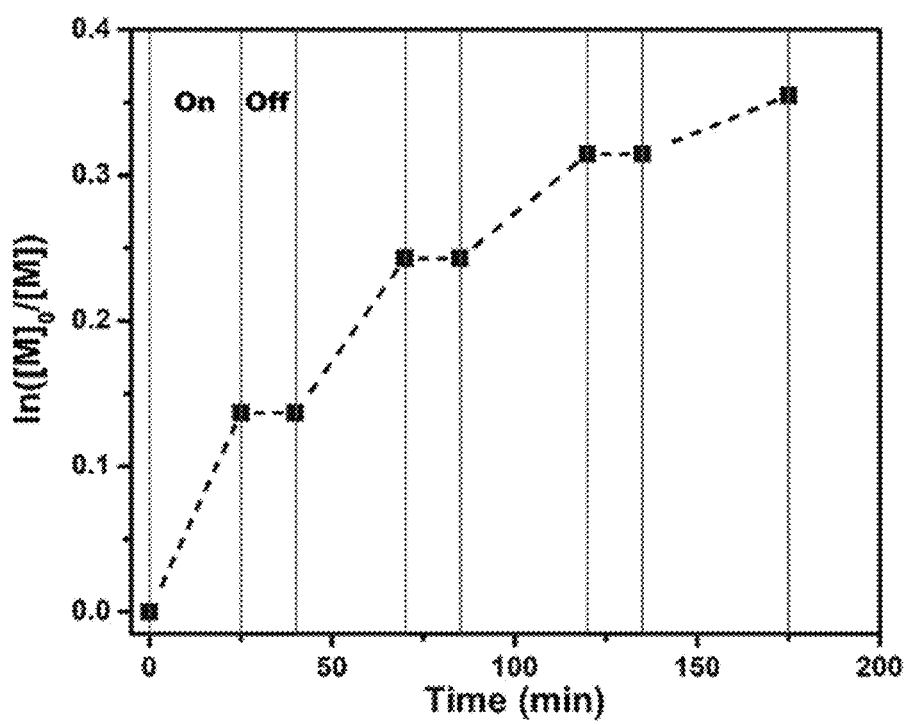
FIG. 25 shows representative data for ln([M]$_0$/[M]$_t$) vs time with intermittent light exposure. Plot of ln[(M]$_0$/[M]$_t$) versus time clearly demonstrates that polymerization proceeds only in the presence of light.

The ln([M]$_0$/[M]) versus reaction time was plotted to analyze temporal control of this PET-RAFT process as whon in FIG. 25. With intermittent light exposure, the polymerization only proceeded when light was on, and paused when the light was off. Plot of ln([M]$_0$[M]) versus time clearly demonstrated polymerization proceeded only in the presence of light. The polymerization of macrocyclic monomer was performed under the irradiation of blue LED light (18 W, λmax=450 nm) with [M]$_0$:[CTA]$_0$:[photocatalyst]$_0$=50:1:0.01 at 25° C. under argon. The reaction was set up in a sealed 4 mL vial with initial monomer concentration [M]$_0$=0.2 M. Monomer conversion was determined by $^1$H NMR spectra.

Figure 26A:
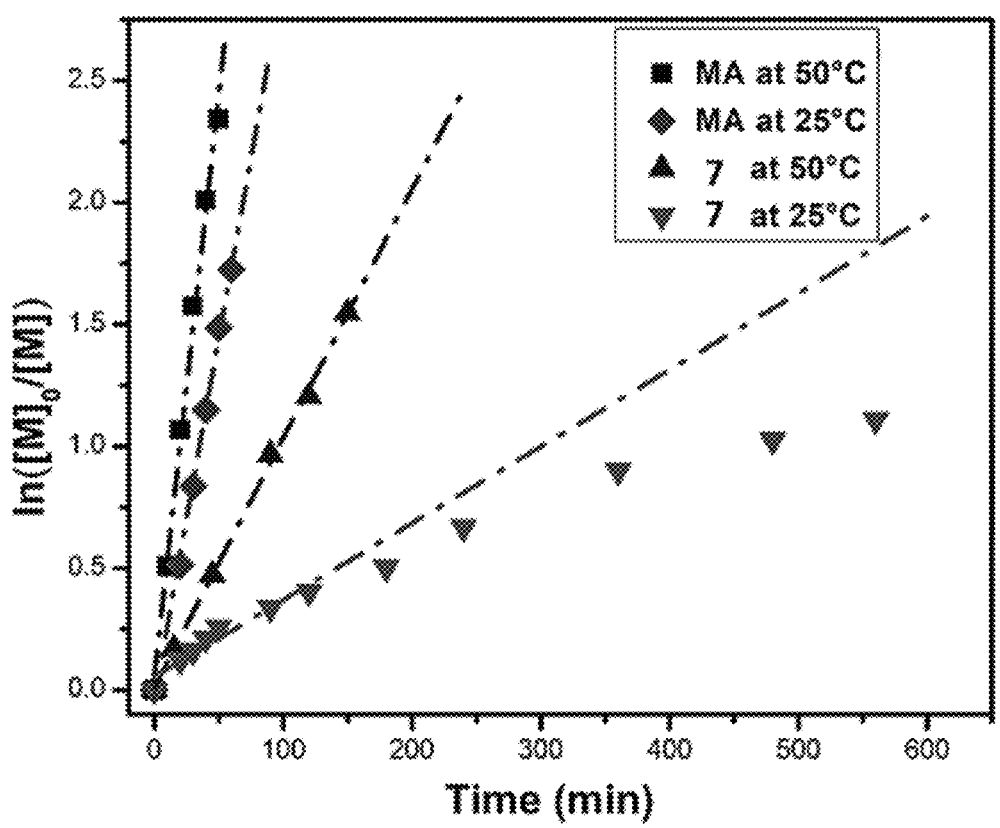
FIGS. 26A-26C show representative data for the temperature effect between the polymerization of methyl acrylate (MA) shown in FIG. 26B and the polymerization of macrocyclic monomer 7 shown in FIG. 26C. The ln([M]o/[M]1) versus time is plotted for polymerization of methyl acrylate (MA) and macrocyclic monomer 7 at different temperatures is shown in FIG. 26A. The plot clearly shows temperature has higher influence towards polymerization of monomer 7 than that of MA.
Figure 26B:
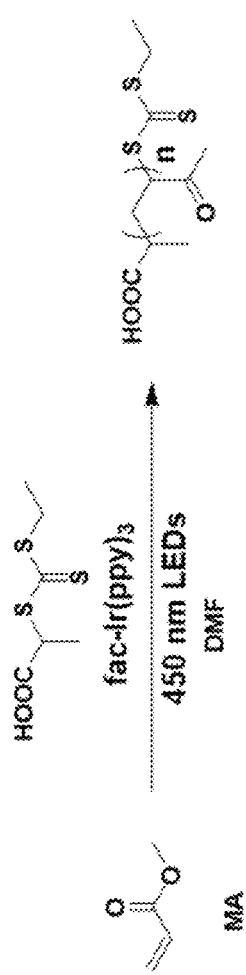
Figure 26C:
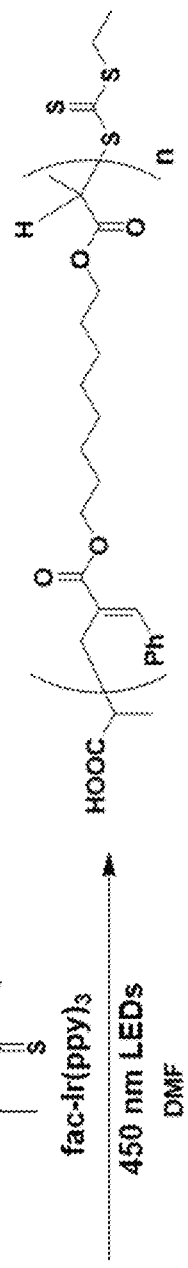
Figure 26C:
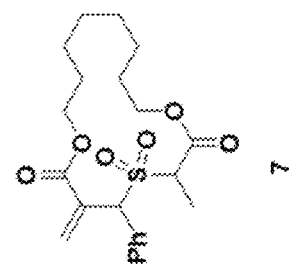

The ln([M]$_0$/[M]) versus time was plotted for polymerization of methyl acrylate (MA) and macrocyclic monomer (7) at different temperature to analyze temperature effect on the rate of polymerization as shown in FIG. 26A for the reactions shown in FIGS. 26B and 26C, respectively. At high temperature, the extrusion of $SO_2$ was more favored and the solubility of $SO_2$ was reduced. The plot clearly showed temperature had higher impact towards polymerization of 7 than that of MA. The polymerization of macrocyclic monomer was performed under the irradiation of blue LED light (18 W, λmax=450 nm) with $[M]_0:[CTA]_0:[photocatalyst]_0$=50:1:0.01 under argon. The reaction was set up in a 4 mL vial with initial monomer concentration $[M]_0$=0.2 M. Monomer conversion was determined by $^1$H NMR spectra.

Figure 27:
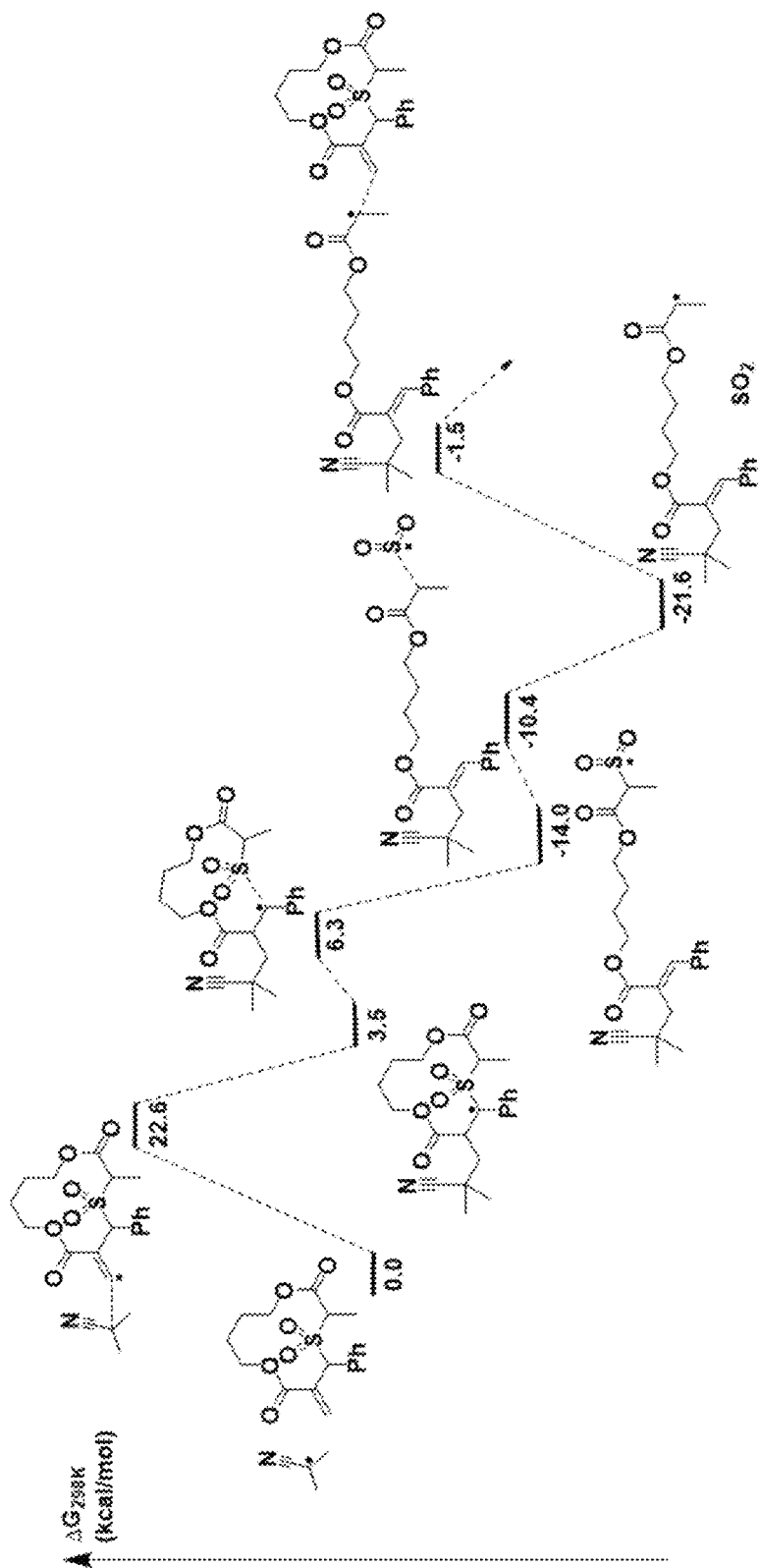
FIG. 27 provides a representative mechanism investigation by DFT calculation. All geometries are optimized using B3LYP/6-31G* method. No solvation is considered. All energies are Gibbs free energies computed at 1 atm and 298K.

FIG. 27 provides a representative mechanism investigation by DFT calculation. In this investigation, all geometries are optimized using B3LYP/6-31G* method. No solvation is considered. All energies are Gibbs free energies computed at 1 atm and 298K. The DFT calculations shows that radical addition of the alkyl radical to the terminal vinyl group of the monomer is the rate-limiting step with a Gibbs free energy barrier of 22.6 kcal/mol. The releasing of sulfonyl radical and extrusion of $SO_2$ undergo lower energy barriers (2.8 kcal/mol and 3.6 kcal/mol respectively). Radical addition of resulting propagating radical species on next monomer still undergoes a Gibbs free energy barrier of 20.1 kcal/mol, similar to the very first addition step.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A compound having a structure represented by a formula:

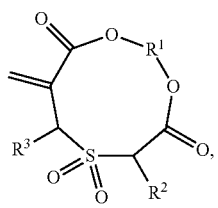

wherein $R^1$ is diyl group selected from —(C1-C16 alkanediyl)-O—(C=O)—$R^{20}$—(C=O)—O—(C1-C6 alkanediyl), —O—(C1-C16 alkanediyl)-O—, —O—(C1-C16 alkanediyl)-(C3-C12 cyclic alkanediyl)-(C1-C16 alkanediyl)-O—, —O—(C1-C16 alkanediyl)-(C3-C12 heterocyclic alkanediyl)-(C1-C16 alkanediyl)-O—, —O—(C1-C16 alkanediyl)-(arylene)-(C1-C16 alkanediyl)-O—, —NH—(C1-C16 alkanediyl)-NH—, —NH—(C1-C16 alkanediyl)-(C3-C12 cyclic alkanediyl)-(C1-C16 alkanediyl)-NH—, —NH—(C1-C16 alkanediyl)-(C3-C12 heterocyclic alkanediyl)-(C1-C16 alkanediyl)-NH—, —NH—(C1-C16 alkanediyl)-(arylene)-(C1-C16 alkanediyl)-NH—,

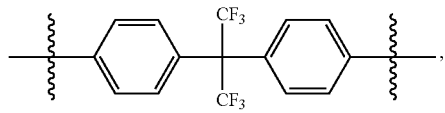

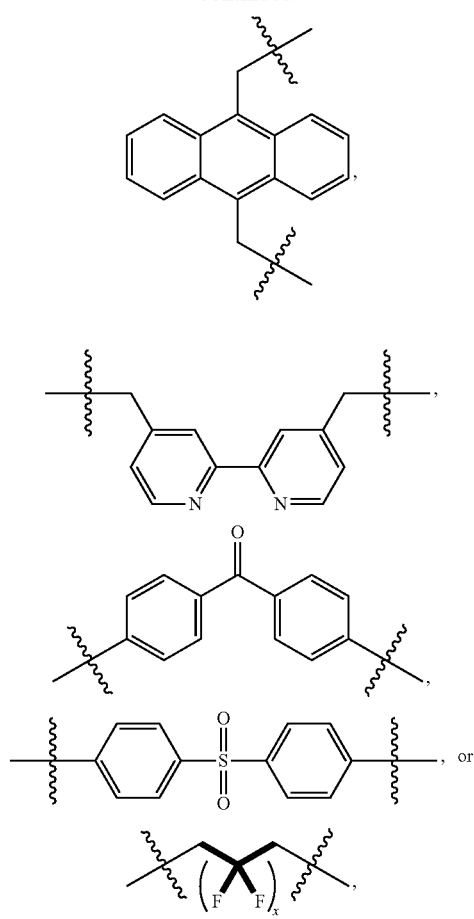

wherein x is an integer having a value of 2-100;

wherein $R^2$ is an aryl group substituted with 1, 2, or 3 electron-withdrawing groups or is phenyl;

wherein $R^3$ is selected from hydrogen, (C1-C16) alkyl, aryl, and heteroaryl;

wherein $R^{20}$ is selected from arylene, a (C1-C12) alkanediyl, and —$R^{21}$—(C1-C16 alkanediyl)-$R^{22}$—; and wherein each of $R^{21}$ and $R^{22}$ are independently an arylene; or wherein when $R^2$ is phenyl and $R^3$ is C1 alkyl, $R^1$ is selected from —(CH$_2$)$_4$—, —(CH$_2$)$_6$—, —(CH$_2$)$_8$—, or —(CH$_2$)$_2$—O—(CH$_2$)$_2$—.

2. The compound of claim 1, wherein $R^1$ has a structure represented by a formula:

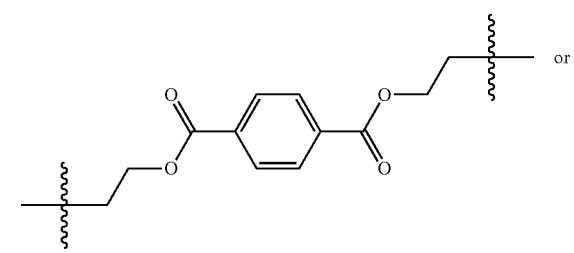

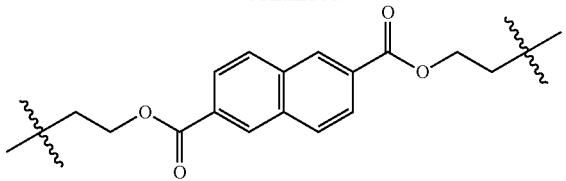

3. The compound of claim 1, wherein $R^1$ has a structure represented by a formula:

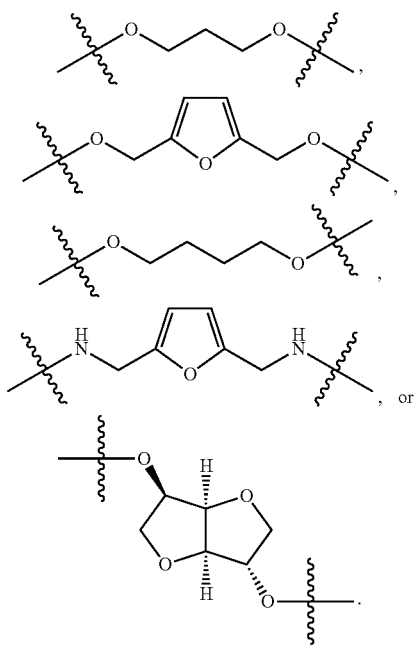

4. The compound of claim 1, wherein the electron withdrawing group is selected from halo, cyano, and nitro.

5. The compound of claim 1, wherein $R^1$ is phenyl.

6. The compound of claim 1, wherein $R^3$ is selected from methyl, ethyl, propyl, isopropyl, butyl, sec-butyl, iso-butyl, phenyl, and pyridinyl.

7. A method of preparing a polymer, the method comprising:

reacting a compound of claim 1 with a chain transfer agent in the presence of a compound having a structure represented by the formula:

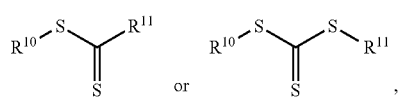

wherein $R^{10}$ is selected from a group having a structure represented by a formula:

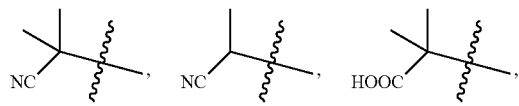

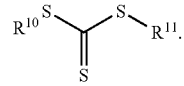

wherein n is integer having a value of 1, 2, 3, 4, 5, or 6; and, wherein $R^{11}$ is a group selected from phenyl and a C2-C12 alkyl group.

8. The method of claim 7, wherein the chain transfer agent has a structure represented by the formula:

$$R^{10}\text{—S—C(=S)—S—}R^{11}.$$

9. The method of claim 7, wherein the chain transfer agent has a structure represented by the formula:

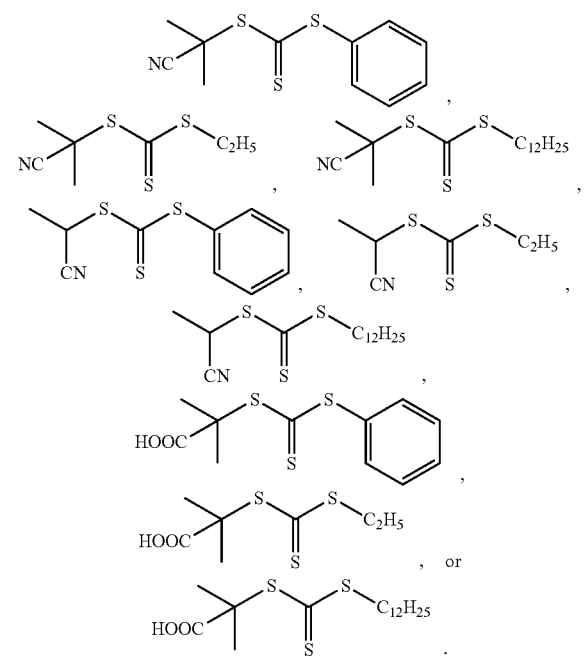

10. The method of claim 7, wherein the chain transfer agent has a structure represented by the formula:

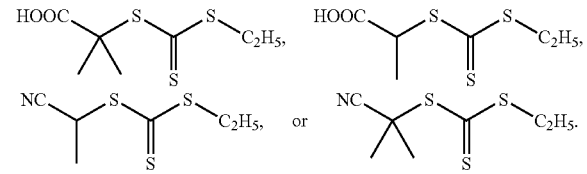

11. The method of claim 7, wherein the chain transfer agent has a structure represented by the formula:

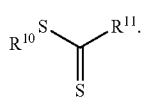

12. The method of claim 7, wherein the chain transfer agent has a structure represented by the formula:

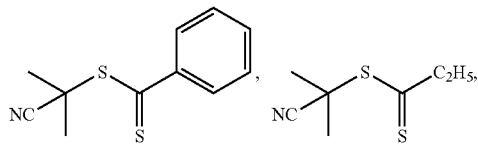

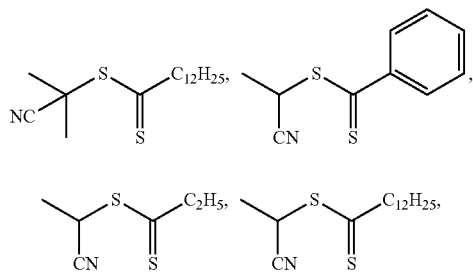

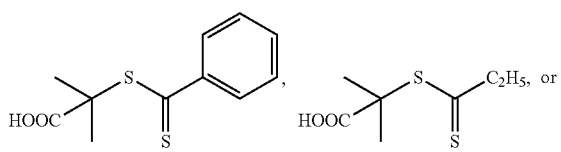

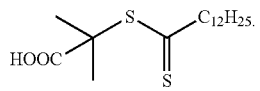

13. The method of claim 7, wherein the polymer has a structure represented by the formula:

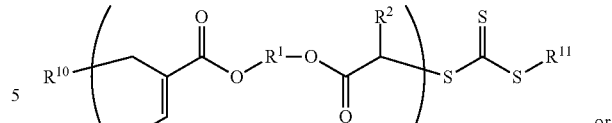

or

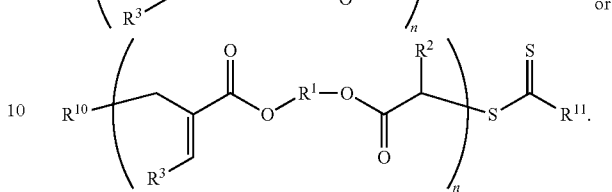

14. The method of claim 13, wherein the polymer has a structure represented by the formula:

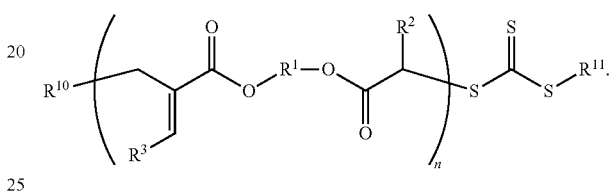

15. The method of claim 13, wherein the polymer has a structure represented by the formula:

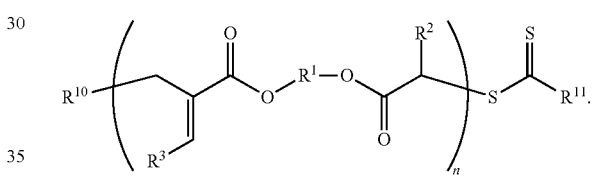

16. The method of claim 7, wherein the polymer has a weight average molecular weight of from about 1,000 Da to about 100,000 Da.

17. The method of claim 14, wherein the polymer has a weight average molecular weight of from about 1,000 Da to about 25,000 Da.

* * * * *